(12) United States Patent
Zhu et al.

(10) Patent No.: US 11,665,343 B2
(45) Date of Patent: May 30, 2023

(54) USING QUANTIZATION GROUPS IN VIDEO CODING

(71) Applicant: Bytedance Inc., Los Angeles, CA (US)

(72) Inventors: Weijia Zhu, San Diego, CA (US); Li Zhang, San Diego, CA (US); Jizheng Xu, San Diego, CA (US); Kai Zhang, San Diego, CA (US); Ye-kui Wang, San Diego, CA (US)

(73) Assignee: BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/835,647

(22) Filed: Jun. 8, 2022

(65) Prior Publication Data

US 2022/0321882 A1   Oct. 6, 2022

Related U.S. Application Data

(63) Continuation of application No. PCT/US2020/063746, filed on Dec. 8, 2020.

(30) Foreign Application Priority Data

Dec. 9, 2019  (WO) ................ PCT/CN2019/123951
Dec. 31, 2019 (WO) ................ PCT/CN2019/130851

(51) Int. Cl.
*H04N 19/176*  (2014.01)
*H04N 19/70*   (2014.01)
(Continued)

(52) U.S. Cl.
CPC ......... *H04N 19/117* (2014.11); *H04N 19/174* (2014.11); *H04N 19/176* (2014.11);
(Continued)

(58) Field of Classification Search
CPC .. H04N 19/117; H04N 19/174; H04N 19/176; H04N 19/186; H04N 19/70; H04N 19/80
See application file for complete search history.

(56) References Cited

U.S. PATENT DOCUMENTS

| 5,512,953 A | 4/1996 | Nahumi |
| 7,474,357 B1 | 1/2009 | Mrudock et al. |

(Continued)

FOREIGN PATENT DOCUMENTS

| CN | 104584559 A | 4/2015 |
| CN | 104584560 A | 4/2015 |

(Continued)

OTHER PUBLICATIONS

Final Office Action from U.S. Appl. No. 17/694,305 dated Sep. 30, 2022.

(Continued)

*Primary Examiner* — Joseph W Becker
(74) *Attorney, Agent, or Firm* — Perkins Coie LLP

(57) ABSTRACT

An example method of video processing includes applying, in a conversion between a video comprising multiple components and a bitstream representation of the video, a deblocking filter to video blocks of the multiple components. A deblocking filter strength for the deblocking filter of each of the multiple components is determined according to a rule that specifies to use a different manner for determining the deblocking filter strength for the video blocks of each of the multiple components.

19 Claims, 26 Drawing Sheets

(51) Int. Cl.
*H04N 19/117* (2014.01)
*H04N 19/174* (2014.01)
*H04N 19/186* (2014.01)
*H04N 19/80* (2014.01)

(52) U.S. Cl.
CPC ........... *H04N 19/186* (2014.11); *H04N 19/70* (2014.11); *H04N 19/80* (2014.11)

(56) References Cited

U.S. PATENT DOCUMENTS

| | | |
|---|---|---|
| 9,137,547 B2 | 9/2015 | Van et al. |
| 9,538,200 B2 | 1/2017 | Van et al. |
| 9,723,331 B2 | 8/2017 | Van et al. |
| 9,807,403 B2 | 10/2017 | Chong et al. |
| 10,057,574 B2 | 8/2018 | Li et al. |
| 10,321,130 B2 | 6/2019 | Dong et al. |
| 10,506,230 B2 | 12/2019 | Zhang et al. |
| 10,582,213 B2 | 3/2020 | Li et al. |
| 10,708,591 B2 | 7/2020 | Zhang et al. |
| 10,708,592 B2 | 7/2020 | Dong et al. |
| 10,778,974 B2 | 9/2020 | Karczewicz et al. |
| 10,855,985 B2 | 12/2020 | Zhang et al. |
| 2003/0206585 A1 | 11/2003 | Kerofsky |
| 2004/0062313 A1 | 4/2004 | Schoenblum |
| 2004/0101059 A1 | 5/2004 | Joch et al. |
| 2004/0146108 A1 | 7/2004 | Hsia |
| 2007/0201564 A1 | 8/2007 | Joch et al. |
| 2012/0183052 A1 | 7/2012 | Lou et al. |
| 2012/0192051 A1 | 7/2012 | Rothschiller et al. |
| 2013/0016772 A1 | 1/2013 | Matsunobu et al. |
| 2013/0022107 A1 | 1/2013 | Van Der Auwera et al. |
| 2013/0077676 A1 | 3/2013 | Sato |
| 2013/0101018 A1 | 4/2013 | Chong et al. |
| 2013/0101025 A1 | 4/2013 | Van Der Auwera et al. |
| 2013/0101031 A1 | 4/2013 | Van Der Auwera et al. |
| 2013/0107973 A1 | 5/2013 | Wang et al. |
| 2013/0188733 A1 | 7/2013 | Van Der Auwera et al. |
| 2013/0259141 A1 | 10/2013 | Van Der Auwera et al. |
| 2013/0329785 A1 | 12/2013 | Lim et al. |
| 2014/0003497 A1 | 1/2014 | Sullivan et al. |
| 2014/0003498 A1 | 1/2014 | Sullivan |
| 2014/0192904 A1 | 7/2014 | Rosewarne |
| 2014/0321552 A1 | 10/2014 | He et al. |
| 2014/0355689 A1 | 12/2014 | Tourapis |
| 2014/0362917 A1 | 12/2014 | Joshi et al. |
| 2014/0376611 A1 | 12/2014 | Kim et al. |
| 2015/0071345 A1 | 3/2015 | Tourapis et al. |
| 2015/0264374 A1 | 9/2015 | Xiu et al. |
| 2015/0319438 A1 | 11/2015 | Shima et al. |
| 2015/0358631 A1 | 12/2015 | Zhang et al. |
| 2015/0365671 A1 | 12/2015 | Pu et al. |
| 2015/0365695 A1 | 12/2015 | Pu et al. |
| 2015/0373327 A1 | 12/2015 | Zhang et al. |
| 2016/0065991 A1 | 3/2016 | Chen et al. |
| 2016/0100167 A1 | 4/2016 | Rapaka et al. |
| 2016/0212373 A1 | 7/2016 | Aharon et al. |
| 2016/0241853 A1 | 8/2016 | Lim et al. |
| 2016/0241858 A1 | 8/2016 | Li et al. |
| 2016/0261864 A1 | 9/2016 | Samuelsson et al. |
| 2016/0261884 A1* | 9/2016 | Li ................. H04N 19/157 |
| 2016/0286226 A1 | 9/2016 | Ridge et al. |
| 2017/0105014 A1 | 4/2017 | Lee et al. |
| 2017/0127090 A1 | 5/2017 | Rosewarne et al. |
| 2017/0134728 A1 | 5/2017 | Sullivan |
| 2017/0238020 A1 | 8/2017 | Karczewicz et al. |
| 2017/0332075 A1 | 11/2017 | Karczewicz et al. |
| 2018/0041778 A1 | 2/2018 | Zhang et al. |
| 2018/0041779 A1 | 2/2018 | Zhang et al. |
| 2018/0063527 A1 | 3/2018 | Chen et al. |
| 2018/0091812 A1 | 3/2018 | Guo et al. |
| 2018/0091829 A1 | 3/2018 | Liu et al. |
| 2018/0160112 A1 | 6/2018 | Gamei et al. |
| 2018/0199057 A1 | 7/2018 | Chuang et al. |
| 2018/0278934 A1 | 9/2018 | Andersson et al. |
| 2018/0352264 A1 | 12/2018 | Guo et al. |
| 2019/0020875 A1 | 1/2019 | Liu et al. |
| 2019/0098307 A1 | 3/2019 | Sullivan |
| 2019/0116358 A1* | 4/2019 | Zhang ................. H04N 19/117 |
| 2019/0124330 A1 | 4/2019 | Chien et al. |
| 2019/0230353 A1 | 7/2019 | Gadde et al. |
| 2019/0238845 A1 | 8/2019 | Zhang et al. |
| 2019/0273923 A1 | 9/2019 | Huang et al. |
| 2019/0306502 A1 | 10/2019 | Gadde et al. |
| 2020/0177910 A1 | 6/2020 | Li et al. |
| 2020/0213570 A1 | 7/2020 | Shih et al. |
| 2020/0267381 A1 | 8/2020 | Vanam et al. |
| 2020/0329239 A1 | 10/2020 | Hsiao et al. |
| 2020/0413038 A1 | 12/2020 | Zhang et al. |
| 2021/0006792 A1 | 1/2021 | Han et al. |
| 2021/0021863 A1* | 1/2021 | Kalva ................. H04N 19/543 |
| 2021/0076032 A1 | 3/2021 | Hu et al. |
| 2021/0120239 A1 | 4/2021 | Zhu et al. |
| 2021/0195201 A1 | 6/2021 | Li et al. |
| 2021/0266552 A1 | 8/2021 | Kotra et al. |
| 2021/0314628 A1 | 10/2021 | Zhang et al. |
| 2021/0321095 A1 | 10/2021 | Zhang et al. |
| 2021/0321121 A1 | 10/2021 | Zhang et al. |
| 2021/0337239 A1 | 10/2021 | Zhang et al. |
| 2021/0368171 A1 | 11/2021 | Zhang et al. |
| 2021/0377524 A1 | 12/2021 | Zhang. et al. |
| 2021/0385446 A1 | 12/2021 | Liu et al. |
| 2021/0385454 A1 | 12/2021 | Fleureau et al. |
| 2021/0392381 A1 | 12/2021 | Wang et al. |
| 2021/0409701 A1 | 12/2021 | Zhu et al. |
| 2022/0014782 A1 | 1/2022 | Chon et al. |
| 2022/0159282 A1 | 5/2022 | Sim et al. |
| 2022/0191496 A1 | 6/2022 | Kotra et al. |
| 2022/0201294 A1 | 6/2022 | Nam et al. |
| 2022/0210408 A1 | 6/2022 | Zhu et al. |
| 2022/0210433 A1 | 6/2022 | Zhu et al. |
| 2022/0210448 A1 | 6/2022 | Zhu et al. |
| 2022/0217410 A1 | 7/2022 | Wang |
| 2022/0264122 A1 | 8/2022 | Zhu et al. |
| 2022/0272347 A1 | 8/2022 | Zhu et al. |
| 2022/0329794 A1 | 10/2022 | Kotra et al. |
| 2022/0368898 A1 | 11/2022 | Zhu et al. |

FOREIGN PATENT DOCUMENTS

| | | |
|---|---|---|
| CN | 106105205 A | 11/2016 |
| CN | 106416249 A | 2/2017 |
| CN | 107534783 A | 1/2018 |
| CN | 108293124 A | 7/2018 |
| EP | 3507984 A1 | 7/2019 |
| GB | 201217444 D0 | 11/2012 |
| GB | 201810671 D0 | 8/2018 |
| JP | 2015512600 A | 4/2015 |
| TW | 201424378 A | 6/2014 |
| WO | 2014008212 A1 | 1/2014 |
| WO | 2014039547 A1 | 3/2014 |
| WO | 2017052440 A1 | 3/2017 |
| WO | 2018237146 A1 | 12/2018 |
| WO | 2019009776 A1 | 1/2019 |

OTHER PUBLICATIONS

Non Final Office Action from U.S. Appl. No. 17/720,582 dated Nov. 14, 2022.

Abdoli et al. "Intra Block-DPCM with Layer Separation of Screen Content in WC," 2019 IEEE International Conference on Image Processing (ICIP), IEEE, 2019, Sep. 25, 2019, retrieved on Feb. 21, 2021 from <https://ieeexplore.ieee.org/abstract/document/8803389>.

Bross et al. "Versatile Video Coding (Draft 6)," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O2001, 2019.

Bross et al. "Versatile Video Coding (Draft 7)," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P2001, 2019.

(56) References Cited

OTHER PUBLICATIONS

Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.
Gao et al. "AVS—The Chinese Next-Generation Video Coding Standard," National Association Broadcasters, 2004, retrieved on Dec. 16, 2020 from <http://www.avs.org.cn/reference/AVS%20NAB%Paper%20Final03.pdf>.
Gordon et al. "Mismatch on BDPCM Luma/Chroma Contect Indices Between VTM7 and Spec," in Fraunhofer.de [online] Nov. 14, 2019, retrieved Mar. 1, 2021, retrieved from the internet <URL: https://jvet.hhi.fraunhofer.de/trac/vvc/ticket/708>.
"High Efficiency Video Coding," Series H: Audiovisual and Multimedia Systems: Infrastructure of Audiovisual Services—Coding of Moving Video, ITU-T Telecommunication Standardization Sector of ITU, H.265, Feb. 2018.
Marpe et al. "An Adaptive Color Transform Approach and its Application in 4:4:4 Video Coding," 2006 14th European Signal Processing Conference, IEEE, 2006, Spetember 8, 2006, retrieved on Feb. 21, 2021 from <https://ieeexplore.ieee.org/abstract/document/7071266>.
Misra et al. "On Cross Component Adaptive Loop Filter for Video Compression," 2019 Picture Coding Symposium (PCS), Nov. 12-15, 2019, Ningbo, China, retrieved from the internet ?URL:https://ieeexplore.ieee.org/document/8954547>.
Misra et al. "CE5 Common Base: Cross Component Adaptive Loop Filter," Joint Video Experts Team (JVET) of ITU-T SG 16 WP 3 and ISO/IEC JTC 1/SC 29/WG 11 17th Meeting: Brussels, BE, Jan. 7-17, 2020, document JVET-Q0058, 2020.
Norkin et al. "HEVC Deblocking Filter," IEEE Transactions on Circuits and Systems for Video Technology, Dec. 2012, 22(12):1746-1754.
Ramasubramonian et al. "AHG15: On Signalling of Chroma QP Tables," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O0650, 2019.
Rosewarne et al. "High Efficiency Video Coding (HEVC) Test Model 16 (HM 16) Improved Encoder Description Update 7," Joint Collaborative Team on Video Coding (JCT-VC) of ITU-T SG16 WP3 and ISO/IEC JTC1/SC29/WG1125th Meeting: Chengdu, CN, Oct. 14-21, 2016, document JCTVC-Y1002, 2016.
Sullivan et al. "Standardized Extensions of High Efficiency Video Coding (HEVC)," IEEE Journal of Selected Topics in Signal Processing, Dec. 2013, 7(6):1001-1016.
Https://vcgit.hhi.fraunhofer.de/jvet/VVCSoftware_VTM/tags/VTM-6.0.
JEM-7.0: https://jvet.hhi.fraunhofer.de/svn/svn_HMJEMSoftware/tags/ HM-16.6-JEM-.
International Search Report and Written Opinion from International Patent Application No. PCT/US2020/050638 dated Nov. 30, 2020 (8 pages).
International Search Report and Written Opinion from International Patent Application No. PCT/US2020/050644 dated Dec. 18, 2020 (9 pages).
International Search Report and Written Opinion from International Patent Application No. PCT/US2020/050649 dated Feb. 12, 2021 (11 pages).
International Search Report and Written Opinion from International Patent Application No. PCT/US2020/051689 dated Dec. 17, 2020 (9 pages).
International Search Report and Written Opinion from International Patent Application No. PCT/US2020/054959 dated Feb. 12, 2021 (11 pages).
International Search Report and Written Opinion from International Patent Application No. PCT/US2020/055329 dated Jan. 19, 2021 (10 pages).=.
International Search Report and Written Opinion from International Patent Application No. PCT/US2020/055332 dated Jan. 29, 2021 (9 pages).
International Search Report and Written Opinion from International Patent Application No. PCT/US2020/063746 dated Apr. 8, 2021 (14 pages).
International Search Report and Written Opinion from International Patent Application No. PCT/US2020/067264 dated Mar. 23, 2021 (11 pages).
International Search Report and Written Opinion from International Patent Application No. PCT/US2020/067651 dated Mar. 30, 2021 (10 pages).
International Search Report and Written Opinion from International Patent Application No. PCT/US2020/067655 dated Mar. 30, 2021 (10 pages).
Non Final Office Action from U.S. Appl. No. 17/694,305 dated Jun. 9, 2022.
Non Final Office Action from U.S. Appl. No. 17/694,253 dated Jul. 12, 2022.
Non Final Office Action from U.S. Appl. No. 17/720,634 dated Jul. 19, 2022.
Non Final Office Action from U.S. Appl. No. 17/716,447 dated Aug. 4, 2022.
Examination Report from Indian Patent Application No. 202247013800 dated Jul. 21, 2022 (7 pages).
Chen et al. "Algorithm Description for Versatile Video Coding and Test Model 6 (VTM 6)," Joint Video Experts Team (JVET) of ITU-T SG WP 3 and SI/IEC JTC 1/SC 29/WG 11 15th Meeting, Gothenburg, SE, Jul. 3-12, 2019, document JVET-O2002, 2019.
Han et al. "Cu Level Chroma QP Control for WC," Joint Video Experts Team (JVET) of ITU-T SG WP 3 and SI/IEC JTC 1/SC 29/WG 11 15th Meeting, Gothenburg, SE, Jul. 3-12, 2019, document JVET-O1168, 2019.
Kanumuri et al. "Use of Chroma QP Offsets in Deblocking," Joint Collaborative Team on Video Coding (JCT-VC) of ITU-T SG 16 WP 3 and ISO/IEC JTC 1/SC 29/WG 11 11th Meeting, Shanghai, CN, Oct. 10-19, 2012, document JCTVC-K0220, 2012.
Wan et al. "Consistent Chroma QP Derivation in the Deblocking and Inverse Quantization Processes," Joint Collaborative Team on Video Coding (JCT-VC) of ITU-T SG 16 WP 3 and ISO/IEC JTC 1/SC 29/WG 11 11th Meeting, Shanghai, CN, Oct. 10-19, 2012, document JCTVC-K0145, 2012.
Xu et a l. "Non-CE5: Chroma QP Derivation Fix for Deblocking Filter (Combination of JVET-P0105 and JVET-P0539)," Joint Video Experts Team (JVET) of ITU-T SG WP 3 and SI/IEC JTC 1/SC 29/WG 11 16th Meeting, Geneva, CH, Oct. 1-11, 2019, document JVET-P1002, 2019.
Zhao et al. "AHG15: On CU Adaptive Chroma Offset Signalling," Joint Video Experts Team (JVET) of ITU-T SG WP 3 and SI/IEC JTC 1/SC 29/WG 11 16th Meeting, Geneva, CH, Oct. 1-11, 2019, document JVET-P0436, 2019.
Extended European Search Report from European Patent Application No. 20862153.2 dated Oct. 5, 2022 (12 pages).
Extended European Search Report from European Patent Application No. 20876422.5 dated Oct. 20, 2022 (7 pages).
Partial Supplementary European Search Report from European Patent Application No. 20877874.6 dated Oct. 31, 2022 (15 pages).
Non Final Office Action from U.S. Appl. No. 17/856,631 dated Nov. 10, 2022.
Kim et al. "AhG5: Deblocking Filter in 4:4:4 Chroma Format," Joint Collaborative Team on Video Coding (JCT-VC) of ITU-T SG 16 WP 3 and ISO/IEC JTC 1/SC 29/WG 11 15th Meeting: Geneva, CH, Oct. 23-Nov. 1, 2013. document JCTVC-O0089, 2013. (cited in EP20899673.6 EESR dated Dec. 15, 2022).
Misra et al. "Non-CE11: On ISP Transform Boundary Deblocking," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0473, 2019. (cited in EP20899673.6 EESR dated Dec. 15, 2022).
Sjoberg et al. "HEVC High-Level Syntax" In: "High Efficiency Video Coding (HEVC): Algorithms and Architectures" Aug. 23, 2014, Springer, ISBN: 978-3-319-06895-4 pp. 13-48, 301:10.1007/978-3-319-06895-4_2 (cited in EP20899673.6 EESR dated Dec. 15, 2022).
Wan et al. "AHG17: Text for Picture Header," Joint Video Experts Team (JVET) of ITU-T SG 16 WP 3 and ISO/IEC JTC 1/SC 29/WG

(56) References Cited

OTHER PUBLICATIONS 11 16th Meeting: Geneva, CH, Oct. 1-11, 2019, document JVET-P1006,2019. (cited in EP20899673.6 EESR dated Dec. 15, 2022).
Extended European Search Report from European Patent Application No. 20899673.6 dated Dec. 15, 2022 (10 pages).
De-Luxian-Hernandez et al. "Non-CE3/Non-CE8: Enable Transform Skip in CUs Using ISP," Joint Video Experts Team (JVET) of ITU-T SG 16 WP 3 and ISO/IEC JTC 1/SC 29/WG 11 14th Meeting, Geneva, CH, Mar. 19-27, 2019, document JVET-N0401, 2019.
Xiu et al. "On Signaling Adaptive Color Transform at TU Level," Joint Collaborative Team on Video Coding (JCT-VC) of ITU-T SG 16 WP 3 and ISO/IEC JTC 1/SC 29/WG 11 21st Meeting, Warsaw, PL, Jun. 19-26, 2015, document JCTVC-U0106, 2015.
Xu et al. "Non-CE5: Consistent Deblocking for Chroma Components," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O566, 2019.
Extended European Search Report from European Patent Application No. 20909161.0 dated Feb. 7, 2023 (10 pages).
Extended European Search Report from European Patent Application No. 20877874.6 dated Feb. 10, 2023 (17 pages).
Non Final Office Action from U.S. Appl. No. 17/852,934 dated Jan. 12, 2023.
Notice of Allowance from U.S. Appl. No. 17/694,305 dated Feb. 23, 2023.
Non Final Office Action from U.S. Appl. No. 17/810,187 dated Jan. 9, 2023.

\* cited by examiner

applying, in a conversion between a video comprising multiple components and a bitstream representation of the video, a deblocking filter to video blocks of the multiple components, where deblocking filter strength for the deblocking filter of each of the multiple components is determined according to a rule that specifies to use a different manner for determining the deblocking filter strength for the video blocks of each of the multiple components

FIG. 22

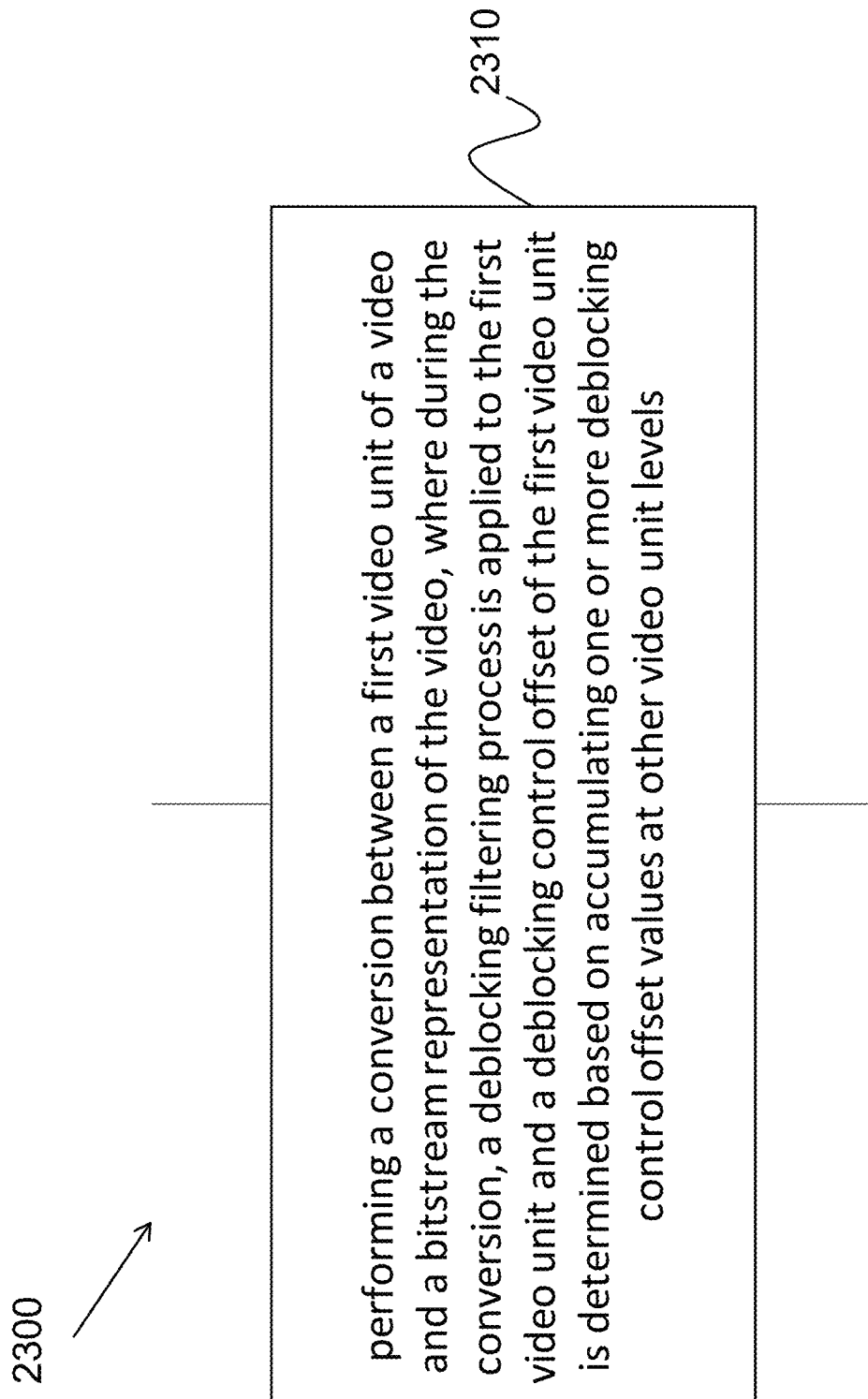

USING QUANTIZATION GROUPS IN VIDEO CODING

CROSS REFERENCE TO RELATED APPLICATIONS

This application is a continuation of International Patent Application No. PCT/US2020/063746, filed on Dec. 8, 2020, which claims the priority to and benefits of International Patent Application No. PCT/CN2019/123951, filed on Dec. 9, 2019, and International Patent Application No. PCT/CN2019/130851, filed on Dec. 31, 2019. All the aforementioned patent applications are hereby incorporated by reference in their entireties.

TECHNICAL FIELD

This patent document relates to video coding techniques, devices and systems.

BACKGROUND

Currently, efforts are underway to improve the performance of current video codec technologies to provide better compression ratios or provide video coding and decoding schemes that allow for lower complexity or parallelized implementations. Industry experts have recently proposed several new video coding tools and tests are currently underway for determining their effectivity.

SUMMARY

Devices, systems and methods related to digital video coding, and specifically, to management of motion vectors are described. The described methods may be applied to existing video coding standards (e.g., High Efficiency Video Coding (HEVC) or Versatile Video Coding) and future video coding standards or video codecs.

In one representative aspect, the disclosed technology can be used to provide a method for video processing. The method includes applying, in a conversion between a video comprising multiple components and a bitstream representation of the video, a deblocking filter to video blocks of the multiple components. A deblocking filter strength for the deblocking filter of each of the multiple components is determined according to a rule that specifies to use a different manner for determining the deblocking filter strength for the video blocks of each of the multiple components.

In another representative aspect, the disclosed technology can be used to provide a method for video processing. The method includes performing a conversion between a first video unit of a video and a bitstream representation of the video. During the conversion, a deblocking filtering process is applied to the first video unit. A deblocking control offset of the first video unit is determined based on accumulating one or more deblocking control offset values at other video unit levels.

In another representative aspect, the disclosed technology can be used to provide a method for video processing. The method includes determining, for a conversion between a block of a video and a bitstream representation of the video, a quantization parameter used in a deblocking process based on usage of a transform skip (TS) mode or an adaptive color transform (ACT) mode for coding the block. The method also includes performing the conversion based on the determining.

In another representative aspect, the disclosed technology can be used to provide a method for video processing. The method includes performing a conversion between a block of a color component of a video and a bitstream representation of the video. The bitstream representation conforms to a rule specifying that a size of a quantization group of the chroma component is greater than a threshold K. The quantization group includes one or more coding units carrying a quantization parameter.

In one representative aspect, the disclosed technology may be used to provide a method for video processing. This method includes performing a conversion between a video unit and a coded representation of the video unit, wherein, during the conversion, a deblocking filter is used on boundaries of the video unit such that when a chroma quantization parameter (QP) table is used to derive parameters of the deblocking filter, processing by the chroma QP table is performed on individual chroma QP values.

In another representative aspect, the disclosed technology may be used to provide another method for video processing. This method includes performing a conversion between a video unit and a bitstream representation of the video unit, wherein, during the conversion, a deblocking filter is used on boundaries of the video unit such that chroma QP offsets are used in the deblocking filter, wherein the chroma QP offsets are at picture/slice/tile/brick/subpicture level.

In another representative aspect, the disclosed technology may be used to provide another method for video processing. This method includes performing a conversion between a video unit and a bitstream representation of the video unit, wherein, during the conversion, a deblocking filter is used on boundaries of the video unit such that chroma QP offsets are used in the deblocking filter, wherein information pertaining to a same luma coding unit is used in the deblocking filter and for deriving a chroma QP offset.

In another representative aspect, the disclosed technology may be used to provide another method for video processing. This method includes performing a conversion between a video unit and a bitstream representation of the video unit, wherein, during the conversion, a deblocking filter is used on boundaries of the video unit such that chroma QP offsets are used in the deblocking filter, wherein an indication of enabling usage of the chroma QP offsets is signaled in the bitstream representation.

In another representative aspect, the disclosed technology may be used to provide another method for video processing. This method includes performing a conversion between a video unit and a bitstream representation of the video unit, wherein, during the conversion, a deblocking filter is used on boundaries of the video unit such that chroma QP offsets are used in the deblocking filter, wherein the chroma QP offsets used in the deblocking filter are identical of whether JCCR coding method is applied on a boundary of the video unit or a method different from the JCCR coding method is applied on the boundary of the video unit.

In another representative aspect, the disclosed technology may be used to provide another method for video processing. This method includes performing a conversion between a video unit and a bitstream representation of the video unit, wherein, during the conversion, a deblocking filter is used on boundaries of the video unit such that chroma QP offsets are used in the deblocking filter, wherein a boundary strength (BS) of the deblocking filter is calculated without comparing reference pictures and/or a number of motion vectors (MVs) associated with the video unit at a P side boundary with reference pictures of the video unit at a Q side boundary.

In another example aspect, another method of video processing is disclosed. The method includes determining, for a conversion between a video unit of a component of a video and a coded representation of the video, a size of a quantization group for the video unit, based on a constraint rule that specifies that the size must be larger than K, where K is a positive number and performing the conversion based on the determining.

Further, in a representative aspect, an apparatus in a video system comprising a processor and a non-transitory memory with instructions thereon is disclosed. The instructions upon execution by the processor, cause the processor to implement any one or more of the disclosed methods.

Additionally, in a representative aspect, a video decoding apparatus comprising a processor configured to implement any one or more of the disclosed methods.

In another representative aspect, a video encoding apparatus comprising a processor configured to implement any one or more of the disclosed methods.

Also, a computer program product stored on a non-transitory computer readable media, the computer program product including program code for carrying out any one or more of the disclosed methods is disclosed.

The above and other aspects and features of the disclosed technology are described in greater detail in the drawings, the description and the claims.

BRIEF DESCRIPTION OF THE DRAWINGS

FIG. 4 shows an example of pixels involved in filter on/off decision and strong/weak filter selection.

FIG. 10 shows examples of blocks at P side and Q side.

FIG. 22 is a flowchart representation of a method for video processing in accordance with the present technology.

FIG. 23 is a flowchart representation of another method for video processing in accordance with the present technology.

DETAILED DESCRIPTION

1. Video Coding in HEVC/H.265

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

2.1. Deblocking Scheme in HEVC

A deblocking filter process is performed for each CU in the same order as the decoding process. First, vertical edges are filtered (horizontal filtering), then horizontal edges are filtered (vertical filtering). Filtering is applied to 8×8 block boundaries which are determined to be filtered, for both luma and chroma components. 4×4 block boundaries are not processed in order to reduce the complexity.

Figure 1:
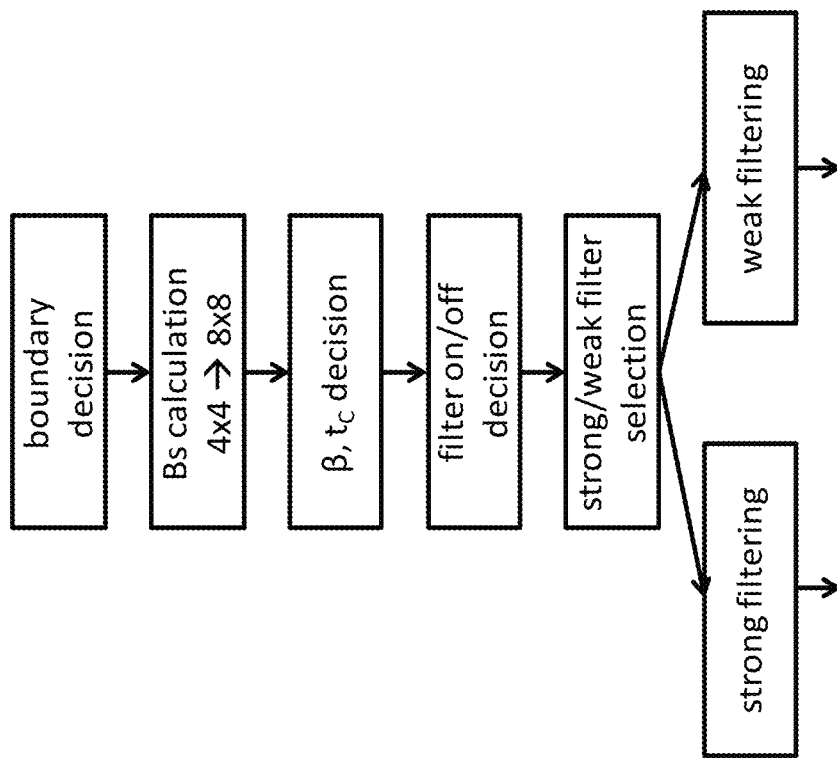
FIG. 1 shows an example of an overall processing flow of a blocking deblocking filter process.

FIG. 1 illustrates the overall processing flow of deblocking filter process. A boundary can have three filtering status: no filtering, weak filtering and strong filtering. Each filtering decision is based on boundary strength, Bs, and threshold values, $\beta$ and $t_C$.

Three kinds of boundaries may be involved in the filtering process: CU boundary, TU boundary and PU boundary. CU boundaries, which are outer edges of CU, are always involved in the filtering since CU boundaries are always also TU boundary or PU boundary. When PU shape is 2N×N (N>4) and RQT depth is equal to 1, TU boundary at 8×8 block grid and PU boundary between each PU inside CU are involved in the filtering. One exception is that when the PU boundary is inside the TU, the boundary is not filtered.

2.1.1. Boundary Strength Calculation

Generally speaking, boundary strength (Bs) reflects how strong filtering is needed for the boundary. If Bs is large, strong filtering should be considered.

Figure 2:
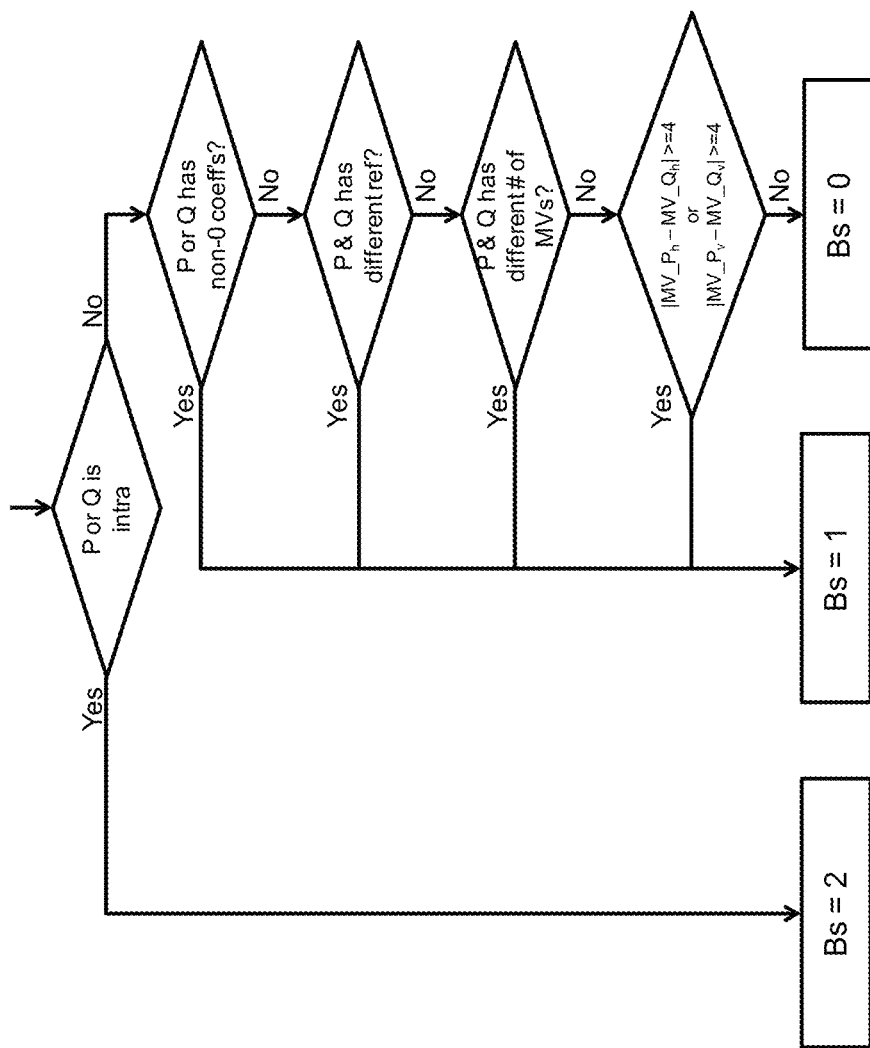
FIG. 2 shows an example of a flow diagram of a Bs calculation.

Let P and Q be defined as blocks which are involved in the filtering, where P represents the block located in left (vertical edge case) or above (horizontal edge case) side of the boundary and Q represents the block located in right (vertical edge case) or above (horizontal edge case) side of the boundary. FIG. 2 illustrates how the Bs value is calculated based on the intra coding mode, existence of non-zero transform coefficients and motion information, reference picture, number of motion vectors and motion vector difference.

Bs is calculated on a 4×4 block basis, but it is re-mapped to an 8×8 grid. The maximum of the two values of Bs which correspond to 8 pixels consisting of a line in the 4×4 grid is selected as the Bs for boundaries in the 8×8 grid.

Figure 3:
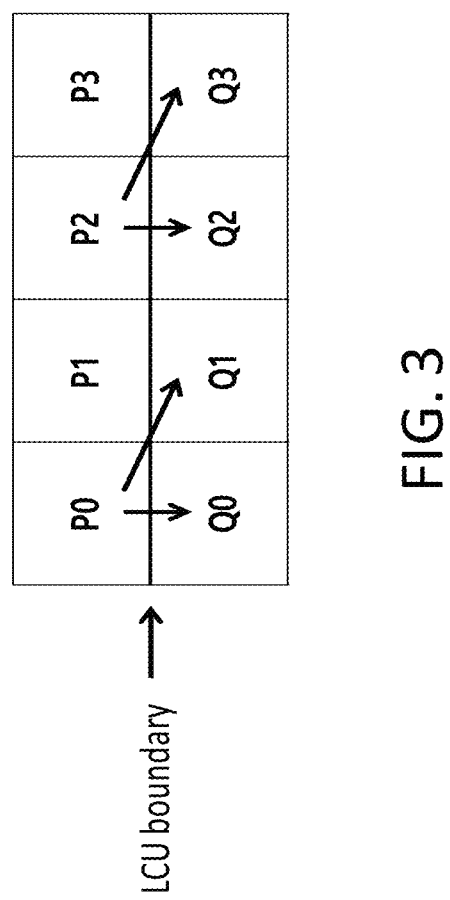
FIG. 3 shows an example of a referred information for Bs calculation at CTU boundary.

In order to reduce line buffer memory requirement, only for CTU boundary, information in every second block (4×4 grid) in left or above side is re-used as depicted in FIG. 3.

2.1.2. $\beta$ and $t_C$ Decision

Threshold values $\beta$ and $t_C$ which involving in filter on/off decision, strong and weak filter selection and weak filtering process are derived based on luma quantization parameter of P and Q blocks, $QP_P$ and $QP_Q$, respectively. Q used to derive $\beta$ and $t_C$ is calculated as follows.

$$Q=((QP_P+QP_Q+1)>>1).$$

A variable $\beta$ is derived as shown in Table 1, based on Q. If Bs is greater than 1, the variable $t_C$ is specified as Table 1 with Clip3(0, 55, Q+2) as input. Otherwise (BS is equal or less than 1), the variable $t_C$ is specified as Table 1 with Q as input.

If dp0+dq0+dp3+dq3<$\beta$, filtering for the first four lines is turned on and strong/weak filter selection process is applied. Each variable is derived as follows.

$$dp0 = |p_{2,0} - 2*p_{1,0} + p_{0,0}|, dp3 = |p_{2,3} - 2*p_{1,3} + p_{0,3}|,$$

$$dp4 = |p_{2,4} - 2*p_{1,4} + p_{0,4}|, dp7 = |p_{2,7} - 2*p_{1,7} + p_{0,7}|$$

$$dq0 = |p_{2,0} - 2*p_{1,0} + p_{0,0}|, dq3 = |p_{2,3} - 2*p_{1,3} + p_{0,3}|,$$

$$dq4 = |p_{2,4} - 2*p_{1,4} + p_{0,4}|, dq7 = |p_{2,7} - 2*p_{1,7} + p_{0,7}|$$

If the condition is not met, no filtering is done for the first 4 lines. Additionally, if the condition is met, dE, dEp1 and dEp2 are derived for weak filtering process. The variable dE is set equal to 1. If dp0+dp3<($\beta$+($\beta$>>1))>>3, the variable dEp1 is set equal to 1. If dq0+dq3<($\beta$+($\beta$>>1))>>3, the variable dEq1 is set equal to 1.

For the second four lines, decision is made in a same fashion with above.

2.1.4. Strong/Weak Filter Selection for 4 Lines

Figure 4:
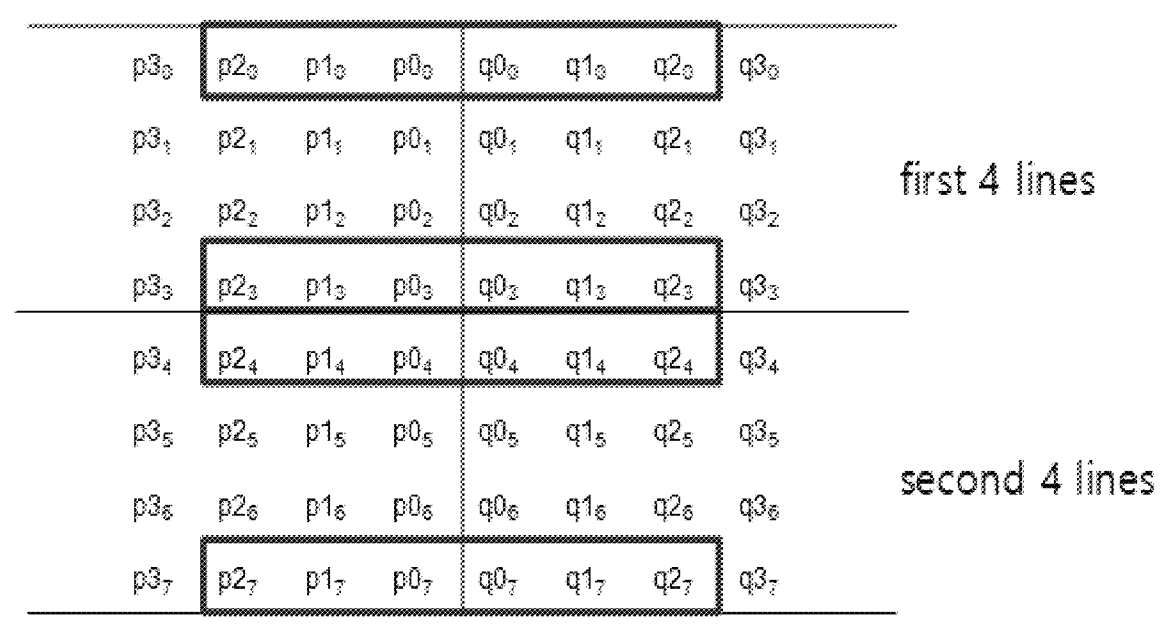

After the first four lines are determined to filtering on in filter on/off decision, if following two conditions are met, strong filter is used for filtering of the first four lines. Otherwise, weak filter is used for filtering. Involving pixels are same with those used for filter on/off decision as depicted in FIG. 4.

2*(dp0+dq0)<($\beta$>>2),|p3$_0$−p0$_0$|+|q0$_0$−q3$_0$|<($\beta$>>3)
    and |p0$_0$−q0$_0$|<(5*$t_C$+1)>>1             1)

2*(dp3+dq3)<($\beta$>>2),|p3$_3$−p0$_3$|+|q0$_3$−q3$_3$|<($\beta$>>3)
    and |p0$_3$−q0$_3$|<(5*$t_C$+1)>>1             2)

As a same fashion, if following two conditions are met, strong filter is used for filtering of the second 4 lines. Otherwise, weak filter is used for filtering.

2*(dp4+dq4)<($\beta$>>2),|p3$_4$−p0$_4$|+|q0$_4$−q3$_4$|<($\beta$>>3)
    and |p0$_4$−q0$_4$|<(5*$t_C$+1)>>1             1)

2*(dp7+dq7)<($\beta$>>2),|p3$_7$−p0$_7$|+|q0$_7$−q3$_7$|<($\beta$>>3)
    and |p0$_7$−q0$_7$|<(5*$t_C$+1)>>1             2)

TABLE 1

Derivation of threshold variables $\beta$ and $t_C$ from input Q

| Q | 0 | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|----|----|----|----|----|----|----|----|----|
| $\beta$ | 0 | 0 | 0 | 0 | 0 | 0 | 0 | 0 | 0 | 0 | 0 | 0 | 0 | 0 | 0 | 0 | 6 | 7 | 8 |
| tc | 0 | 0 | 0 | 0 | 0 | 0 | 0 | 0 | 0 | 0 | 0 | 0 | 0 | 0 | 0 | 0 | 0 | 0 | 1 |

| Q | 19 | 20 | 21 | 22 | 23 | 24 | 25 | 26 | 27 | 28 | 29 | 30 | 31 | 32 | 33 | 34 | 35 | 36 | 37 |
|---|----|----|----|----|----|----|----|----|----|----|----|----|----|----|----|----|----|----|----|
| $\beta$ | 9 | 10 | 11 | 12 | 13 | 14 | 15 | 16 | 17 | 18 | 20 | 22 | 24 | 26 | 28 | 30 | 32 | 34 | 36 |
| tc | 1 | 1 | 1 | 1 | 1 | 1 | 1 | 1 | 2 | 2 | 2 | 2 | 3 | 3 | 3 | 3 | 4 | 4 | 4 |

| Q | 38 | 39 | 40 | 41 | 42 | 43 | 44 | 45 | 46 | 47 | 48 | 49 | 50 | 51 | 52 | 53 | 54 | 55 |
|---|----|----|----|----|----|----|----|----|----|----|----|----|----|----|----|----|----|----|
| $\beta$ | 38 | 40 | 42 | 44 | 46 | 48 | 50 | 52 | 54 | 56 | 58 | 60 | 62 | 64 | 64 | 64 | 64 | 64 |
| tc | 5 | 5 | 6 | 6 | 7 | 8 | 9 | 9 | 10 | 10 | 11 | 11 | 12 | 12 | 13 | 13 | 14 | 14 |

2.1.3. Filter on/Off Decision for 4 Lines

Filter on/off decision is done for four lines as a unit. FIG. 4 illustrates the pixels involving in filter on/off decision. The 6 pixels in the two red boxes for the first four lines are used to determine filter on/off for 4 lines. The 6 pixels in two red boxes for the second 4 lines are used to determine filter on/off for the second four lines.

2.1.4.1. Strong Filtering

For strong filtering, filtered pixel values are obtained by following equations. It is worth to note that three pixels are modified using four pixels as an input for each P and Q block, respectively.

$$p_0'=(p_2+2*p_1+2*p_0+2*q_0+q_1+4)>>3$$

$$q_0'=(p_1+2*p_0+2*q_0+2*q_1+q_2+4)>>3$$

$$p_1' = (p_2 + p_1 + p_0 + q_0 + 2) \gg 2$$

$$q_1' = (p_0 + q_0 + q_1 + q_2 + 2) \gg 2$$

$$p_2' = (2*p_3 + 3*p_2 + p_1 + p_0 + q_0 + 4) \gg 3$$

$$q_2' = (p_0 + q_0 + q_1 + 3*q_2 + 2*q_3 + 4) \gg 3$$

2.1.4.2. Weak Filtering

Let's define $\Delta$ as follows.

$$\Delta = (9*(q_0 - p_0) - 3*(q_1 - p_1) + 8) \gg 4$$

When abs($\Delta$) is less than $t_C*10$, $$\Delta = \text{Clip3}(-t_C, t_C, \Delta)$$

$$p_0' = \text{Clip1}_Y(p_0 + \Delta)$$

$$q_0' = \text{Clip1}_Y(q_0 - \Delta)$$

If dEp1 is equal to 1, $$\Delta p = \text{Clip3}(-(t_C \gg 1), t_C \gg 1,$$
$$(((p_2 + p_0 + 1) \gg 1) - p_1 + \Delta) \gg 1)$$

$$p_1' = \text{Clip1}_Y(p_1 + \Delta p)$$

If dEq1 is equal to 1, $$\Delta q = \text{Clip3}(-(t_C \gg 1), t_C \gg 1,$$
$$(((q_2 + q_0 + 1) \gg 1) - q_1 - \Delta) \gg 1)$$

$$q_1' = \text{Clip1}_Y(q_1 + \Delta q)$$

It is worth to note that maximum two pixels are modified using three pixels as an input for each P and Q block, respectively.

2.1.4.3. Chroma Filtering

Bs of chroma filtering is inherited from luma. If Bs>1 or if coded chroma coefficient existing case, chroma filtering is performed. No other filtering decision is there. And only one filter is applied for chroma. No filter selection process for chroma is used. The filtered sample values $p_0'$ and $q_0'$ are derived as follows.

$$\Delta = \text{Clip3}(-t_C, t_C, (((((q_0 - p_0) \ll 2) + p_1 - q_1 + 4) \gg 3))$$

$$p_0' = \text{Clip1}_C(p_0 + \Delta)$$

$$q_0' = \text{Clip1}_C(q_0 - \Delta)$$

2.2 Deblocking Scheme in VVC

In the VTM6, deblocking filtering process is mostly the same to those in HEVC. However, the following modifications are added.

A) The filter strength of the deblocking filter dependent of the averaged luma level of the reconstructed samples.
B) Deblocking tC table extension and adaptation to 10-bit video.
C) 4×4 grid deblocking for luma.
D) Stronger deblocking filter for luma.
E) Stronger deblocking filter for chroma.
F) Deblocking filter for subblock boundary.
G) Deblocking decision adapted to smaller difference in motion.

Figure 5:
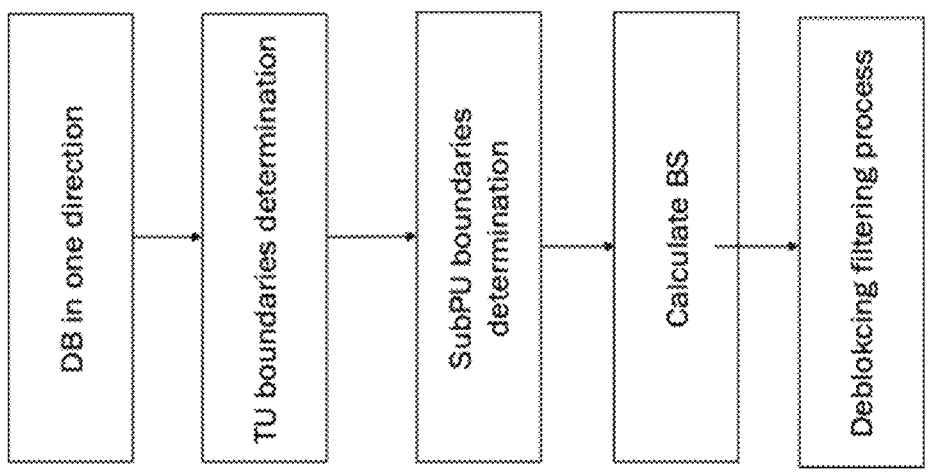
FIG. 5 shows an example of an overall processing flow of deblocking filter process in VVC.

FIG. 5 depicts a flowchart of deblocking filters process in VVC for a coding unit.

2.2.1. Filter Strength Dependent on Reconstructed Average Luma

In HEVC, the filter strength of the deblocking filter is controlled by the variables $\beta$ and $t_C$ which are derived from the averaged quantization parameters $qP_L$. In the VTM6, deblocking filter controls the strength of the deblocking filter by adding offset to $qP_L$ according to the luma level of the reconstructed samples if the SPS flag of this method is true. The reconstructed luma level LL is derived as follow:

$$LL = ((p_{0,0} + p_{0,3} + q_{0,0} + q_{0,3}) \gg 2)/(1 \ll \text{bitDepth}) \quad (3\text{-}1)$$

where, the sample values $p_{i,k}$ and $q_{i,k}$ with i=0 . . . 3 and k=0 and 3 can be derived. Then LL is used to decide the offset qpOffset based on the threshold signaled in SPS. After that, the $qP_L$, which is derived as follows, is employed to derive the $\beta$ and $t_C$.

$$qP_L = ((Qp_Q + Qp_P + 1) \gg 1) + qp\text{Offset} \quad (3\text{-}2)$$

where $Qp_Q$ and $Qp_P$ denote the quantization parameters of the coding units containing the sample $q_{0,0}$ and $p_{0,0}$, respectively. In the current VVC, this method is only applied on the luma deblocking process.

2.2.2. 4×4 Deblocking Grid for Luma

HEVC uses an 8×8 deblocking grid for both luma and chroma. In VTM6, deblocking on a 4×4 grid for luma boundaries was introduced to handle blocking artifacts from rectangular transform shapes. Parallel friendly luma deblocking on a 4×4 grid is achieved by restricting the number of samples to be deblocked to 1 sample on each side of a vertical luma boundary where one side has a width of 4 or less or to 1 sample on each side of a horizontal luma boundary where one side has a height of 4 or less.

2.2.3. Boundary Strength Derivation for Luma

The detailed boundary strength derivation could be found in Table 2. The conditions in Table 2 are checked sequentially.

TABLE 2

| Boundary strength derivation | | | |
|---|---|---|---|
| Conditions | Y | U | V |
| P and Q are BDPCM | 0 | N/A | N/A |
| P or Q is intra | 2 | 2 | 2 |
| It is a transform block edge, and P or Q is CIIP | 2 | 2 | 2 |
| It is a transform block edge, and P or Q has non-zero transform coefficients | 1 | 1 | 1 |
| It is a transform block edge, and P or Q is JCCR | N/A | 1 | 1 |
| P and Q are in different coding modes | 1 | 1 | 1 |
| One or more of the following conditions are true: | 1 | N/A | N/A |
| 1.     P and Q are both IBC, and the BV distance >= half-pel in x- or y-di | | | |

TABLE 2-continued

| Boundary strength derivation | | | | |
|---|---|---|---|---|
| | Conditions | Y | U | V |
| 2. | P and Q have different ref pictures*, or have different number of MVs | | | |
| 3. | Both P and Q have only one mv, and the MV distance >= half-pel in x- or y-dir | | | |
| 4. | P has two MVs pointing to two different ref pictures, and P and Q have same ref pictures in the list 0, the MV pair in the list 0 or list 1 has a distance >= half-pel in x- or y-dir | | | |
| 5. | P has two MVs pointing to two different ref pictures, and P and Q have different ref pictures in the list 0, the MV of P in the list 0 and the MV of Q in the list 1 have the distance >= half-pel in x- or y-dir, or the MV of P in the list 1 and the MV of Q in the list 0 have the distance >= half-pel in x- or y-dir | | | |
| 6. | Both P and Q have two MVs pointing to the same ref pictures, and both of the following two conditions are satisfied: The MV of P in the list 0 and the MV of Q in the list 0 has a distance >= half-pel in x- or y-dir or the MV of P in the list 1 and the MV of Q in the list 1 has a distance >= half-pel in x- or y-dir The MV of P in the list 0 and the MV of Q in the list 1 has a distance >= half-pel in x- or y-dir or the MV of P in the list 1 and the MV of Q in the list 0 has a distance >= half-pel in x- or y-dir | | | |
| *Note: The determination of whether the reference pictures used for the two coding sublocks are the same or different is based only on which pictures are referenced, without regard to whether a prediction is formed using an index into reference picture list 0 or an index into reference picture list 1, and also without regard to whether the index position within a reference picture list is different. | | | | |
| Otherwise | | 0 | 0 | 0 |

2.2.4. Stronger Deblocking Filter for Luma

The proposal uses a bilinear filter when samples at either one side of a boundary belong to a large block. A sample belonging to a large block is defined as when the width>=32 for a vertical edge, and when height>=32 for a horizontal edge.

The bilinear filter is listed below.

Block boundary samples pi for i=0 to Sp−1 and qi for j=0 to Sq−1 (pi and qi follow the definitions in HEVC deblocking described above) are then replaced by linear interpolation as follows:

$$p_i'(f_i*Middle_{s,t}+(64-f_i)*P_s+32)>>6), \text{clipped to } p_i \pm tcPD_i$$

$$q_j(g_j*Middle_{s,t}+(64-g_j)*Q_s+32)>>6), \text{clipped to } q_j \pm tcPD_j$$

where $tcPD_i$ and $tcPD_j$ term is a position dependent clipping described in Section 2.2.5 and $g_j$, $f_i$, $Middle_{s,t}$, $P_s$ and $Q_s$ are given below:

| Sp, Sq | |
|---|---|
| 7, 7 (p side: 7, q side: 7) | $f_i = 59 - i * 9$, can also be described as $f = \{59, 50, 41, 32, 23, 14, 5\}$<br>$g_j = 59 - j * 9$, can also be described as $g = \{59, 50, 41, 32, 23, 14, 5\}$<br>$Middle_{7,7} = (2 * (p_o + q_o) + p_1 + q_1 + p_2 + q_2 + p_3 + q_3 + p_4 + q_4 + p_5 + q_5 + p_6 + q_6 + 8) >> 4$<br>$P_7 = (p_6 + p_7 + 1) >> 1$, $Q_7 = (q_6 + q_7 + 1) >> 1$ |
| 7, 3 (p side: 7 q side: 3) | $f_i = 59 - i * 9$, can also be described as $f = \{59, 50, 41, 32, 23, 14, 5\}$<br>$g_j = 53 - j * 21$, can also be described as $g = \{53, 32, 11\}$<br>$Middle_{7,3} = (2 * (p_o + q_o) + q_o + 2 * (q_1 + q_2) + p_1 + q_1 + p_2 + p_3 + p_4 + p_5 + p_6 + 8) >> 4$<br>$P_7 = (p_6 + p_7 + 1) >> 1$, $Q_3 = (q_2 + q_3 + 1) >> 1$ |
| 3, 7 (p side: 3 q side: 7) | $g_j = 59 - j * 9$, can also be described as $g = \{59, 50, 41, 32, 23, 14, 5\}$<br>$f_i = 53 - i * 21$, can also be described as $f = \{53, 32, 11\}$<br>$Middle_{3,7} = (2 * (q_o + p_o) + p_0 + 2 * (p_1 + p_2) + q_1 + p_1 + q_2 + q_3 + q_4 + q_5 + q_6 + 8) >> 4$<br>$Q_7 = (q_6 + q_7 + 1) >> 1$, $P_3 = (p_2 + p_3 + 1) >> 1$ |
| 7, 5 (p side: 7 q side: 5) | $g_j = 58 - j * 13$, can also be described as $g = \{58, 45, 32, 19, 6\}$<br>$f_i = 59 - i * 9$, can also be described as $f = \{59, 50, 41, 32, 23, 14, 5\}$<br>$Middle_{7,5} = (2 * (p_o + q_o + p_1 + q_1) + q_2 + p_2 + q_3 + p_3 + q_4 + p_4 + q_5 + q_5 + 8) >> 4$<br>$Q_5 = (q_4 + q_5 + 1) >> 1$, $P_7 = (p_6 + p_7 + 1) >> 1$ |
| 5, 7 (p side: 5 q side: 7) | $g_j = 59 - j * 9$, can also be described as $g = \{59, 50, 41, 32, 23, 14, 5\}$<br>$f_i = 58 - i * 13$, can also be described as $f = \{58, 45, 32, 19, 6\}$<br>$Middle_{5,7} = (2 * (q_o + p_o + p_1 + q_1) + q_2 + p_2 + q_3 + p_3 + q_4 + p_4 + q_5 + p_5 + 8) >> 4$<br>$Q_7 = (q_6 + q_7 + 1) >> 1$, $P_5 = (p_4 + p_5 + 1) >> 1$ |

| | |
|---|---|
| 5, 5<br>(p side: 5<br>q side: 5) | $g_j = 58 - j * 13$, can also be described as $g = \{58, 45, 32, 19, 6\}$<br>$f_i = 58 - i * 13$, can also be described as $f = \{58, 45, 32, 19, 6\}$<br>Middle5, 5 = $(2 * (q_o + p_o + p_1 + q_1 + q_2 + p_2) + q_3 + p_3 + q_4 + p_4 + 8) >> 4$<br>$Q_5 = (q_4 + q_5 + 1) >> 1$, $P_5 = (p_4 + p_5 + 1) >> 1$ |
| 5, 3<br>(p side: 5<br>q side: 3) | $g_j = 53 - j * 21$, can also be described as $g = \{53, 32, 11\}$<br>$f_i = 58 - i * 13$, can also be described as $f = \{58, 45, 32, 19, 6\}$<br>Middle5, 3 = $(q_o + p_o + p_1 + q_1 + q_2 + p_2 + q_3 + p_3 + 4) >> 3$<br>$Q_3 = (q_2 + q_3 + 1) >> 1$, $P_5 = (p_4 + p_5 + 1) >> 1$ |
| 3, 5<br>(p side: 3<br>q side: 5) | $g_j = 58 - j * 13$, can also be described as $g = \{58, 45, 32, 19, 6\}$<br>$f_i = 53 - i * 21$, can also be described as $f = \{53, 32, 11\}$<br>Middle3, 5 = $(q_o + p_o + p_1 + q_1 + q_2 + p_2 + q_3 + p_3 + 4) >> 3$<br>$Q_5 = (q_4 + q_5 + 1) >> 1$, $P_3 = (p_2 + p_3 + 1) >> 1$ |

2.2.5. Deblocking Control for Luma

The deblocking decision process is described in this sub-section.

Wider-stronger luma filter is filters are used only if all of the Condition1, Condition2 and Condition 3 are TRUE.

The condition 1 is the "large block condition". This condition detects whether the samples at P-side and Q-side belong to large blocks, which are represented by the variable bSidePisLargeBlk and bSideQisLargeBlk respectively. The bSidePisLargeBlk and bSideQisLargeBlk are defined as follows.

bSide*P*isLargeBlk=((edge type is vertical and $p_0$
 belongs to *CU* with width>=32)||(edge type is
 horizontal and $p_0$ belongs to *CU* with
 height>=32))?TRUE: FALSE bSide*Q*isLargeBlk=((edge type is vertical and $q_0$
 belongs to *CU* with width>=32)||(edge type is
 horizontal and $q_0$ belongs to *CU* with
 height>=32))?TRUE: FALSE Based on bSidePisLargeBlk and bSideQisLargeBlk, the condition 1 is defined as follows.

Condition1=(*b*Side*P*isLargeBlk||*b*Side*P*isLargeBlk)?
 TRUE: FALSE

Next, if Condition 1 is true, the condition 2 will be further checked. First, the following variables are derived:

```
dp0, dp3, dq0, dq3 are first derived as in HEVC
if (p side is greater than or equal to 32)
    dp0 = ( dp0 + Abs( p5,0 − 2 * p4,0 + p3,0 ) + 1 ) >> 1
    dp3 = ( dp3 + Abs( p5,3 − 2 * p4,3 + p3,3 ) + 1 ) >> 1
if (q side is greater than or equal to 32)
    dq0 = ( dq0 + Abs( q5,0 − 2 * q4,0 + q3,0 ) + 1 ) >> 1
    dq3 = ( dq3 + Abs( q5,3 − 2 * q4,3 + q3,3 ) + 1 ) >> 1
dpq0, dpq3, dp, dq, d are then derived as in HEVC.
```

Then the condition 2 is defined as follows.

Condition2=(*d*<β)?TRUE: FALSE

Where d=dp0+dq0+dp3+dq3, as shown in section 2.1.4.

If Condition1 and Condition2 are valid it is checked if any of the blocks uses sub-blocks:

```
If(bSidePisLargeBlk)
    If(mode block P == SUBBLOCKMODE)
        Sp =5
    else
        Sp =7
else
    Sp = 3
If(bSideQisLargeBlk)
    If(mode block Q == SUBBLOCKMODE)
        Sq =5
    else
        Sq =7
else
    Sq = 3
```

Finally, if both the Condition 1 and Condition 2 are valid, the proposed deblocking method will check the condition 3 (the large block Strongfilter condition), which is defined as follows. In the Condition3 StrongFilterCondition, the following variables are derived:

```
dpq is derived as in HEVC.
sp3 = Abs(p3 − p0 ), derived as in HEVC
if (p side is greater than or equal to 32)
    if(Sp==5)
        sp3 = ( sp3 + Abs( p5 − p3 ) + 1 ) >> 1
    else
        sp3 = ( sp3 + Abs( p7 − p3 ) + 1 ) >> 1
sq3 = Abs( q0 − q3 ), derived as in HEVC
if (q side is greater than or equal to 32)
    If(Sq==5)
        sq3 = ( sq3 + Abs( q5 − q3 ) + 1 ) >> 1
    else
        sq3 = ( sq3 + Abs( q7 − q3 ) + 1 ) >> 1
```

Figure 6:
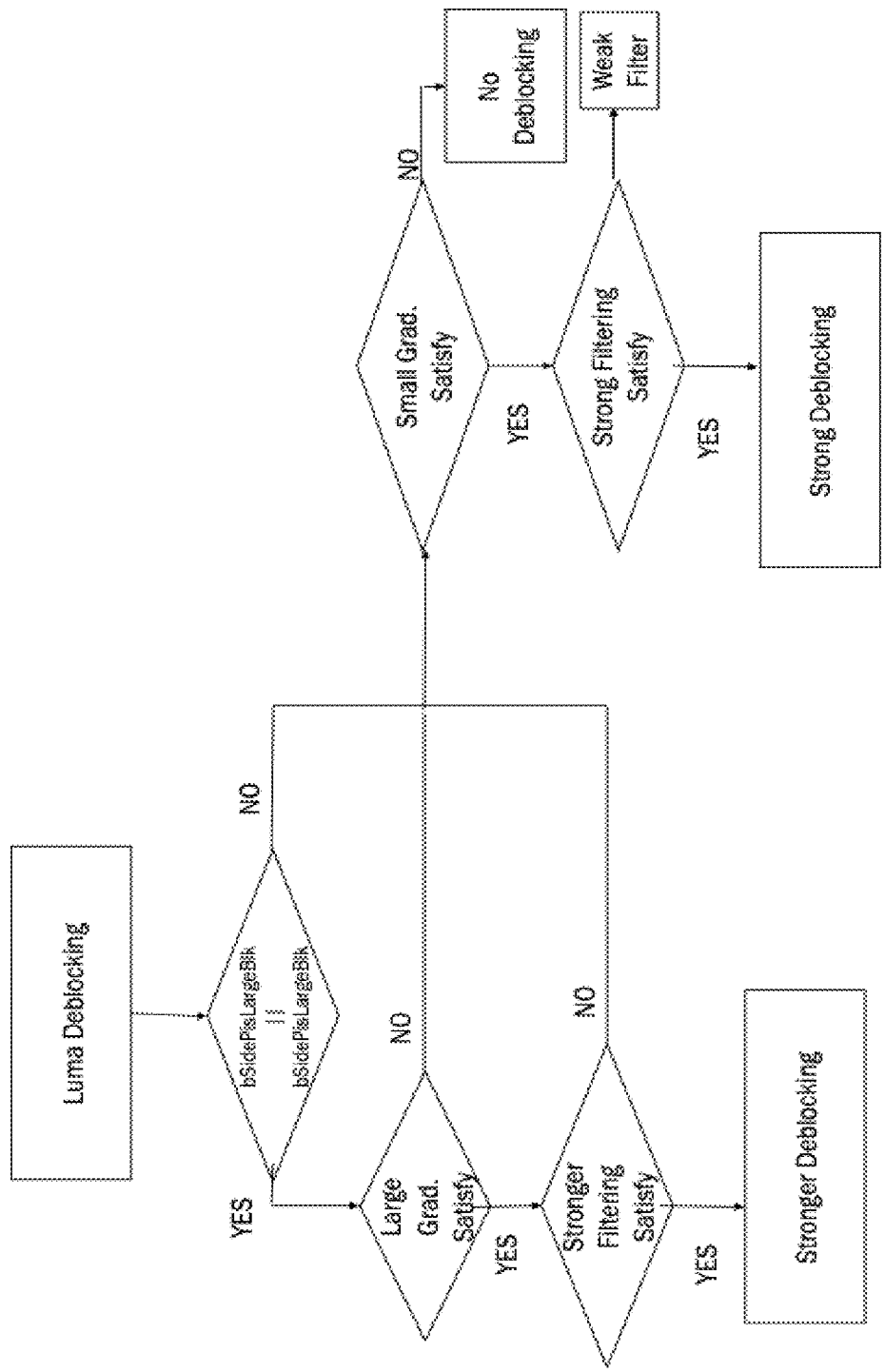
FIG. 6 shows an example of a luma deblocking filter process in VVC.

As in HEVC derive, StrongFilterCondition=(dpq is less than (β>>2), sp3+sq3 is less than (3*β>>5), and Abs(p0-q0) is less than (5*tC+1)>>1)? TRUE: FALSE FIG. 6 depicts the flowchart of luma deblocking filter process.

2.2.6. Strong Deblocking Filter for Chroma

The following strong deblocking filter for chroma is defined:

$p_2'=(3*p_3+2*p_2+p_1+p_0+q_0+4)>>3$ $p_1'=(2*p_3+P_2+2*p_1+p_0+q_0+q_1+4)>>3$ $p_0'=(p_3+p_2+p_1+2*p_0+q_0+q_1+q_2+4)>>3$

The proposed chroma filter performs deblocking on a 4×4 chroma sample grid.

2.2.7. Deblocking Control for Chroma

The above chroma filter performs deblocking on a 8×8 chroma sample grid. The chroma strong filters are used on both sides of the block boundary. Here, the chroma filter is selected when both sides of the chroma edge are greater than or equal to 8 (in unit of chroma sample), and the following decision with three conditions are satisfied. The first one is for decision of boundary strength as well as large block. The second and third one are basically the same as for HEVC luma decision, which are on/off decision and strong filter decision, respectively.

Figure 7:
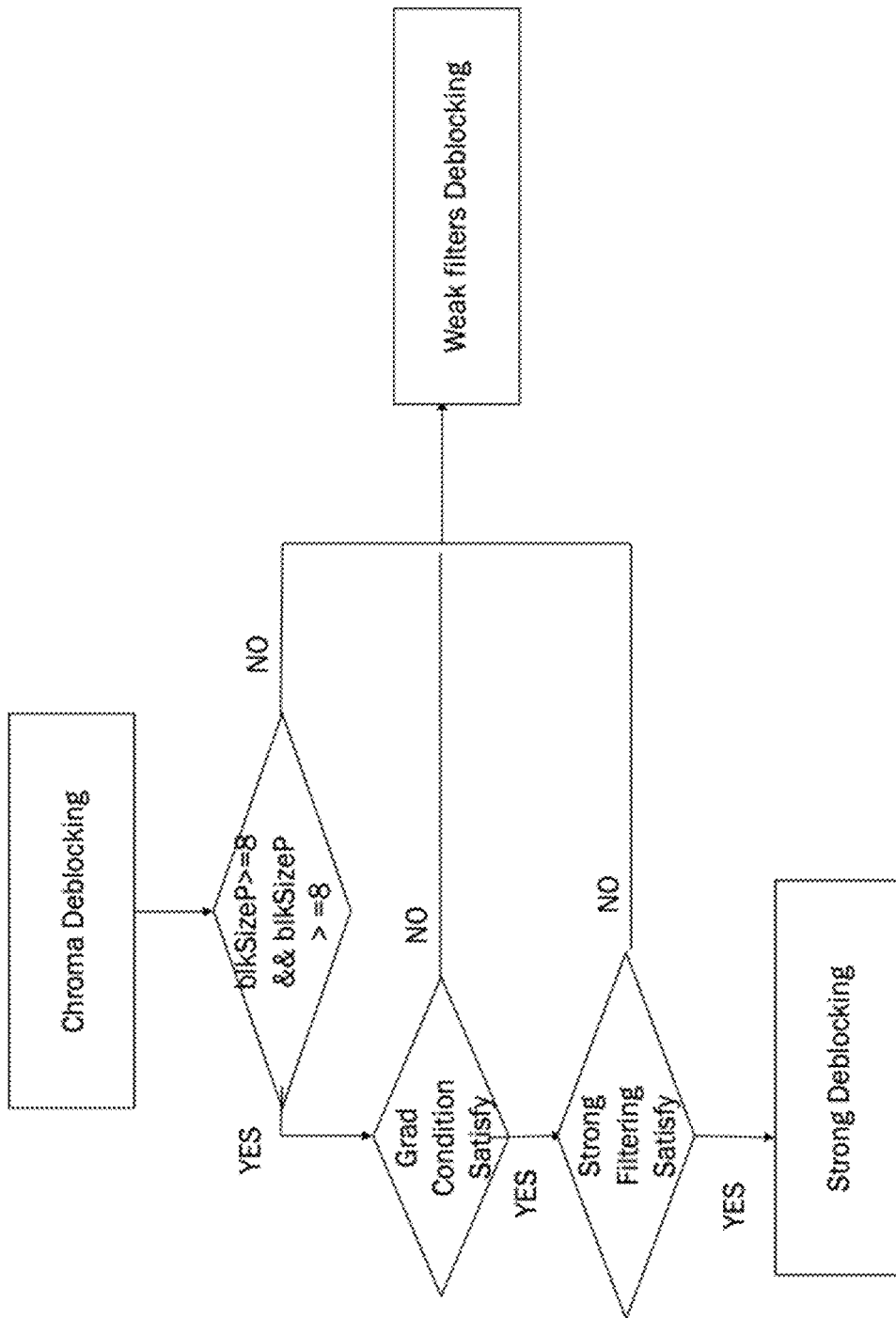
FIG. 7 shows an example of a chroma deblocking filter process in VVC

FIG. 7 depicts the flowchart of chroma deblocking filter process.

2.2.8. Position Dependent Clipping

The proposal also introduces a position dependent clipping tcPD which is applied to the output samples of the luma filtering process involving strong and long filters that are modifying 7, 5 and 3 samples at the boundary. Assuming quantization error distribution, it is proposed to increase clipping value for samples which are expected to have higher quantization noise, thus expected to have higher deviation of the reconstructed sample value from the true sample value.

For each P or Q boundary filtered with proposed asymmetrical filter, depending on the result of decision making process described in Section 2.2, position dependent threshold table is selected from Tc7 and Tc3 tables that are provided to decoder as a side information:

$Tc7=\{6,5,4,3,2,1,1\};$ $Tc3=\{6,4,2\};$ $tcPD=(SP==3)?Tc3: Tc7;$ $tcQD=(SQ==3)?Tc3:Tc7;$

For the P or Q boundaries being filtered with a short symmetrical filter, position dependent threshold of lower magnitude is applied:

$Tc3=\{3,2,1\};$

Following defining the threshold, filtered p'i and q'i sample values are clipped according to tcP and tcQ clipping values:

$p''_i=\text{clip3}(p'_i+tcP_i, p'_i-tcP_i, p'_i);$ $q''_j=\text{clip3}(q'_j+tcQ_j, q'_j-tcQ_j, q'_j);$ where $p'_i$ and $q'_i$ are filtered sample values, $p''_i$ and $q''_j$ are output sample value after the clipping and $tcP_i$, $tcP_i$ are clipping thresholds that are derived from the VVC tc parameter and tcPD and tcQD. Term clip3 is a clipping function as it is specified in VVC.

2.2.9. Sub-Block Deblocking Adjustment

To enable parallel friendly deblocking using both long filters and sub-block deblocking the long filters is restricted to modify at most 5 samples on a side that uses sub-block deblocking (AFFINE or ATMVP) as shown in the luma control for long filters. Additionally, the sub-block deblocking is adjusted such that that sub-block boundaries on an 8×8 grid that are close to a CU or an implicit TU boundary is restricted to modify at most two samples on each side.

Following applies to sub-block boundaries that not are aligned with the CU boundary.

Figure 8:
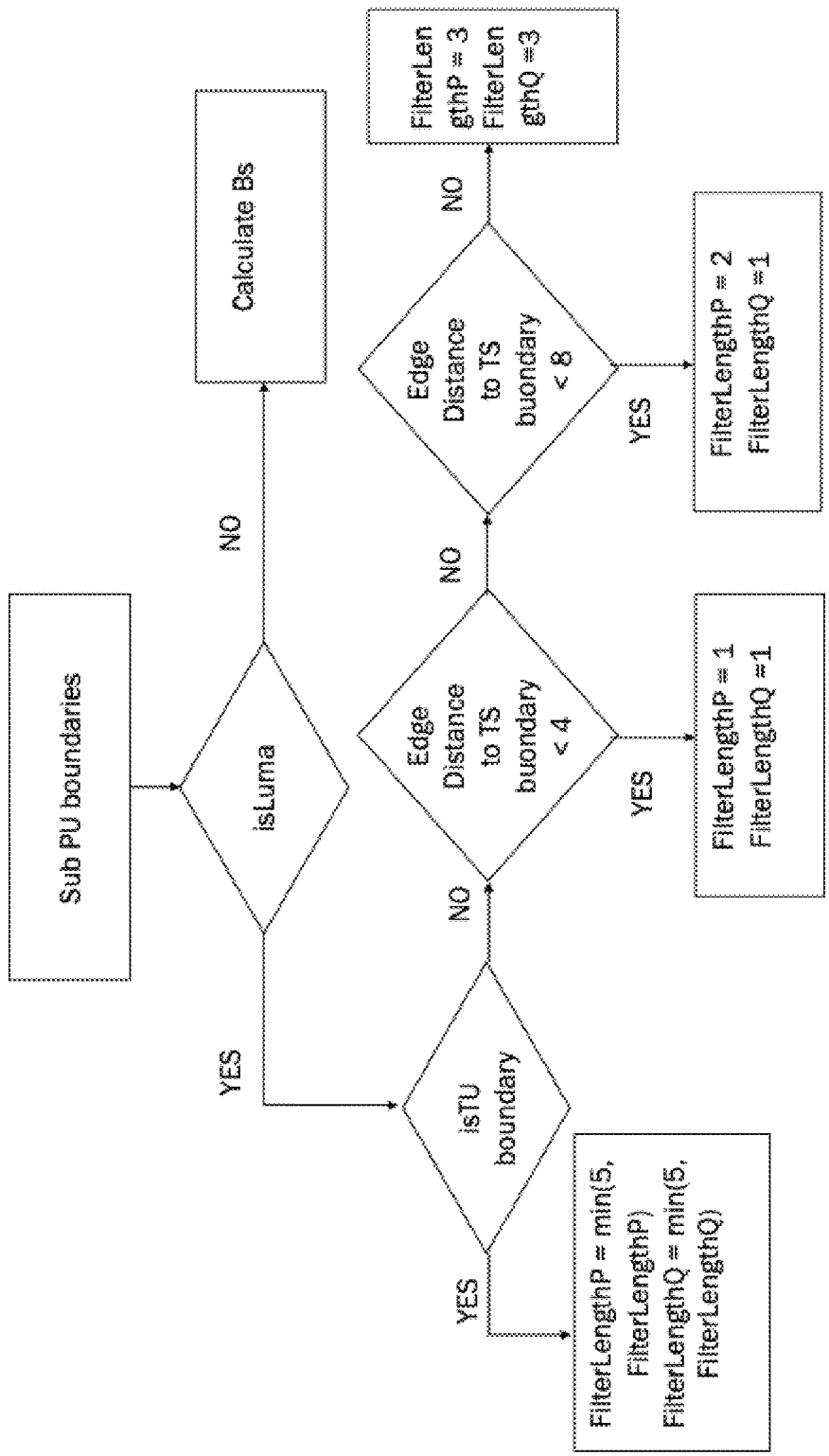
FIG. 8 shows an example of a filter length determination for sub PU boundaries.

```
If(mode block Q == SUBBLOCKMODE && edge!=0){
   if (!(implicitTU && (edge == (64 / 4))))
      if (edge == 2 || edge == (orthogonalLength - 2) || edge == (56 / 4) ||
         edge == (72 / 4))
            Sp = Sq = 2;
         else
            Sp = Sq = 3;
      else
         Sp = Sq = bSideQisLargeBlk? 5:3
}
```

Where edge equal to 0 corresponds to CU boundary, edge equal to 2 or equal to orthogonalLength-2 corresponds to sub-block boundary 8 samples from a CU boundary etc. Where implicit TU is true if implicit split of TU is used. FIG. 8 show the flowcharts of determination process for TU boundaries and sub-PU boundaries.

Filtering of horizontal boundary is limiting Sp=3 for luma, Sp=1 and Sq=1 for chroma, when the horizontal boundary is aligned with the CTU boundary.

2.2.10. Deblocking Decision Adapted to Smaller Difference in Motion

HEVC enables deblocking of a prediction unit boundary when the difference in at least one motion vector component between blocks on respective side of the boundary is equal to or larger than a threshold of 1 sample. In VTM6, a threshold of a half luma sample is introduced to also enable removal of blocking artifacts originating from boundaries between inter prediction units that have a small difference in motion vectors.

2.3. Combined Inter and Intra Prediction (CHIP)

In VTM6, when a CU is coded in merge mode, if the CU contains at least 64 luma samples (that is, CU width times CU height is equal to or larger than 64), and if both CU width and CU height are less than 128 luma samples, an additional flag is signalled to indicate if the combined inter/intra prediction (CIIP) mode is applied to the current CU. As its name indicates, the CIIP prediction combines an inter prediction signal with an intra prediction signal. The inter prediction signal in the CIIP mode $P_{inter}$ is derived using the same inter prediction process applied to regular merge mode; and the intra prediction signal $P_{intra}$ is derived following the regular intra prediction process with the planar mode. Then, the intra and inter prediction signals are combined using weighted averaging, where the weight value is calculated depending on the coding modes of the top and left neighbouring blocks as follows:

If the top neighbor is available and intra coded, then set isIntraTop to 1, otherwise set isIntraTop to 0;
If the left neighbor is available and intra coded, then set isIntraLeft to 1, otherwise set isIntraLeft to 0;
If (isIntraLeft+isIntraLeft) is equal to 2, then wt is set to 3;
Otherwise, if (isIntraLeft+isIntraLeft) is equal to 1, then wt is set to 2;
Otherwise, set wt to 1.
The CIIP prediction is formed as follows:

$P_{CIIP}=((4-wt)*P_{inter}+wt*P_{intra}+2)>>2$

2.4. Chroma QP Table Design in VTM-6.0

In some embodiments, a chroma QP table is used. In some embodiments, a signalling mechanism is used for chroma QP tables, which enables that it is flexible to provide encoders the opportunity to optimize the table for SDR and HDR content. It supports for signalling the tables separately for Cb and Cr components. The proposed mechanism signals the chroma QP table as a piece-wise linear function.

2.5. Transform Skip(TS)

As in HEVC, the residual of a block can be coded with transform skip mode. To avoid the redundancy of syntax coding, the transform skip flag is not signalled when the CU level MTS_CU_flag is not equal to zero. The block size limitation for transform skip is the same to that for MTS in JEM4, which indicate that transform skip is applicable for a CU when both block width and height are equal to or less than 32. Note that implicit MTS transform is set to DCT2 when LFNST or MIP is activated for the current CU. Also the implicit MTS can be still enabled when MTS is enabled for inter coded blocks.

In addition, for transform skip block, minimum allowed Quantization Parameter (QP) is defined as 6*(internalBitDepth−inputBitDepth)+4.

2.6. Joint Coding of Chroma Residuals (JCCR)

In some embodiments, the chroma residuals are coded jointly. The usage (activation) of a joint chroma coding mode is indicated by a TU-level flag tu_joint_cbcr_residual_flag and the selected mode is implicitly indicated by the chroma CBFs. The flag tu_joint_cbcr_residual_flag is present if either or both chroma CBFs for a TU are equal to 1. In the PPS and slice header, chroma QP offset values are signalled for the joint chroma residual coding mode to differentiate from the usual chroma QP offset values signalled for regular chroma residual coding mode. These chroma QP offset values are used to derive the chroma QP values for those blocks coded using the joint chroma residual coding mode. When a corresponding joint chroma coding mode (modes 2 in Table 3) is active in a TU, this chroma QP offset is added to the applied luma-derived chroma QP during quantization and decoding of that TU. For the other modes (modes 1 and 3 in Table 3 Table 3 Reconstruction of chroma residuals. The value CSign is a sign value (+1 or −1), which is specified in the slice header; resJointC[ ][ ] is the transmitted residual.), the chroma QPs are derived in the same way as for conventional Cb or Cr blocks. The reconstruction process of the chroma residuals (resCb and resCr) from the transmitted transform blocks is depicted in Table 3. When this mode is activated, one single joint chroma residual block (resJointC[x][y] in Table 3) is signalled, and residual block for Cb (resCb) and residual block for Cr (resCr) are derived considering information such as tu_cbf_cb, tu_cbf_cr, and CSign, which is a sign value specified in the slice header.

At the encoder side, the joint chroma components are derived as explained in the following. Depending on the mode (listed in the tables above), resJointC{1,2} are generated by the encoder as follows:

If mode is equal to 2 (single residual with reconstruction Cb=C, Cr=CSign*C), the joint residual is determined according to resJointC[x][y]=(resCb[x][y]+CSign*resCr[x][y])/2.

Otherwise, if mode is equal to 1 (single residual with reconstruction Cb=C, Cr=(CSign*C)/2), the joint residual is determined according to resJointC[x][y]=(4*resCb[x][y]+2*CSign*resCr[x][y])/5.

Otherwise (mode is equal to 3, i. e., single residual, reconstruction Cr=C, Cb=(CSign*C)/2), the joint residual is determined according to resJointC[x][y]=(4*resCr[x][y]+2*CSign*resCb[x][y])/5.

TABLE 3

Reconstruction of chroma residuals. The value CSign is
a sign value (+1 or −1), which is specified in the
slice header, resJointC[ ][ ] is the transmitted residual.

| tu_cbf_cb | tu_cbf_cr | reconstruction of Cb and Cr residuals | mode |
|---|---|---|---|
| 1 | 0 | resCb[ x ][ y ] = resJointC[ x ][ y ]<br>resCr[ x ][ y ] =<br>( CSign * resJointC[ x ][ y ] ) >> 1 | 1 |
| 1 | 1 | resCb[ x ][ y ] = resJointCf x ][ y ]<br>resCr[ x ][ y ] =<br>CSign * resJointC[ x ][ y ] | 2 |
| 0 | 1 | resCb[ x ][ y ] =<br>( CSign * resJointC[ x ][ y ] ) >> 1<br>resCr[ x ][ y ] = resJointC[ x ][ y ] | 3 |

Different QPs are utilized are the above three modes. For mode 2, the QP offset signaled in PPS for JCCR coded block is applied, while for other two modes, it is not applied, instead, the QP offset signaled in PPS for non-JCCR coded block is applied.

The corresponding specification is as follows:

8.7.1 Derivation Process for Quantization Parameters

The variable $Qp_Y$ is derived as follows:

$$Qp_Y = ((qP_{Y\_PRED} + CuQpDeltaVal + 64 + 2*QpBdOffset_Y) \% (64 + QpBdOffset_Y)) - QpBdOffset_Y \quad (8\text{-}933)$$

The luma quantization parameter $Qp'_Y$ is derived as follows:

$$Qp'_Y = Qp_Y + QpBdOffset_Y \quad (8\text{-}934)$$

When ChromaArrayType is not equal to 0 and treeType is equal to SINGLE_TREE or DUAL_TREE_CHROMA, the following applies:

When treeType is equal to DUAL_TREE_CHROMA, the variable $Qp_Y$ is set equal to the luma quantization parameter $Qp_Y$ of the luma coding unit that covers the luma location (xCb+cbWidth/2, yCb+cbHeight/2).

The variables $qP_{Cb}$, $qP_{Cr}$ and $qP_{CbCr}$ are derived as follows:

$$qPi_{Chroma} = \text{Clip3}(-QpBdOffset_C, 63, Qp_Y) \quad (8\text{-}935)$$

$$qPi_{Cb} = \text{Chroma}QpTable[0][qPi_{Chroma}] \quad (8\text{-}936)$$

$$qPi_{Cr} = \text{Chroma}QpTable[1][qPi_{Chroma}] \quad (8\text{-}937)$$

$$qPi_{CbCr} = \text{Chroma}QpTable[2][qPi_{Chroma}] \quad (8\text{-}938)$$

The chroma quantization parameters for the Cb and Cr components, $Qp'_{Cb}$ and $Qp'_{Cr}$, and joint Cb-Cr coding $Qp'_{CbCr}$ are derived as follows:

$$Qp'_{Cb} = \text{Clip3}(-QpBdOffset_C, 63, qP_{Cb} + pps\_cb\_qp\_offset + slice\_cb\_qp\_offset + CuQpOffset_{Cb}) + QpBdOffset_C \quad (8\text{-}939)$$

$$Qp'_{Cr} = \text{Clip3}(-QpBdOffset_C, 63, qP_{Cr} + pps\_cr\_qp\_offset + slice\_cr\_qp\_offset + CuQpOffset_{Cr}) + QpBdOffset_C \quad (8\text{-}940)$$

$$Qp'_{CbCr} = \text{Clip3}(-QpBdOffset_C, 63, qP_{CbCr} + pps\_cbcr\_qp\_offset + slice\_cbcr\_qp\_offset + CuQpOffset_{CbCr}) + QpBdOffset_C \quad (8\text{-}941)$$

8.7.3 Scaling Process for Transform Coefficients

Inputs to this process are:
- a luma location(xTbY, yTbY) specifying the top-left sample of the current luma transform block relative to the top-left luma sample of the current picture,
- a variable nTbW specifying the transform block width,
- a variable nTbH specifying the transform block height,
- a variable cIdx specifying the colour component of the current block,
- a variable bitDepth specifying the bit depth of the current colour component.

Output of this process is the (nTbW)×(nTbH) array d of scaled transform coefficients with elements d[x][y]. The quantization parameter qP is derived as follows:

If cIdx is equal to 0 and transform_skip_flag[xTbY][yTbY] is equal to 0, the following applies:

$$qP=Qp'_Y \qquad (8\text{-}950)$$

Otherwise, if cIdx is equal to 0 (and transform_skip_flag[xTbY][yTbY] is equal to 1), the following applies:

$$qP=\text{Max}(QpPrimeTsMin, Qp'_Y) \qquad (8\text{-}951)$$

Otherwise, if TuCResMode[xTbY][yTbY] is equal to 2, the following applies:

$$qP=Qp'_{CbCr} \qquad (8\text{-}952)$$

Otherwise, if cIdx is equal to 1, the following applies:

$$qP=Qp'_{Cb} \qquad (8\text{-}953)$$

Otherwise (cIdx is equal to 2), the following applies:

$$qP=Qp'_{Cr} \qquad (8\text{-}954)$$

2.7. Cross-Component Adaptive Loop Filter (CC-ALF)

Figure 14A:
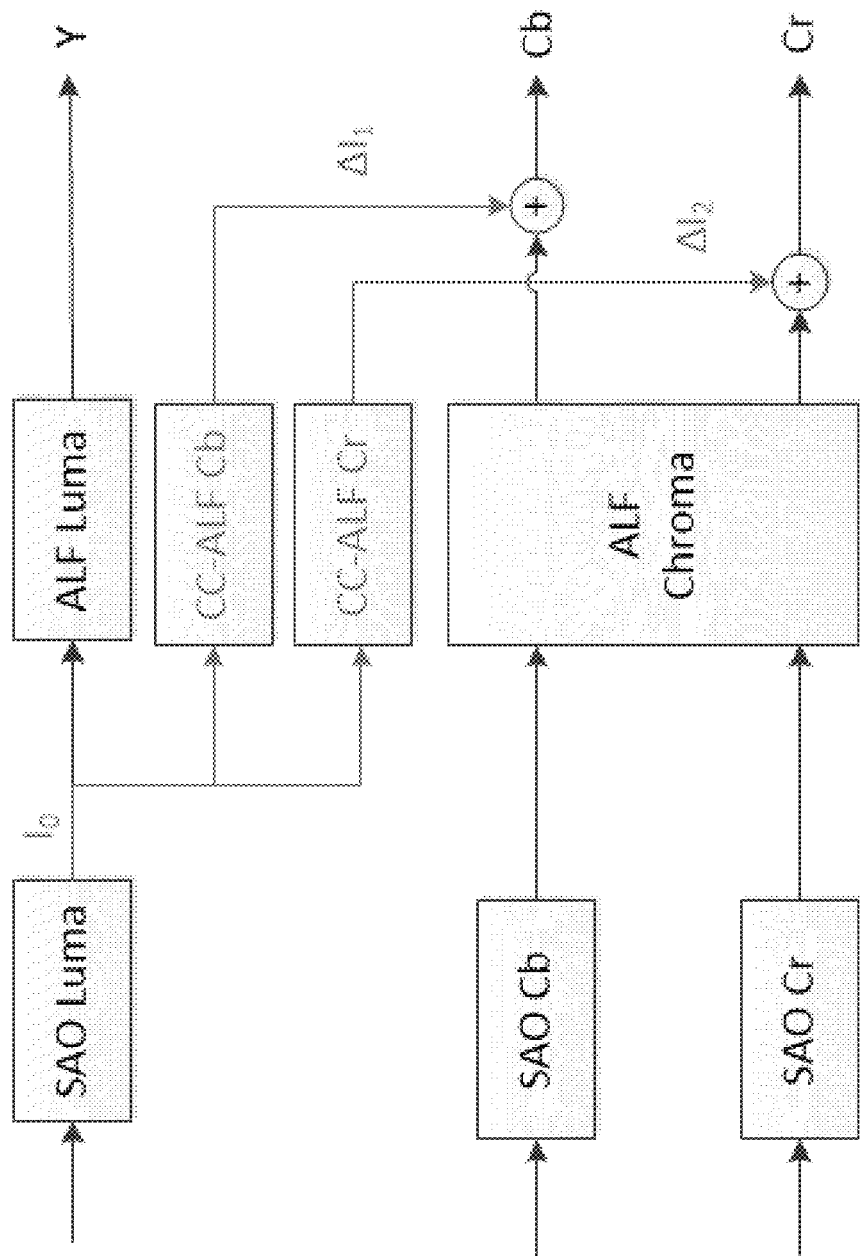
FIG. 14A shows an example of Placement of CC-ALF with respect to other loop filters (b) Diamond shaped filter.
Figure 14B:
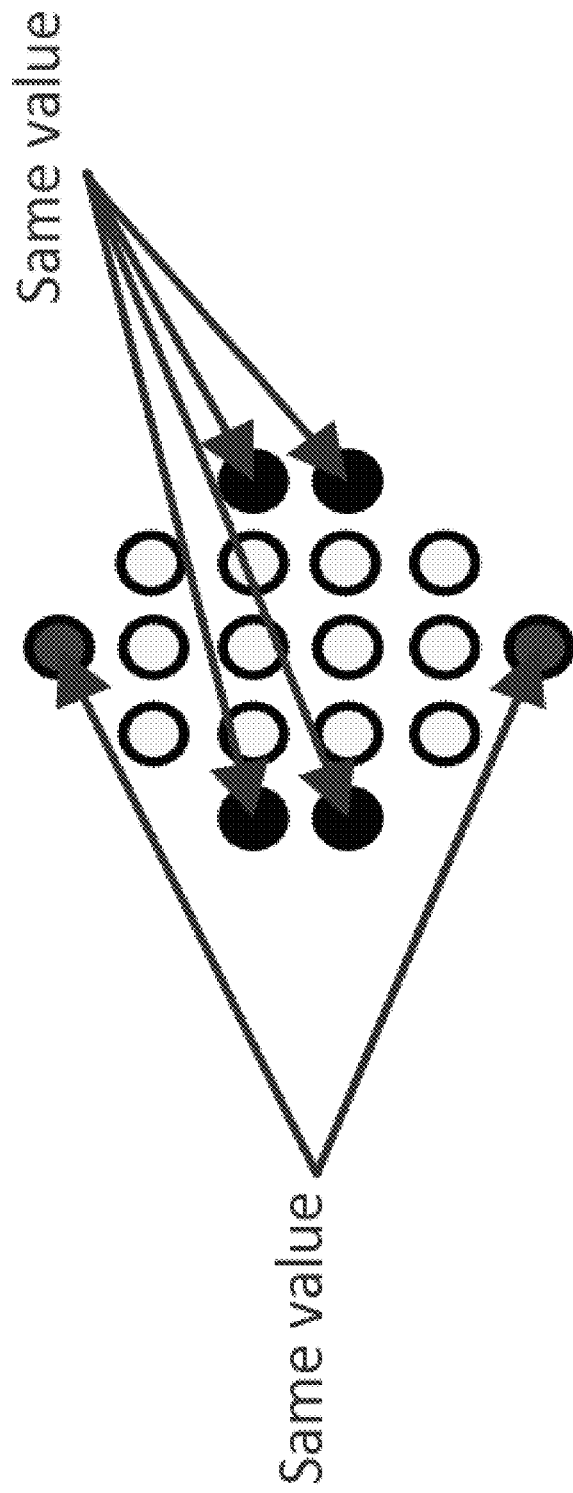
FIG. 14B shows an example of Placement of CC-ALF with respect to Diamond shaped filter.

FIG. 14A illustrates the placement of CC-ALF with respect to the other loop filters. CC-ALF operates by applying a linear, diamond shaped filter (FIG. 14B) to the luma channel for each chroma component, which is expressed as $$\Delta I_i(x, y) = \sum_{(x_0, y_0) \in S_i} I_0(x_C + x_0, y_C + y_0) c_i(x_0, y_0),$$

where
- (x, y) is chroma component i location being refined
- ($x_C$, $y_C$) is the luma location based on (x, y)
- $S_i$ is filter support in luma for chroma component i
- $c_i(x_0, y_0)$ represents the filter coefficients Key features characteristics of the CC-ALF process include:
- The luma location ($x_C$, $y_C$), around which the support region is centered, is computed based on the spatial scaling factor between the luma and chroma planes.
- All filter coefficients are transmitted in the APS and have 8-bit dynamic range.
- An APS may be referenced in the slice header.
- CC-ALF coefficients used for each chroma component of a slice are also stored in a buffer corresponding to a temporal sublayer. Reuse of these sets of temporal sublayer filter coefficients is facilitated using slice-level flags.
- The application of the CC-ALF filters is controlled on a variable block size and signalled by a context-coded flag received for each block of samples. The block size along with an CC-ALF enabling flag is received at the slice-level for each chroma component.
- Boundary padding for the horizontal virtual boundaries makes use of repetition. For the remaining boundaries the same type of padding is used as for regular ALF.

2.8 Derivation Process for Quantization Parameters

The QP is derived based on neighboring QPs and the decoded delta QP. The example texts related to QP derivation are given as follows.

Inputs to this process are:
- a luma location(xCb, yCb) specifying the top-left luma sample of the current coding block relative to the top-left luma sample of the current picture,
- a variable cbWidth specifying the width of the current coding block in luma samples,
- a variable cbHeight specifying the height of the current coding block in luma samples,
- a variable treeType specifying whether a single tree (SINGLE_TREE) or a dual tree is used to partition the coding tree node and, when a dual tree is used, whether the luma (DUAL_TREE_LUMA) or chroma components (DUAL_TREE_CHROMA) are currently processed.

In this process, the luma quantization parameter Qp'Y and the chroma quantization parameters Qp'Cb, Qp'Cr and Qp'CbCr are derived.

The luma location (xQg, yQg), specifies the top-left luma sample of the current quantization group relative to the top left luma sample of the current picture. The horizontal and vertical positions xQg and yQg are set equal to CuQgTopLeftX and CuQgTopLeftY, respectively.

NOTE—: The current quantization group is a rectangular region inside a coding tree block that shares the same qPY_PRED. Its width and height are equal to the width and height of the coding tree node of which the top-left luma sample position is assigned to the variables CuQgTopLeftX and CuQgTopLeftY.

When treeType is equal to SINGLE_TREE or DUAL_TREE_LUMA, the predicted luma quantization parameter qPY_PRED is derived by the following ordered steps:

1. The variable qPY_PREV is derived as follows:
   If one or more of the following conditions are true, qPY_PREV is set equal to SliceQpY:
   - The current quantization group is the first quantization group in a slice.
   - The current quantization group is the first quantization group in a tile.
   - The current quantization group is the first quantization group in a CTB row of a tile and entropy_coding_sync_enabled_flag is equal to 1.
   Otherwise, qPY_PREV is set equal to the luma quantization parameter QpY of the last luma coding unit in the previous quantization group in decoding order.

2. The derivation process for neighbouring block availability as specified in clause 6.4.4 is invoked with the location (xCurr, yCurr) set equal to (xCb, yCb), the neighbouring location (xNbY, yNbY) set equal to (xQg−1, yQg), checkPredModeY set equal to FALSE, and cIdx set equal to 0 as inputs, and the output is assigned to available A. The variable qPY_A is derived as follows:
   If one or more of the following conditions are true, qPY_A is set equal to qPY_PREV:
   - available A is equal to FALSE.

The CTB containing the luma coding block covering the luma location (xQg−1, yQg) is not equal to the CTB containing the current luma coding block at (xCb, yCb), i.e. all of the following conditions are true:

(xQg−1)>>Ctb Log 2SizeY is not equal to (xCb)>>Ctb Log 2SizeY (yQg)>>Ctb Log 2SizeY is not equal to (yCb)>>Ctb Log 2SizeY Otherwise, qPY_A is set equal to the luma quantization parameter QpY of the coding unit containing the luma coding block covering (xQg−1, yQg).

3. The derivation process for neighbouring block availability as specified in clause 6.4.4 is invoked with the location (xCurr, yCurr) set equal to (xCb, yCb), the neighbouring location(xNbY, yNbY) set equal to (xQg, yQg−1), checkPredModeYset equal to FALSE, and cIdx set equal to 0 as inputs, and the output is assigned to available B. The variable qPY_B is derived as follows:

If one or more of the following conditions are true, qPY_B is set equal to qPY_PREV:
availableB is equal to FALSE.
The CTB containing the luma coding block covering the luma location (xQg, yQg−1) is not equal to the CTB containing the current luma coding block at (xCb, yCb), i.e. all of the following conditions are true:

(xQg)>>Ctb Log 2SizeY is not equal to (xCb)>>Ctb Log 2SizeY (yQg−1)>>Ctb Log 2SizeY is not equal to (yCb)>>Ctb Log 2SizeY Otherwise, qPY_B is set equal to the luma quantization parameter QpY of the coding unit containing the luma coding block covering (xQg, yQg−1).

4. The predicted luma quantization parameter qPY_PRED is derived as follows:
If all the following conditions are true, then qPY_PRED is set equal to the luma quantization parameter QpY of the coding unit containing the luma coding block covering (xQg, yQg−1):
availableB is equal to TRUE.
The current quantization group is the first quantization group in a CTB row within a tile.
Otherwise, qPY_PRED is derived as follows:

qPY_PRED=(qPY_A+qPYB+1)>>1    (1115)

The variable QpY is derived as follows:

QpY=((qPY_PRED+CuQpDeltaVal+64+2*QpBdOffset)%(64+QpBdOffset))−QpBdOffset    (1116)

The luma quantization parameter Qp'Y is derived as follows:

Qp'Y=QpY+QpBdOffset    (1117)

When ChromaArrayType is not equal to 0 and treeType is equal to SINGLE_TREE or DUAL_TREE_CHROMA, the following applies:
When treeType is equal to DUAL_TREE_CHROMA, the variable QpY is set equal to the luma quantization parameter QpY of the luma coding unit that covers the luma location (xCb+cbWidth/2, yCb+cbHeight/2).
The variables qPCb, qPCr and qPCbCr are derived as follows:

qPChroma=Clip3(−QpBdOffset,63,QpY)    (1118)

qPCb=ChromaQpTable[0][qPChroma]    (1119)

qPCr=ChromaQpTable[1][qPChroma]    (1120)

qPCbCr=ChromaQpTable[2][qPChroma]    (1121)

The chroma quantization parameters for the Cb and Cr components, Qp'Cb and Qp'Cr, and joint Cb-Cr coding Qp'CbCr are derived as follows:

Qp'Cb=Clip3(−QpBdOffset,63,qPCb+pps_cb_qp_offset+slice_cb_qp_offset+CuQpOffsetCb)+QpBdOffset    (1122)

Qp'Cr=Clip3(−QpBdOffset,63,qPCr+pps_cr_qp_offset+slice_cr_qp_offset+CuQpOffsetCr)+QpBdOffset    (1123)

Qp'CbCr=Clip3(−QpBdOffset,63,qPCbCr+pps_joint_cbcr_qp_offset+slice_joint_cbcr_qp_offset+CuQpOffsetCbCr)+QpBdOffset    (1124)

2.9 Adaptive Color Transform (ACT)

Figure 15:
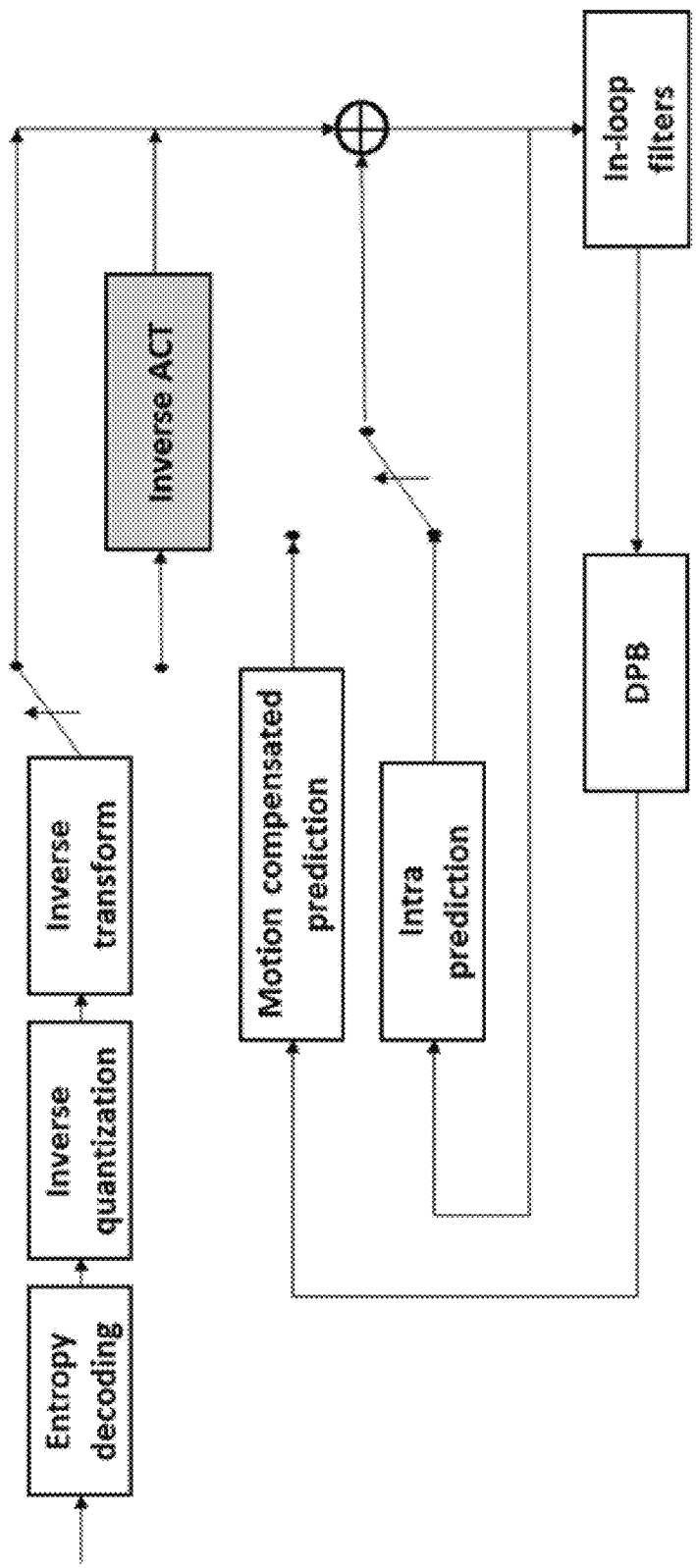
FIG. 15 shows an example flowchart for an adaptive color transform (ACT) process.

FIG. 15 illustrates the decoding flowchart with the ACT be applied. As illustrated in FIG. 15, the color space conversion is carried out in residual domain. Specifically, one additional decoding module, namely inverse ACT, is introduced after inverse transform to convert the residuals from YCgCo domain back to the original domain.

In the VVC, unless the maximum transform size is smaller than the width or height of one coding unit (CU), one CU leaf node is also used as the unit of transform processing. Therefore, in the proposed implementation, the ACT flag is signaled for one CU to select the color space for coding its residuals. Additionally, following the HEVC ACT design, for inter and IBC CUs, the ACT is only enabled when there is at least one non-zero coefficient in the CU. For intra CUs, the ACT is only enabled when chroma components select the same intra prediction mode of luma component, e.g., DM mode.

The core transforms used for the color space conversions are kept the same as that used for the HEVC. Specifically, the following forward and inverse YCgCo color transform matrices, as described as follows, as applied.

$$\begin{bmatrix} C'_0 \\ C'_1 \\ C'_2 \end{bmatrix} = \begin{bmatrix} 2 & 1 & 1 \\ 2 & -1 & -1 \\ 0 & -2 & 2 \end{bmatrix} \begin{bmatrix} C_0 \\ C_1 \\ C_2 \end{bmatrix} /4 \quad \begin{bmatrix} C_0 \\ C_1 \\ C_2 \end{bmatrix} = \begin{bmatrix} 1 & 1 & 0 \\ 1 & -1 & -1 \\ 1 & -1 & 1 \end{bmatrix} \begin{bmatrix} C'_0 \\ C'_1 \\ C'_2 \end{bmatrix}$$

Additionally, to compensate the dynamic range change of residuals signals before and after color transform, the QP adjustments of (−5, −5, −3) are applied to the transform residuals.

On the other hand, as shown in (1), the forward and inverse color transforms need to access the residuals of all three components. Correspondingly, in the proposed implementation, the ACT is disabled in the following two scenarios where not all residuals of three components are available.

1. Separate-tree partition: when separate-tree is applied, luma and chroma samples inside one CTU are partitioned by different structures. This results in that the CUs in the luma-tree only contains luma component and the CUs in the chroma-tree only contains two chroma components.

Intra sub-partition prediction (ISP): the ISP sub-partition is only applied to luma while chroma signals are coded without splitting. In the current ISP design, except the last ISP sub-partitions, the other sub-partitions only contain luma component.

2.10 Example High-Level Deblocking Control

Figure 16:
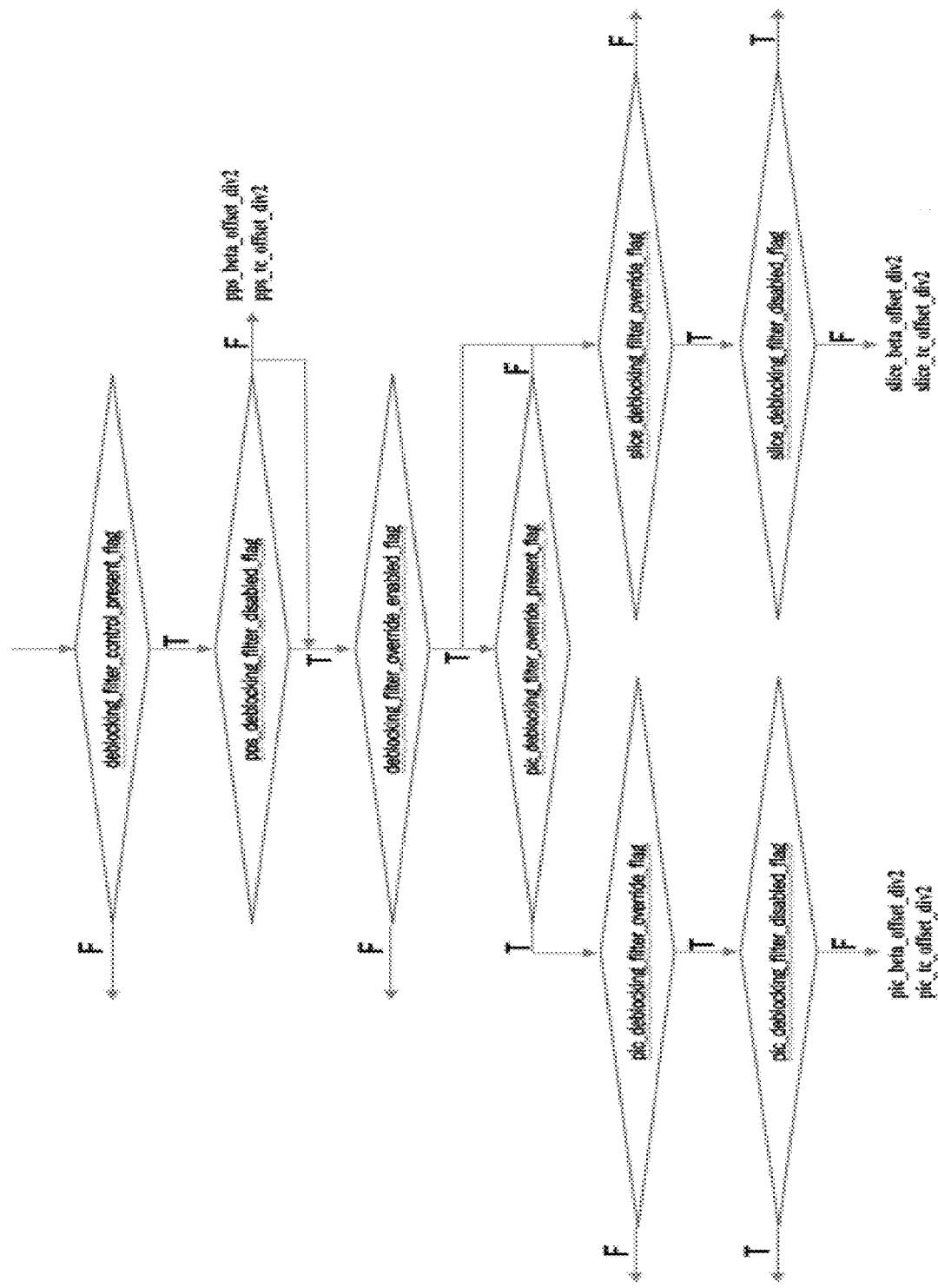
FIG. 16 shows an example flowchart for high-level deblocking control mechanism.

The control mechanism is shown in the following FIG. 16.

3. Drawbacks of Existing Implementations

Figure 9B:
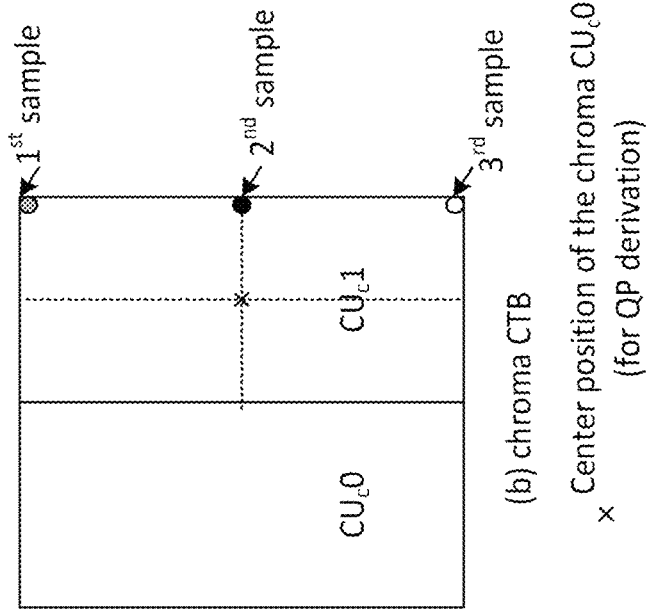
FIG. 9B shows another example of center positions of a chroma block.
Figure 9A:
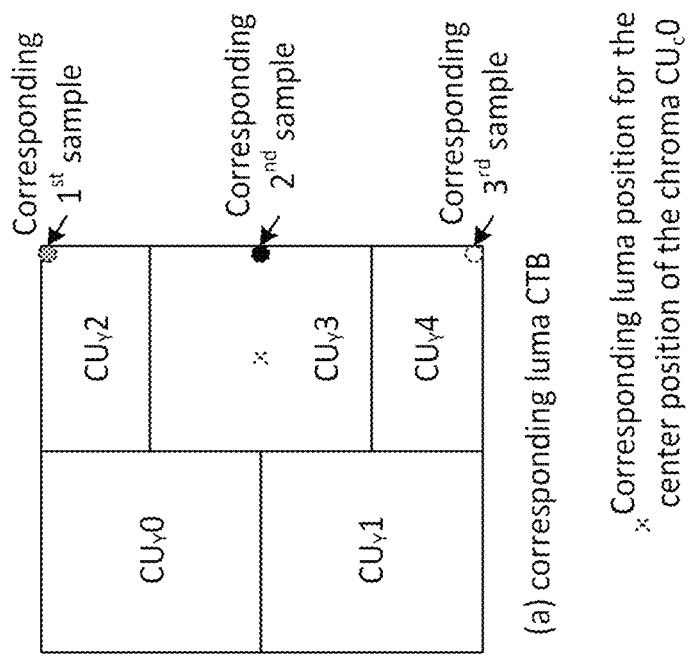
FIG. 9A shows an example of center positions of a chroma block.

DMVR and BIO do not involve the original signal during refining the motion vectors, which may result in coding blocks with inaccurate motion information. Also, DMVR and BIO sometimes employ the fractional motion vectors after the motion refinements while screen videos usually have integer motion vectors, which makes the current motion information more inaccurate and make the coding performance worse.
1. The interaction between chroma QP table and chroma deblocking may have problems, e.g chroma QP table should be applied to individual QP but not weighted sum of QPs.
2. The logic of luma deblocking filtering process is complicated for hardware design.
3. The logic of boundary strength derivation is too complicated for both software and hardware design.
4. In the BS decision process, JCCR is treated separately from those blocks coded without JCCT applied. However, JCCR is only a special way to code the residual. Therefore, such design may bring additional complexity without no clear benefits.
5. In chroma edge decision, $Qp_Q$ and $Qp_P$ are set equal to the $Qp_Y$ values of the coding units which include the coding blocks containing the sample $q_{0,0}$ and $p_{0,0}$, respectively. However, in the quantization/de-quantization process, the QP for a chroma sample is derived from the QP of luma block covering the corresponding luma sample of the center position of current chroma CU. When dual tree is enabled, the different locations of luma blocks may result in different QPs. Therefore, in the chroma deblocking process, wrong QPs may be used for filter decision. Such a misalignment may result in visual artifacts. An example is shown in FIGS. 9A-B. FIG. 9A shows the corresponding CTB partitioning for luma block and FIG. 9B shows the chroma CTB partitioning under dual tree. When determining the QP for chroma block, denoted by $CU_C1$, the center position of $CU_C1$ is firstly derived. Then the corresponding luma sample of the center position of $CU_C1$ is identified and luma QP associated with the luma CU that covers the corresponding luma sample, i.e., $CU_Y3$ is then untilized to derive the QP for $CU_c1$. However, when making filter decisions for the depicted three samples (with solid circles), the QPs of CUs that cover the correspodning 3 samples are selected. Therefore, for the $1^{st}$, $2^{nd}$, and $3^{rd}$ chroma sample (depicted in FIG. 9B), the QPs of $CU_Y2$, $CU_Y3$, $CU_Y4$ are utilized, respectively. That is, chroma samples in the same CU may use different QPs for filter decision which may result in wrong decisions.
6. A different picture level QP offset (i.e., pps_joint_cbcr_qp_offset) is applied to JCCR coded blocks which is different from the picture level offsets for Cb/Cr (e.g., pps_cb_qp_offset and pps_cr_qp_offset) applied to non-JCCR coded blocks. However, in the chroma deblocking filter decision process, only those offsets for non-JCCR coded blocks are utilized. The missing of consideration of coded modes may result in wrong filter decision.
7. The TS and non-TS coded blocks employ different QPs in the de-quantization process, which may be also considered in the deblocking process.
8. Different QPs are used in the scaling process (quantization/dequantization) for JCCR coded blocks with different modes. Such a design is not consistent.
9. The chroma deblocking for Cb/Cr could be unified for parallel design.
10. The chroma QP in the deblocking is derived based on the QP used in the chroma dequantization process (e.g. qP), however, the qP should be clipped or minus 5 for TS and ACT blocks when it is used in the deblocking process.
11. The prediction process for three components may be not same when both BDPCM and ACT are enabled.

4. Example Techniques and Embodiments

The detailed embodiments described below should be considered as examples to explain general concepts. These embodiments should not be interpreted narrowly way. Furthermore, these embodiments can be combined in any manner.

The methods described below may be also applicable to other decoder motion information derivation technologies in addition to the DMVR and BIO mentioned below.

Figure 10:
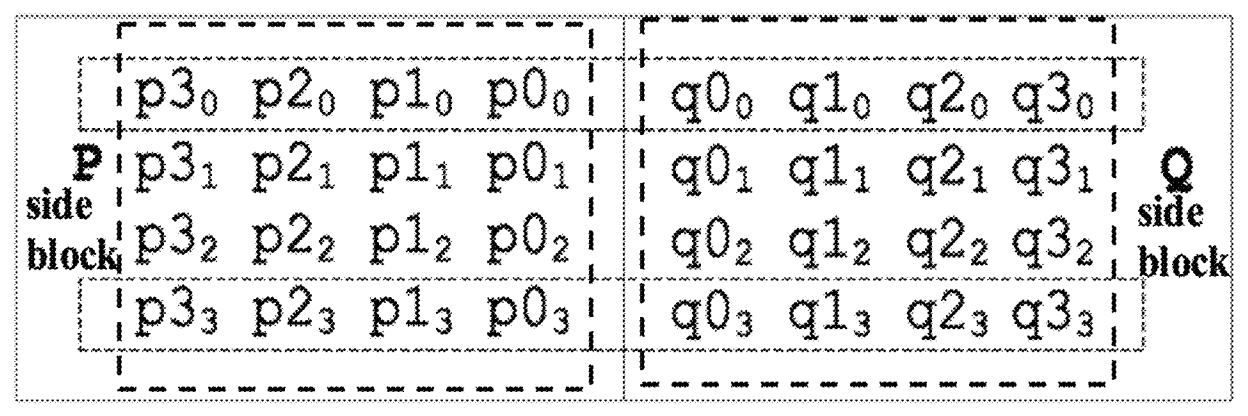

In the following examples, MVM[i].x and MVM[i].y denote the horizontal and vertical component of the motion vector in reference picture list i (i being 0 or 1) of the block at M (M being P or Q) side. Abs denotes the operation to get the absolute value of an input, and "&&" and "||" denotes the logical operation AND and OR. Referring to FIG. 10, P may denote the samples at P side and Q may denote the samples at Q side. The blocks at P side and Q side may denote the block marked by the dash lines.

Regarding Chroma OP in Deblocking
1. When chroma QP table is used to derive parameters to control chroma deblocking (e.g., in the decision process for chroma block edges), chroma QP offsets may be applied after applying chroma QP table.
    a. In one example, the chroma QP offsets may be added to the value outputted by a chroma QP table.
    b. Alternatively, the chroma QP offsets may be not considered as input to a chroma QP table.
    c. In one example, the chroma QP offsets may be the picture-level or other video unit-level (slice/tile/brick/subpicture) chroma quantization parameter offset (e.g., pps_cb_qp_offset, pps_cr_qp_offset in the specification).
2. QP clipping may be not applied to the input of a chroma QP table.
3. It is proposed that deblocking process for chroma components may be based on the mapped chroma QP (by the chroma QP table) on each side.
    a. In one example, it is proposed that deblocking parameters, (e.g., β and tC) for chroma may be based on QP derived from luma QP on each side.
    b. In one example, the chroma deblocking parameter may depend on chroma QP table value with QpP as the table index, where QpP, is the luma QP value on P-side.
    c. In one example, the chroma deblocking parameter may depend on chroma QP table value with QpQ as the table index, where QpQ, is the luma QP value on Q-side.

4. It is proposed that deblocking process for chroma components may be based on the QP applied to quantization/dequantization for the chroma block.
   a. In one example, QP for deblocking process may be equal to the QP in dequantization.
   b. In one example, the QP selection for deblocking process may depend on the indication of usage of TS and/or ACT blocks.
      i. In one example, the QP for the deblocking process may be derived by Max(QpPrimeTsMin, qP)−(cu_act_enabled_flag[xTbY][yTbY]? N:0), where QpPrimeTsMin is the minimal QP for TS blocks and cu_act_enabled_flag is the flag of usage of ACT.
         1. In one example, qP may be the $Qp'_{Cb}$ or $Qp'_{Cr}$ given in section 2.8.
      ii. In one example, the QP for the deblocking process may be derived by Max(QpPrimeTsMin, qP−(cu_act_enabled_flag[xTbY][yTbY]? N:0)), where QpPrimeTsMin is the minimal QP for TS blocks and cu_act_enabled_flag is the flag of usage of ACT.
         1. In one example, qP may be the $Qp'_{Cb}$ or $Qp'_{Cr}$ given in section 2.8.
      iii. In the above examples, N may be set to same or different values for each color component.
         1. In one example, N may be set to 5 for the Cb/B/G/U/component and/or N may be set to 3 for the Cr/R/B/V component.
   c. In one example, the QP of a block used in the deblocking process may be derived by the process described in section 2.8 with delta QP (e.g. CuQpDeltaVal) equal to 0.
      iv. In one example, the above derivation may be applied only when the coded block flag (cbf) of a block is equal to 0.
   d. In one example, the above examples may be applied on luma and/or chroma blocks.
   e. In one example, the QP of a first block used in the deblocking process may be set equal to the QP stored and utilized for predicting a second block.
      v. In one example, for a block with all zero coefficients, the associated QP used in the deblocking process may be set equal to the QP stored and utilized for predicting a second block.
5. It is proposed to consider the picture/slice/tile/brick/subpicture level quantization parameter offsets used for different coding methods in the deblocking filter decision process.
   a. In one example, selection of picture/slice/tile/brick/subpicture level quantization parameter offsets for filter decision (e.g., the chroma edge decision in the deblocking filter process) may depend on the coded methods for each side.
   b. In one example, the filtering process (e.g., the chroma edge decision process) which requires to use the quantization parameters for chroma blocks may depend on whether the blocks use JCCR.
      i. Alternatively, furthermore, the picture/slice-level QP offsets (e.g., pps_joint_cbcr_qp_offset) applied to JCCR coded blocks may be further taken into consideration in the deblocking filtering process.
      ii. In one example, the cQpPicOffset which is used to decide Tc and β settings may be set to pps_joint_cbcr_qp_offset instead of pps_cb_qp_offset or pps_cr_qp_offset under certain conditions:
         1. In one example, when either block in P or Q sides uses JCCR.
         2. In one example, when both blocks in P or Q sides uses JCCR.
      iii. Alternatively, furthermore, the filtering process may depend on the mode of JCCR (e.g., whether mode is equal to 2).
6. The chroma filtering process (e.g., the chroma edge decision process) which requires to access the decoded information of a luma block may utilize the information associated with the same luma coding block that is used to derive the chroma QP in the dequantization/quantization process.
   a. In one example, the chroma filtering process (e.g., the chroma edge decision process) which requires to use the quantization parameters for luma blocks may utilize the luma coding unit covering the corresponding luma sample of the center position of current chroma CU.
   b. An example is depicted in FIGS. 9A-B wherein the decoded information of $CU_Y3$ may be used for filtering decision of the three chroma samples ($1^{st}$, $2^{nd}$ and $3^{rd}$) in FIG. 9B.
7. The chroma filtering process (e.g., the chroma edge decision process) may depend on the quantization parameter applied to the scaling process of the chroma block (e.g., quantization/dequantization).
   a. In one example, the QP used to derive β and Tc may depend on the QP applied to the scaling process of the chroma block.
   b. Alternatively, furthermore, the QP used to the scaling process of the chroma block may have taken the chroma CU level QP offset into consideration.
8. Whether to invoke above bullets may depend on the sample to be filtered is in the block at P or Q side.
   a. For example, whether to use the information of the luma coding block covering the corresponding luma sample of current chroma sample or use the information of the luma coding block covering the corresponding luma sample of center position of chroma coding block covering current chroma sample may depend on the block position.
      i. In one example, if the current chroma sample is in the block at the Q side, QP information of the luma coding block covering the corresponding luma sample of center position of chroma coding block covering current chroma sample may be used.
      ii. In one example, if the current chroma sample is in the block at the P side, QP information of the luma coding block covering the corresponding luma sample of the chroma sample may be used.
9. Chroma QP used in deblocking may depend on information of the corresponding transform block.
   a. In one example, chroma QP for deblocking at P-side may depend on the transform block's mode at P-side.
      i. In one example, chroma QP for deblocking at P-side may depend on if the transform block at P-side is coded with JCCR applied.
      ii. In one example, chroma QP for deblocking at P-side may depend on if the transform block at P-side is coded with joint_cb_cr mode and the mode of JCCR is equal to 2.

b. In one example, chroma QP for deblocking at Q-side may depend on the transform block's mode at Q-side.
   i. In one example, chroma QP for deblocking at Q-side may depend on if the transform block at Q-side is coded with JCCR applied.
   ii. In one example, chroma QP for deblocking at Q-side may depend on if the transform block at Q-side is coded with JCCR applied and the mode of JCCR is equal to 2.
10. Signaling of chroma QPs may be in coding unit.
   a. In one example, when coding unit size is larger than the maximum transform block size, i.e., maxTB, chroma QP may be signaled in CU level. Alternatively, it may be signaled in TU level.
   b. In one example, when coding unit size is larger than the size of VPDU, chroma QP may be signaled in CU level. Alternatively, it may be signaled in TU level.
11. Whether a block is of joint_cb_cr mode may be indicated at coding unit level.
   a. In one example, whether a transform block is of joint_cb_cr mode may inherit the information of the coding unit containing the transform block.
12. Chroma QP used in deblocking may depend on chroma QP used in scaling process minus QP offset due to bit depth.
   a. In one example, Chroma QP used in deblocking at P-side is set to the JCCR chroma QP used in scaling process, i.e. $Qp'_{CbCr}$, minus QpBdOffsetC when TuCResMode[xTb][yTb] is equal to 2 where (xTb, yTb) denotes the transform blocking containing the first sample at P-side, i.e. $p_{0,0}$.
   b. In one example, Chroma QP used in deblocking at P-side is set to the Cb chroma QP used in scaling process, i.e. $Qp'_{Cb}$, minus QpBdOffsetC when TuCResMode[xTb][yTb] is equal to 2 where (xTb, yTb) denotes the transform blocking containing the first sample at P-side, i.e. $p_{0,0}$.
   c. In one example, Chroma QP used in deblocking at P-side is set to the Cr chroma QP used in scaling process, i.e. $Qp'_{Cr}$, minus QpBdOffsetC when TuCResMode[xTb][yTb] is equal to 2 where (xTb, yTb) denotes the transform blocking containing the first sample at P-side, i.e. $p_{0,0}$.
   d. In one example, Chroma QP used in deblocking at Q-side is set to the JCCR chroma QP used in scaling process, i.e. $Qp'_{CbCr}$, minus QpBdOffsetC when TuCResMode[xTb][yTb] is equal to 2 where (xTb, yTb) denotes the transform blocking containing the last sample at Q-side, i.e. $q_{0,0}$.
   e. In one example, Chroma QP used in deblocking at Q-side is set to the Cb chroma QP used in scaling process, i.e. $Qp'_{Cb}$, minus QpBdOffsetC when TuCResMode[xTb][yTb] is equal to 2 where (xTb, yTb) denotes the transform blocking containing the last sample at Q-side, i.e. $q_{0,0}$.
   f. In one example, Chroma QP used in deblocking at Q-side is set to the Cr chroma QP used in scaling process, i.e. $Qp'_{Cr}$, minus QpBdOffsetC when TuCResMode[xTb][yTb] is equal to 2 where (xTb, yTb) denotes the transform blocking containing the last sample at Q-side, i.e. $q_{0,0}$.
13. Different color components may have different deblocking strength control.
   a. In one example, each component may have its pps_beta_offset_div2, pps_tc_offset_div2 and/or pic_beta_offset_div2, pic_tc_offset_div2 and/or slice_beta_offset_div2, slice_tc_offset_div2.
   b. In one example, for joint_cb_cr mode, a different set of beta_offset_div2, tc_offset_div2 may be applied in PPS and/or picture header and/or slice header.
14. Instead of using overriding mechanism, the deblocking control offset may be accumulated taking account of offsets at different levels.
   a. In one example, pps_beta_offset_div2 and/or pic_beta_offset_div2 and/or slice_beta_offset_div2 may be accumulated to get the deblocking offset at slice level.
   b. In one example, pps_tc_offset_div2 and/or pic_tc_offset_div2 and/or slice_tc_offset_div2 may be accumulated to get the deblocking offset at slice level.

Regarding QP Settings

15. It is proposed to signal the indication of enabling block-level chroma QP offset (e.g. slice_cu_chroma_qp_offset_enabled_flag) at the slice/tile/brick/sub-picture level.
   a. Alternatively, the signaling of such an indication may be conditionally signaled.
      i. In one example, it may be signaled under the condition of JCCR enabling flag.
      ii. In one example, it may be signaled under the condition of block-level chroma QP offset enabling flag in picture level.
      iii. Alternatively, such an indication may be derived instead.
   b. In one example, the slice_cu_chroma_qp_offset_enabled_flag may be signaled only when the PPS flag of chroma QP offset (e.g. slice_cu_chroma_qp_offset_enabled_flag) is true.
   c. In one example, the slice_cu_chroma_qp_offset_enabled_flag may be inferred to false only when the PPS flag of chroma QP offset (e.g. slice_cu_chroma_qp_offset_enabled_flag) is false.
   d. In one example, whether to use the chroma QP offset on a block may be based on the flags of chroma QP offset at PPS level and/or slice level.
16. Same QP derivation method is used in the scaling process (quantization/dequantization) for JCCR coded blocks with different modes.
   a. In one example, for JCCR with mode 1 and 3, the QP is dependent on the QP offset signaled in the picture/slice level (e.g., pps_cbcr_qp_offset, slice_cbcr_qp_offset).

Filtering Procedures

17. Deblocking for all color components excepts for the first color component may follow the deblocking process for the first color component.
   a. In one example, when the color format is 4:4:4, deblocking process for the second and third components may follow the deblocking process for the first component.
   b. In one example, when the color format is 4:4:4 in RGB color space, deblocking process for the second and third components may follow the deblocking process for the first component.
   c. In one example, when the color format is 4:2:2, vertical deblocking process for the second and third components may follow the vertical deblocking process for the first component.
   d. In above examples, the deblocking process may refer to deblocking decision process and/or deblocking filtering process.

18. How to calculate gradient used in the deblocking filter process may depend on the coded mode information and/or quantization parameters.
   a. In one example, the gradient computation may only consider the gradient of a side wherein the samples at that side are not lossless coded.
   b. In one example, if both sides are lossless coded or nearly lossless coded (e.g., quantization parameters equal to 4), gradient may be directly set to 0.
      i. Alternatively, if both sides are lossless coded or nearly lossless coded (e.g., quantization parameters equal to 4), Boundary Strength (e.g., BS) may be set to 0.
   c. In one example, if the samples at P side are lossless coded and the samples at Q side are lossy coded, the gradients used in deblocking on/off decision and/or strong filters on/off decision may only include gradients of the samples at Q side, vice versa.
      i. Alternatively, furthermore, the gradient of one side may be scaled by N.
         1. N is an integer number (e.g. 2) and may depend on
            a. Video contents (e.g. screen contents or natural contents)
            b. A message signaled in the DPS/SPS/VPS/PPS/APS/picture header/slice header/tile group header/Largest coding unit (LCU)/Coding unit (CU)/LCU row/group of LCUs/TU/PU block/Video coding unit
            c. Position of CU/PU/TU/block/Video coding unit
            d. Coded modes of blocks containing the samples along the edges
            e. Transform matrices applied to the blocks containing the samples along the edges
            f. Block dimension/Block shape of current block and/or its neighboring blocks
            g. Indication of the color format (such as 4:2:0, 4:4:4, RGB or YUV)
            h. Coding tree structure (such as dual tree or single tree)
            i. Slice/tile group type and/or picture type
            j. Color component (e.g. may be only applied on Cb or Cr)
            k. Temporal layer ID
            l. Profiles/Levels/Tiers of a standard
            m. Alternatively, N may be signalled to the decoder Regarding Boundary Strength Derivation 19. It is proposed to treat JCCR coded blocks as those non-JCCR coded blocks in the boundary strength decision process.
   a. In one example, the determination of boundary strength (BS) may be independent from the checking of usage of JCCR for two blocks at P and Q sides.
   b. In one example, the boundary strength (BS) for a block may be determined regardless if the block is coded with JCCR or not.
20. It is proposed to derive the boundary strength (BS) without comparing the reference pictures and/or number of Ms associated with the block at P side with the reference pictures of the block at Q side.
   a. In one example, deblocking filter may be disabled even when two blocks are with different reference pictures.
   b. In one example, deblocking filter may be disabled even when two blocks are with different number of MVs (e.g., one is uni-predicted and the other is bi-predicted).
   c. In one example, the value of BS may be set to 1 when motion vector differences for one or all reference picture lists between the blocks at P side and Q side is larger than or equal to a threshold Th.
      i. Alternatively, furthermore, the value of BS may be set to 0 when motion vector differences for one or all reference picture lists between the blocks at P side and Q side is smaller than or equal to a threshold Th.
   d. In one example, the difference of the motion vectors of two blocks being larger than a threshold Th may be defined as $(Abs(MVP[0].x-MVQ[0].x)>Th \| Abs(MVP[0].y-MVQ[0].y)>Th \| Abs(MVP[1].x-MVQ[1].x)>Th) \| Abs(MVP[1].y-MVQ[1].y)>Th)$
      ii. Alternatively, the difference of the motion vectors of two blocks being larger than a threshold Th may be defined as $(Abs(MVP[0].x-MVQ[0].x)>Th$ && $Abs(MVP[0].y-MVQ[0].y)>Th$ && $Abs(MVP[1].x-MVQ[1].x)>Th)$ && $Abs(MVP[1].y-MVQ[1].y)>Th)$
      iii. Alternatively, in one example, the difference of the motion vectors of two blocks being larger than a threshold Th may be defined as $(Abs(MVP[0].x-MVQ[0].x)>Th \| Abs(MVP[0].y-MVQ[0].y)>Th)$ && $(Abs(MVP[1].x-MVQ[1].x)>Th) \| Abs(MVP[1].y-MVQ[1].y)>Th)$
      iv. Alternatively, in one example, the difference of the motion vectors of two blocks being larger than a threshold Th may be defined as $(Abs(MVP[0].x-MVQ[0].x)>Th$ && $Abs(MVP[0].y-MVQ[0].y)>Th) \| (Abs(MVP[1].x-MVQ[1].x)>Th$ && $Abs(MVP[1].y-MVQ[1].y)>Th)$
   e. In one example, a block which does not have a motion vector in a given list may be treated as having a zero-motion vector in that list.
   f. In the above examples, Th is an integer number (e.g. 4, 8 or 16).
   g. In the above examples, Th may depend on
      v. Video contents (e.g. screen contents or natural contents)
      vi. A message signaled in the DPS/SPS/VPS/PPS/APS/picture header/slice header/tile group header/Largest coding unit (LCU)/Coding unit (CU)/LCU row/group of LCUs/TU/PU block/Video coding unit
      vii. Position of CU/PU/TU/block/Video coding unit
      viii. Coded modes of blocks containing the samples along the edges
      ix. Transform matrices applied to the blocks containing the samples along the edges
      x. Block dimension/Block shape of current block and/or its neighboring blocks
      xi. Indication of the color format (such as 4:2:0,4:4:4, RGB or YUV)
      xii. Coding tree structure (such as dual tree or single tree)
      xiii. Slice/tile group type and/or picture type
      xiv. Color component (e.g. may be only applied on Cb or Cr)
      xv. Temporal layer ID
      xvi. Profiles/Levels/Tiers of a standard
      xvii. Alternatively, Th may be signalled to the decoder.

h. The above examples may be applied under certain conditions.
  xviii. In one example, the condition is the blkP and blkQ are not coded with intra modes.
  xix. In one example, the condition is the blkP and blkQ have zero coefficients on luma component.
  xx. In one example, the condition is the blkP and blkQ are not coded with the CIIP mode.
  xxi. In one example, the condition is the blkP and blkQ are coded with a same prediction mode (e.g. IBC or Inter).

Regarding Luma Deblocking Filtering Process

21. The deblocking may use different QPs for TS coded blocks and non-TS coded blocks.
    a. In one example, the QP for TS may be used on TS coded blocks while the QP for non-TS may be used on non-TS coded blocks.
22. The luma filtering process (e.g., the luma edge decision process) may depend on the quantization parameter applied to the scaling process of the luma block.
    a. In one example, the QP used to derive beta and Tc may depend on the clipping range of transform skip, e.g. as indicated by QpPrimeTsMin.
23. It is proposed to use an identical gradient computation for large block boundaries and smaller block boundaries.
    a. In one example, the deblocking filter on/off decision described in section 2.1.4 may be also applied for large block boundary.
       i. In one example, the threshold beta in the decision may be modified for large block boundary.
          1. In one example, beta may depend on quantization parameter.
          2. In one example, beta used for deblocking filter on/off decision for large block boundaries may be smaller than that for smaller block boundaries.
             a. Alternatively, in one example, beta used for deblocking filter on/off decision for large block boundaries may be larger than that for smaller block boundaries.
             b. Alternatively, in one example, beta used for deblocking filter on/off decision for large block boundaries may be equal to that for smaller block boundaries.
          3. In one example, beta is an integer number and may be based on
             a. Video contents (e.g. screen contents or natural contents)
             b. A message signaled in the DPS/SPS/VPS/PPS/APS/picture header/slice header/tile group header/Largest coding unit (LCU)/Coding unit (CU)/LCU row/group of LCUs/TU/PU block/Video coding unit
             c. Position of CU/PU/TU/block/Video coding unit
             d. Coded modes of blocks containing the samples along the edges
             e. Transform matrices applied to the blocks containing the samples along the edges
             f. Block dimension of current block and/or its neighboring blocks
             g. Block shape of current block and/or its neighboring blocks
             h. Indication of the color format (such as 4:2:0, 4:4:4, RGB or YUV)
             i. Coding tree structure (such as dual tree or single tree)
             j. Slice/tile group type and/or picture type
             k. Color component (e.g. may be only applied on Cb or Cr)
             l. Temporal layer ID
             m. Profiles/Levels/Tiers of a standard
             n. Alternatively, beta may be signalled to the decoder.

Regarding Scaling Matrix (Dequantization Matrix)

24. The values for specific positions of quantization matrices may be set to constant.
    a. In one example, the position may be the position of (x, y) wherein x and y are two integer variables (e.g., x=y=0), and (x, y) is the coordinate relative to a TU/TB/PU/PB/CU/CB.
       i. In one example, the position may be the position of DC.
    b. In one example, the constant value may be 16.
    c. In one example, for those positions, signaling of the matrix values may not be utilized.
25. A constrain may be set that the average/weighted average of some positions of quantization matrices may be a constant.
    a. In one example, deblocking process may depend on the constant value.
    b. In one example, the constant value may be indicated in DPS/VPS/SPS/PPS/Slice/Picture/Tile/Brick headers.
26. One or multiple indications may be signaled in the picture header to inform the scaling matrix to be selected in the picture associated with the picture header.

Regarding Cross Component Adaptive Loop Filter (CCALF)

27. CCALF may be applied before some loop filtering process at the decoder
    a. In one example, CCALF may be applied before deblocking process at the decoder.
    b. In one example, CCALF may be applied before SAO at the decoder.
    c. In one example, CCALF may be applied before ALF at the decoder.
    d. Alternatively, the order of different filters (e.g., CCALF, ALF, SAO, deblocking filter) may be NOT fixed.
       i. In one example, the invoke of CCLAF may be before one filtering process for one video unit or after another one for another video unit.
       ii. In one example, the video unit may be a CTU/CTB/slice/tile/brick/picture/sequence.
    e. Alternatively, indications of the order of different filters (e.g., CCALF, ALF, SAO, deblocking filter) may be signaled or derived on-the-fly.
       i. Alternatively, indication of the invoking of CCALF may be signaled or derived on-the-fly.
    f. The explicit (e.g. signaling from the encoder to the decoder) or implicit (e.g. derived at both encoder and decoder) indications of how to control CCALF may be decoupled for different color components (such as Cb and Cr).
    g. Whether and/or how to apply CCALF may depend on color formats (such as RGB and YCbCr) and/or color sampling format (such as 4:2:0, 4:2:2 and 4:4:4), and/or color down-sampling positions or phases)

Regarding Chroma QP Offset Lists
28. Signaling and/or selection of chroma QP offset lists may be dependent on the coded prediction modes/picture types/slice or tile or brick types.
   h. Chroma QP offset lists, e.g. cb_qp_offset_list[i], cr_qp_offset_list[i], and joint_cbcr_qp_offset_list[i], may be different for different coding modes.
   i. In one example, whether and how to apply chroma QP offset lists may depend on whether the current block is coded in intra mode.
   j. In one example, whether and how to apply chroma QP offset lists may depend on whether the current block is coded in inter mode.
   k. In one example, whether and how to apply chroma QP offset lists may depend on whether the current block is coded in palette mode.
   l. In one example, whether and how to apply chroma QP offset lists may depend on whether the current block is coded in IBC mode.
   m. In one example, whether and how to apply chroma QP offset lists may depend on whether the current block is coded in transform skip mode.
   n. In one example, whether and how to apply chroma QP offset lists may depend on whether the current block is coded in BDPCM mode.
   o. In one example, whether and how to apply chroma QP offset lists may depend on whether the current block is coded in transform_quant_skip or lossless mode.

Regarding Chroma Deblocking at CTU Boundary
29. How to select the QPs (e.g., using corresponding luma or chroma dequantized QP) utilized in the deblocking filter process may be dependent on the position of samples relative to the CTU/CTB/VPDU boundaries.
30. How to select the QPs (e.g., using corresponding luma or chroma dequantized QP) utilized in the deblocking filter process may depend on color formats (such as RGB and YCbCr) and/or color sampling format (such as 4:2:0, 4:2:2 and 4:4:4), and/or color down-sampling positions or phases).
31. For edges at CTU boundary, the deblocking may be based on luma QP of the corresponding blocks.
   p. In one example, for horizontal edges at CTU boundary, the deblocking may be based on luma QP of the corresponding blocks.
      i. In one example, the deblocking may be based on luma QP of the corresponding blocks at P-side.
      ii. In one example, the deblocking may be based on luma QP of the corresponding blocks at Q-side.
   q. In one example, for vertical edges at CTU boundary, the deblocking may be based on luma QP of the corresponding blocks.
      i. In one example, the deblocking may be based on luma QP of the corresponding blocks at P-side.
      ii. In one example, the deblocking may be based on luma QP of the corresponding blocks at Q-side.
   r. In one example, for edges at CTU boundary, the deblocking may be based on luma QP at P-side and chroma QP at Q-side.
   s. In one example, for edges at CTU boundary, the deblocking may be based on luma QP at Q-side and chroma QP at P-side.
   t. In this bullet, "CTU boundary" may refer to a specific CTU boundary such as the upper CTU boundary or the lower CTU boundary.
32. For horizontal edges at CTU boundary, the deblocking may be based on a function of chroma QPs at P-side.
   u. In one example, the deblocking may be based on an averaging function of chroma QPs at P-side.
      i. In one example, the function may be based on the average of the chroma QPs for each 8 luma samples.
      ii. In one example, the function may be based on the average of the chroma QPs for each 16 luma samples.
      iii. In one example, the function may be based on the average of the chroma QPs for each 32 luma samples.
      iv. In one example, the function may be based on the average of the chroma QPs for each 64 luma samples.
      v. In one example, the function may be based on the average of the chroma QPs for each CTU.
   v. In one example, the deblocking may be based on a maximum function of chroma QPs at P-side.
      i. In one example, the function may be based on the maximum of the chroma QPs for each 8 luma samples.
      ii. In one example, the function may be based on the maximum of the chroma QPs for each 16 luma samples.
      iii. In one example, the function may be based on the maximum of the chroma QPs for each 32 luma samples.
      iv. In one example, the function may be based on the maximum of the chroma QPs for each 64 luma samples.
      v. In one example, the function may be based on the maximum of the chroma QPs for each CTU.
   w. In one example, the deblocking may be based on a minimum function of chroma QPs at P-side.
      i. In one example, the function may be based on the minimum of the chroma QPs for each 8 luma samples.
      ii. In one example, the function may be based on the minimum of the chroma QPs for each 16 luma samples.
      iii. In one example, the function may be based on the minimum of the chroma QPs for each 32 luma samples.
      iv. In one example, the function may be based on the minimum of the chroma QPs for each 64 luma samples.
      v. In one example, the function may be based on the minimum of the chroma QPs for each CTU.
   x. In one example, the deblocking may be based on a subsampling function of chroma QPs at P-side.
      i. In one example, the function may be based on the chroma QPs of the k-th chroma sample for each 8 luma samples.
         1. In one example, the k-th sample may be the first sample.
         2. In one example, the k-th sample may be the last sample.
         3. In one example, the k-th sample may be the third sample.
         4. In one example, the k-th sample may be the fourth sample.

ii. In one example, the function may be based on the chroma QPs of the k-th chroma sample for each 16 luma samples.
1. In one example, the k-th sample may be the first sample.
2. In one example, the k-th sample may be the last sample.
3. In one example, the k-th sample may be the 7-th sample.
4. In one example, the k-th sample may be the 8-th sample.
iii. In one example, the function may be based on the chroma QPs of the k-th chroma sample for each 32 luma samples.
1. In one example, the k-th sample may be the first sample.
2. In one example, the k-th sample may be the last sample.
3. In one example, the k-th sample may be the 15-th sample.
4. In one example, the k-th sample may be the 16-th sample.
iv. In one example, the function may be based on the chroma QPs of the k-th chroma sample for each 64 luma samples.
1. In one example, the k-th sample may be the first sample.
2. In one example, the k-th sample may be the last sample.
3. In one example, the k-th sample may be the 31-th sample.
4. In one example, the k-th sample may be the 32-th sample.
v. In one example, the function may be based on the chroma QPs of the k-th chroma sample for each CTU.
y. Alternatively, the above items may be applied to chroma QPs at Q-side for deblocking process.
33. It may be constrained that quantization group for chroma component must be larger than a certain size. A quantization group is a set of (one or more) coding units that carries a quantization parameter.
a. In one example, it may be constrained that the width of quantization group for chroma component must be larger than a certain value, K.
i. In one example, K is equal to 4.
34. It may be constrained that quantization group for luma component must be larger than a certain size.
a. In one example, it may be constrained that the width of quantization group for luma component must be larger than a certain value, K.
i. In one example, K is equal to 8.
35. It may be constrained that QP for chroma component may be the same for a chroma row segment with length 4*m starting from (4*m*x, 2y) relative to top-left of the picture, where x and y are non-negative integers; and m is a positive integer.
z. In one example, m may be equal to 1.
aa. In one example, the width of a quantization group for chroma component must be no smaller than 4*m.
36. It may be constrained that QP for chroma component may be the same for a chroma column segment with length 4*n starting from (2*x, 4*n*y) relative to top-left of the picture, where x and y are non-negative integers; and n is a positive integer.
bb. In one example, n may be equal to 1.
cc. In one example, the height of a quantization group for chroma component must be no smaller than 4*n.

Regarding Chroma Deblocking Filtering Process
37. A first syntax element controlling the usage of coding tool X may be signalled in a first video unit (such as picture header), depending on a second syntax element signalled in a second video unit (such as SPS or PPS, or VPS).
a. In one example, the first syntax element is signalled only if the second syntax element indicates that the coding tool X is enabled.
b. In one example, X is Bi-Direction Optical Flow (BDOF).
c. In one example, X is Prediction Refinement Optical Flow (PROF).
d. In one example, X is Decoder-side Motion Vector Refinement (DMVR).
e. In one example, the signalling of the usage of a coding tool X may be under the condition check of slice types (e.g., P or B slices; non-I slices).

Regarding Chroma Deblocking Filtering Process
38. Deblocking filter decision processes for two chroma blocks may be unified to be only invoked once and the decision is applied to two chroma blocks.
b. In one example, the decision for whether to perform deblocking filter may be same for Cb and Cr components.
c. In one example, if the deblocking filter is determined to be applied, the decision for whether to perform stronger deblocking filter may be same for Cb and Cr components.
d. In one example, the deblocking condition and strong filter on/off condition, as described in section 2.2.7, may be only checked once. However, it may be modified to check the information of both chroma components.
i. In one example, the average of gradients of Cb and Cr components may be used in the above decisions for both Cb and Cr components.
ii. In one example, the chroma stronger filters may be performed only when the strong filter condition is satisfied for both Cb and Cr components.
1. Alternatively, in one example, the chroma weak filters may be performed only when the strong filter condition is not satisfied at least one chroma component On ACT
39. Whether deblocking QP is equal to dequantization QP may depend on whether ACT is applied.
a. In one example, when ACT is applied to a block, deblocking QP values may depend on QP values before ACT QP adjustment.
b. In one example, when ACT is not applied to a block, deblocking QP values may always equal to dequantization QP values.
c. In one example, when both ACT and TS are not applied to a block, deblocking QP values may always equal to dequantization QP values.
40. ACT and BDPCM may be applied exclusively at block level.
a. In one example, when ACT is applied on a block, luma BDPCM shall not be applied on that block.
b. In one example, when ACT is applied on a block, chroma BDPCM shall not be applied on that block.
c. In one example, when ACT is applied on a block, both luma and chroma BDPCM shall not be applied on that block.

d. In one example, when luma and/or chroma BDPCM is applied on a block, ACT shall not be applied on that block.

41. Whether to enable BDPCM mode may be inferred based on the usage of ACT (e.g. cu_act_enabled_flag).
   a. In one example, the inferred value of chroma BDPCM mode may be defined as (cu_act_enabled_flag && intra_bdpcm_luma_flag && sps_bdpcm_chroma_enabled_flag? true: false).
   b. In one example, if sps_bdpcm_chroma_enabled_flag is false, the intra_bdpcm_luma_flag may be inferred to false when it is not signalled and cu_act_enabled_flag is true.
   c. In one example, the cu_act_enabled_flag may be inferred to false when intra_bdpcm_luma_flag is true and sps_bdpcm_chroma_enabled_flag is false.
   d. In one example, the intra_bdpcm_luma_flag may be inferred to false when cu_act_enabled_flag is true and sps_bdpcm_chroma_enabled_flag is false.

General

42. The above proposed methods may be applied under certain conditions.
   a. In one example, the condition is the colour format is 4:2:0 and/or 4:2:2.
      i. Alternatively, furthermore, for 4:4:4 colour format, how to apply deblocking filter to the two colour chroma components may follow the current design.
   b. In one example, indication of usage of the above methods may be signalled in sequence/picture/slice/tile/brick/a video region-level, such as SPS/PPS/picture header/slice header.
   c. In one example, the usage of above methods may depend on
      ii. Video contents (e.g. screen contents or natural contents)
      iii. A message signaled in the DPS/SPS/VPS/PPS/APS/picture header/slice header/tile group header/Largest coding unit (LCU)/Coding unit (CU)/LCU row/group of LCUs/TU/PU block/Video coding unit
      iv. Position of CU/PU/TU/block/Video coding unit
         a. In one example, for filtering samples along the CTU/CTB boundaries (e.g., the first K (e.g., K=4/8) to the top/left/right/bottom boundaries), the existing design may be applied. While for other samples, the proposed method (e.g., bullets 3/4) may be applied instead.
      v. Coded modes of blocks containing the samples along the edges
      vi. Transform matrices applied to the blocks containing the samples along the edges
      vii. Block dimension of current block and/or its neighboring blocks
      viii. Block shape of current block and/or its neighboring blocks
      ix. Indication of the color format (such as 4:2:0,4:4:4, RGB or YUV)
      x. Coding tree structure (such as dual tree or single tree)
      xi. Slice/tile group type and/or picture type
      xii. Color component (e.g. may be only applied on Cb or Cr)
      xiii. Temporal layer ID
      xiv. Profiles/Levels/Tiers of a standard
      xv. Alternatively, m and/or n may be signalled to the decoder.

5. Additional Embodiments

The newly added texts are shown in underlined bold italicized font. The deleted texts are marked by [[ ]].

5.1. Embodiment #1 on Chroma QP in Deblocking 8.8.3.6 Edge Filtering Process for One Direction

. . .

Otherwise (cIdx is not equal to 0), the filtering process for edges in the chroma coding block of current coding unit specified by cIdx consists of the following ordered steps:

1. The variable cQpPicOffset is derived as follows:

$$cQpPicOffset = cIdx == 1 ? pps\_cb\_qp\_offset : pps\_cr\_qp\_offset \quad (8\text{-}1065)$$

8.8.3.6.3 Decision Process for Chroma Block Edges

. . .

The variables $Qp_Q$ and $Qp_P$ are set equal to the $Qp_Y$ values of the coding units which include the coding blocks containing the sample $q_{0,0}$ and $p_{0,0}$, respectively.

The variable $Qp_C$ is derived as follows:

$$[[qPi = \text{Clip3}(0, 63, ((Qp_Q + Qp_P + 1) >> 1) + cQpPicOffset) \quad (8\text{-}1132)$$

$$Qp_C = \text{Chroma}Qp\text{Table}[cIdx-1][qPi] \quad (8\text{-}1133)]]$$

$$qPi = (Qp_Q + Qp_P + 1) >> 1 \quad (8\text{-}1132)$$

$$Qp_C = \text{Chroma}Qp\text{Table}[cIdx-1][qPi] + cQpPicOffset \quad (8\text{-}1133)$$

NOTE—The variable cQpPicOffset provides an adjustment for the value of pps_cb_qp_offset or pps_cr_qp_offset, according to whether the filtered chroma component is the Cb or Cr component. However, to avoid the need to vary the amount of the adjustment within the picture, the filtering process does not include an adjustment for the value of slice_cb_qp_offset or slice_cr_qp_offset n or (when cu_chroma_qp_offset_enabled_flag is equal to 1) for the value of $CuQpOffset_{Cb}$, $CuQpOffset_{Cr}$, or $CuQpOffset_{CbCr}$.

The value of the variable β' is determined as specified in Table 8-18 based on the quantization parameter Q derived as follows:

$$Q = \text{Clip3}(0, 63, Qp_C + (slice\_beta\_offset\_div2 << 1)) \quad (8\text{-}1134)$$

where slice_beta_offset_div2 is the value of the syntax element slice_beta_offset_div2 for the slice that contains sample $q_{0,0}$.

The variable β is derived as follows:

$$\beta = \beta'*(1 << (BitDepth_C - 8)) \quad (8\text{-}1135)$$

The value of the variable $t_C'$ is determined as specified in Table 8-18 based on the chroma quantization parameter Q derived as follows:

$$Q = \text{Clip3}(0, 65, Qp_C + 2*(bS-1) + (slice\_tc\_offset\_div2 << 1)) \quad (8\text{-}1136)$$

where slice_tc_offset_div2 is the value of the syntax element slice_tc_offset_div2 for the slice that contains sample $q_{0,0}$.

The variable $t_C$ is derived as follows:

$$t_C = (BitDepth_C < 10) ? (t_C' + 2) >> (10 - BitDepth_C) : t_C' * (1 << (BitDepth_C - 8)) \quad (8\text{-}1137)$$

5.2. Embodiment #2 on Boundary Strength Derivation 8.8.3.5 Derivation Process of Boundary Filtering Strength Inputs to this process are:
 a picture sample array recPicture,
 a location (xCb, yCb) specifying the top-left sample of the current coding block relative to the top-left sample of the current picture, a variable nCbW specifying the width of the current coding block, a variable nCbH specifying the height of the current coding block, a variable edge Type specifying whether a vertical(EDGE_VER) or a horizontal(EDGE_HOR) edge is filtered, a variable cIdx specifying the colour component of the current coding block, a two-dimensional(nCbW)×(nCbH) array edge Flags.

Output of this process is a two-dimensional(nCbW)×(nCbH) array bS specifying the boundary filtering strength.

. . .

For $xD_i$ with i=0 . . . xN and $yD_j$ with j=0 . . . yN, the following applies:

If edgeFlags[$xD_i$][$yD_j$] is equal to 0, the variable bS[$xD_i$][$yD_j$] is set equal to 0.

Otherwise, the following applies:

. . .

The variable bS[$xD_i$][$yD_j$] is derived as follows:

If cIdx is equal to 0 and both samples $p_0$ and $q_0$ are in a coding block with intra_bdpcm_flag equal to 1, bS[$xD_i$][$yD_j$] is set equal to 0.

Otherwise, if the sample $p_0$ or $q_0$ is in the coding block of a coding unit coded with intra prediction mode, bS[$xD_i$][$yD_j$] is set equal to 2.

Otherwise, if the block edge is also a transform block edge and the sample $p_0$ or $q_0$ is in a coding block with ciip_flag equal to 1, bS[$xD_i$][$yD_j$] is set equal to 2.

Otherwise, if the block edge is also a transform block edge and the sample $p_0$ or $q_0$ is in a transform block which contains one or more non-zero transform coefficient levels, bS[$xD_i$][$yD_j$] is set equal to 1.

Otherwise, if the block edge is also a transform block edge, cIdx is greater than 0, and the sample $p_0$ or $q_0$ is in a transform unit with tu_joint_cbcr_residual_flag equal to 1, bS[$xD_i$][$yD_j$] is set equal to 1.

Otherwise, if the prediction mode of the coding subblock containing the sample $p_0$ is different from the prediction mode of the coding subblock containing the sample $q_0$ (i.e. one of the coding subblock is coded in IBC prediction mode and the other is coded in inter prediction mode), bS[$xD_i$][$yD_j$] is set equal to 1

Otherwise, if cIdx is equal to 0 and one or more of the following conditions are true, bS[$xD_i$][$yD_j$] is set equal to 1:

- *The absolute difference between the horizontol or vertical component of list 0 motion vectors used in the prediction of the two coding subblocks is greater than or equal to 8 in 1/16 luma samples, or the absolute difference between the horizontal or vertical component of the list 1 motion vectors used in the prediction of the two coding subblocks is greater than or equal to 8 in units of 1/16 luma samples.*

[[The coding subblock containing the sample $p_0$ and the coding subblock containing the sample $q_0$ are both coded in IBC prediction mode, and the absolute difference between the horizontal or vertical component of the block vectors used in the prediction of the two coding subblocks is greater than or equal to 8 in units of 1/16 luma samples.

For the prediction of the coding subblock containing the sample $p_0$ different reference pictures or a different number of motion vectors are used than for the prediction of the coding subblock containing the sample $q_0$.

NOTE 1—The determination of whether the reference pictures used for the two coding subblocks are the same or different is based only on which pictures are referenced, without regard to whether a prediction is formed using an index into reference picture list 0 or an index into reference picture list 1, and also without regard to whether the index position within a reference picture list is different.

NOTE 2—The number of motion vectors that are used for the prediction of a coding subblock with top-left sample covering (xSb, ySb), is equal to PredFlagL0[xSb][y Sb]+PredFlagL1[xSb][y Sb].

One motion vector is used to predict the coding subblock containing the sample $p_0$ and one motion vector is used to predict the coding subblock containing the sample $q_0$, and the absolute difference between the horizontal or vertical component of the motion vectors used is greater than or equal to 8 in units of 1/16 luma samples.

Two motion vectors and two different reference pictures are used to predict the coding subblock containing the sample $p_0$, two motion vectors for the same two reference pictures are used to predict the coding subblock containing the sample $q_0$ and the absolute difference between the horizontal or vertical component of the two motion vectors used in the prediction of the two coding subblocks for the same reference picture is greater than or equal to 8 in units of 1/16 luma samples.

Two motion vectors for the same reference picture are used to predict the coding subblock containing the sample $p_0$, two motion vectors for the same reference picture are used to predict the coding subblock containing the sample $q_0$ and both of the following conditions are true:

The absolute difference between the horizontal or vertical component of list 0 motion vectors used in the prediction of the two coding subblocks is greater than or equal to 8 in 1/16 luma samples, or the absolute difference between the horizontal or vertical component of the list 1 motion vectors used in the prediction of the two coding subblocks is greater than or equal to 8 in units of 1/16 luma samples.

The absolute difference between the horizontal or vertical component of list 0 motion vector used in the prediction of the coding subblock containing the sample $p_0$ and the list 1 motion vector used in the prediction of the coding subblock containing the sample $q_0$ is greater than or equal to 8 in units of 1/16 luma samples, or the absolute difference between the horizontal or vertical component of the list 1 motion vector used in the prediction of the coding subblock containing the sample $p_0$ and list 0 motion vector used in the prediction of the coding subblock containing the sample $q_0$ is greater than or equal to 8 in units of 1/16 luma samples.]]

Otherwise, the variable $bS[xD_i][yD_j]$ is set equal to 0.

5.3. Embodiment #3 on Boundary Strength Derivation 8.8.3.5 Derivation Process of Boundary Filtering Strength
Inputs to this process are:
 a picture sample array recPicture,
 a location (xCb, yCb) specifying the top-left sample of the current coding block relative to the top-left sample of the current picture,
 a variable nCbW specifying the width of the current coding block,
 a variable nCbH specifying the height of the current coding block,
 a variable edge Type specifying whether a vertical(EDGE_VER) or a horizontal(EDGE_HOR) edge is filtered,
 a variable cIdx specifying the colour component of the current coding block,
 a two-dimensional(nCbW)×(nCbH) array edge Flags.
Output of this process is a two-dimensional(nCbW)×(nCbH) array b S specifying the boundary filtering strength.
. . .
For $xD_i$ with i=0 . . . xN and $yD_j$ with j=0 . . . yN, the following applies:
 If edgeFlags$[xD_i][yD_j]$ is equal to 0, the variable $bS[xD_i][yD_j]$ is set equal to 0.
 Otherwise, the following applies:
  . . .
  The variable $bS[xD_i][yD_j]$ is derived as follows:
   If cIdx is equal to 0 and both samples $p_0$ and $q_0$ are in a coding block with intra_bdpcm_flag equal to 1, $bS[xD_i][yD_j]$ is set equal to 0.
   Otherwise, if the sample $p_0$ or $q_0$ is in the coding block of a coding unit coded with intra prediction mode, $bS[xD_i][yD_j]$ is set equal to 2.
   Otherwise, if the block edge is also a transform block edge and the sample $p_0$ or $q_0$ is in a coding block with ciip_flag equal to 1, $bS[xD_i][yD_j]$ is set equal to 2.
   Otherwise, if the block edge is also a transform block edge and the sample $p_0$ or $q_0$ is in a transform block which contains one or more non-zero transform coefficient levels, $bS[xD_i][yD_j]$ is set equal to 1.
   [[Otherwise, if the block edge is also a transform block edge, cIdx is greater than 0, and the sample $p_0$ or $q_0$ is in a transform unit with tu_joint_cbcr_residual_flag equal to 1, $bS[xD_i][yD_j]$ is set equal to 1.]]
   Otherwise, if the prediction mode of the coding subblock containing the sample $p_0$ is different from the prediction mode of the coding subblock containing the sample $q_0$ (i.e. one of the coding subblock is coded in IBC prediction mode and the other is coded in inter prediction mode), $bS[xD_i][yD_j]$ is set equal to 1
   Otherwise, if cIdx is equal to 0 and one or more of the following conditions are true, $bS[xD_i][yD_j]$ is set equal to 1:
    The coding subblock containing the sample $p_0$ and the coding subblock containing the sample $q_0$ are both coded in IBC prediction mode, and the absolute difference between the horizontal or vertical component of the block vectors used in the prediction of the two coding subblocks is greater than or equal to 8 in units of 1/16 luma samples.
    For the prediction of the coding subblock containing the sample $p_0$ different reference pictures or a different number of motion vectors are used than for the prediction of the coding subblock containing the sample $q_0$.
     NOTE 1—The determination of whether the reference pictures used for the two coding subblocks are the same or different is based only on which pictures are referenced, without regard to whether a prediction is formed using an index into reference picture list 0 or an index into reference picture list 1, and also without regard to whether the index position within a reference picture list is different.
     NOTE 2—The number of motion vectors that are used for the prediction of a coding subblock with top-left sample covering (xSb, ySb), is equal to PredFlagL0[xSb][y Sb]+PredFlagL1[xSb][ySb].
    One motion vector is used to predict the coding subblock containing the sample $p_0$ and one motion vector is used to predict the coding subblock containing the sample $q_0$, and the absolute difference between the horizontal or vertical component of the motion vectors used is greater than or equal to 8 in units of 1/16 luma samples.
    Two motion vectors and two different reference pictures are used to predict the coding subblock containing the sample $p_0$, two motion vectors for the same two reference pictures are used to predict the coding subblock containing the sample $q_0$ and the absolute difference between the horizontal or vertical component of the two motion vectors used in the prediction of the two coding subblocks for the same reference picture is greater than or equal to 8 in units of 1/16 luma samples.
    Two motion vectors for the same reference picture are used to predict the coding subblock containing the sample $p_0$, two motion vectors for the same reference picture are used to predict the coding subblock containing the sample $q_0$ and both of the following conditions are true:
     The absolute difference between the horizontal or vertical component of list 0 motion vectors used in the prediction of the two coding subblocks is greater than or equal to 8 in 1/16 luma samples, or the absolute difference between the horizontal or vertical component of the list 1 motion vectors used in the prediction of the two coding subblocks is greater than or equal to 8 in units of 1/16 luma samples.

The absolute difference between the horizontal or vertical component of list 0 motion vector used in the prediction of the coding subblock containing the sample $p_0$ and the list 1 motion vector used in the prediction of the coding subblock containing the sample $q_0$ is greater than or equal to 8 in units of 1/16 luma samples, or the absolute difference between the horizontal or vertical component of the list 1 motion vector used in the prediction of the coding subblock containing the sample $p_0$ and list 0 motion vector used in the prediction of the coding subblock containing the sample $q_0$ is greater than or equal to 8 in units of 1/16 luma samples.

Otherwise, the variable $bS[xD_i][yD_j]$ is set equal to 0.

5.4. Embodiment #4 on Luma Deblocking Filtering Process 8.8.3.6.1 Decision Process for Luma Block Edges
Inputs to this process are:
  a picture sample array recPicture,
  a location (xCb, yCb) specifying the top-left sample of the current coding block relative to the top-left sample of the current picture,
  a location (xBl, yBl) specifying the top-left sample of the current block relative to the top-left sample of the current coding block,
  a variable edge Type specifying whether a vertical(EDGE_VER) or a horizontal(EDGE_HOR) edge is filtered,
  a variable bS specifying the boundary filtering strength,
  a variable maxFilterLengthP specifying the max filter length,
  a variable maxFilterLengthQ specifying the max filter length.
Outputs of this process are:
  the variables dE, dEp and dEq containing decisions,
  the modified filter length variables maxFilterLengthP and maxFilterLengthQ,
  the variable $t_C$.
. . .
The following ordered steps apply:
. . .
1. When side PisLargeBlk or side QisLargeBlk is greater than 0, the following applies:
    a. The variables dp0L, dp3L are derived and maxFilterLengthP is modified as follows:
      [[If side PisLargeBlk is equal to 1, the following applies:

$dp0L=(dp0+\text{Abs}(p_{5,0}-2*p_{4,0}+p_{3,0})+1)>>1$ (8-1087)

$dp3L=(dp3+\text{Abs}(p_{5,3}-2*p_{4,3}+p_{3,3})+1)>>1$ (8-1088)

Otherwise, the following applies:]]

$dp0L=dp0$ (8-1089)

$dp3L=dp3$ (8-1090)

[[maxFilterLengthP=3]] (8-1091)
      *maxFilterLengthP=sidePisLargeBlk?*
      *maxFilterLengthP:3* b. The variables dq0L and dq3L are derived as follows:
      [[If side QisLargeBlk is equal to 1, the following applies:

$dq0L=(dq0+\text{Abs}(q_{5,0}-2*q_{4,0}+q_{3,0})+1)>>1$ (8-1092)

$dq3L=(dq3+\text{Abs}(q_{5,3}-2*q_{4,3}+q_{3,3})+1)>>1$ (8-1093)

Otherwise, the following applies:]]

$dq0L=dq0$ (8-1094)

$dq3L=dq3$ (8-1095)

*maxFilterLengthQ=sidePisLargeBlk?*
      *maxFilterLengthQ:3*

. . .
2. The variables dE, dEp and dEq are derived as follows:
. . .

5.5. Embodiment #5 on Chroma Deblocking Filtering Process 8.8.3.6.3 Decision Process for Chroma Block Edges
This process is only invoked when ChromaArrayType is not equal to 0.
Inputs to this process are:
  a chroma picture sample array recPicture,
  a chroma location (xCb, yCb) specifying the top-left sample of the current chroma coding block relative to the top-left chroma sample of the current picture,
  a chroma location (xBl, yBl) specifying the top-left sample of the current chroma block relative to the top-left sample of the current chroma coding block,
  a variable edge Type specifying whether a vertical(EDGE_VER) or a horizontal(EDGE_HOR) edge is filtered,
  a variable cIdx specifying the colour component index,
  a variable cQpPicOffset specifying the picture-level chroma quantization parameter offset,
  a variable bS specifying the boundary filtering strength,
  a variable maxFilterLengthCbCr.
Outputs of this process are
  the modified variable maxFilterLengthCbCr,
  the variable $t_C$.
The variable maxK is derived as follows:
  If edge Type is equal to EDGE_VER, the following applies:

$\text{max}K=(\text{SubHeight}C==1)?3:1$ (8-1124)

Otherwise (edge Type is equal to EDGE_HOR), the following applies:

$\text{max}K=(\text{SubWidth}C==1)?3:1$ (8-1125)

The values $p_i$ and $q_i$ with i=0 . . . maxFilterLengthCbCr and k=0 . . . maxK are derived as follows:
  If edge Type is equal to EDGE_VER, the following applies:

$q_{i,k}=\text{recPicture}[xCb+xBl+i][yCb+yBl+k]$ (8-1126)

$p_{i,k}=\text{recPicture}[xCb+xBl-i-1][yCb+yBl+k]$ (8-1127)

subSampleC=SubHeightC (8-1128)

Otherwise (edge Type is equal to EDGE_HOR), the following applies:

$q_{i,k}=\text{recPicture}[xCb+xBl+k][yCb+yBl+i]$ (8-1129)

$p_{i,k}=\text{recPicture}[xCb+xBl+k][yCb+yBl-i-1]$ (8-1130)

subSampleC=SubWidthC (8-1131)

*When ChromaArray Type is not equal to 0 and treeType is equal to SINGLE_TREE or DUAL_TREE_CHROMA, the following applies:*

- *When tree Type is equal to DUAL_TREE_CHROMA, the variable $Qp_Y$ is set equal to the luma quantization parameter $Qp_Y$ of the luma coding unit that covers the luma location (xCb+cbWidth/2, yCb+cbHeight/2).*
- *The variables $qP_{Cb}$, $qP_{Cr}$ and $qP_{CbCr}$ are derived as follows:*

$qPi_{Chroma} = Clip3(-QpBd_C, 63, Qp_Y)$  (8-935)
   $qPi_{Cb} = ChromaQpTable[0][qPi_{Chroma}]$  (8-936)
   $qPi_{Cr} = ChromaQpTable[1][qPi_{Chroma}]$  (8-937)
   $qPi_{CbCr} = ChromaQpTable[2][qPi_{Chroma}]$  (8-938)

- *The chroma quantization parameters for the Cb and Cr components, $Qp'_{Cb}$ and $Qp'_{Cr}$ and joint Cb-Cr coding $Qp'_{CbCr}$ are derived as follows:*

$Qp'_{Cb} = Clip3(-QpBdOffset_C, 63,$
   $qP_{Cb} + pps\_cb\_qp\_offset + slice\_$
   $cb\_qp\_offset + CuQpOffset_{Cb})$  (8-*939*)

$Qp'_{Cr} = Clip3(-QpBdOffset_C, 63, qP_{Cr} + pps\_$
   $cr\_qp\_offset + slice\_cr\_qp\_$
   $offset +CuQpOffset_{Cr})$  (8-940)

$Qp'_{CbCr} = Clip3(-QpBdOffset_C, 63,$
   $qP_{CbCr} + pps\_cbcr\_qp\_offset+slice\_$
   $cbcr\_qp\_offset+CuQpOffset_{CbCr})$  (8-941)

*The variables $Qp_Q$ and $Qp_P$ are set equal to the corresponding $Qp'_{Cb}$ or $Qp'_{Cr}$ or $Qp'_{CbCr}$ values of the coding units which include the coding blocks containing the sample $q_{0,0}$ and $p_{0,0}$, respectively.*

*The variable $Qp_C$ is derived as follows:*
$Qp_C = (Qp_Q + Qp_P + 1) >> 1$  (8-1133)

The value of the variable β' is determined as specified in Table t-18 based on the quantization parameter Q derived as follows:

$Q = Clip3(0, 63, Qp_C + (slice\_beta\_offset\_div2 << 1))$  (8-1134)

where slice_beta_offset_div2 is the value of the syntax element slice_beta_offset_div2 for the slice that contains sample $q_{0,0}$.

The variable β is derived as follows:

$β = β'*(1<<(BitDepth_C−8))$  (8-1135)

The value of the variable $t_C'$ is determined as specified in Table 8-18 based on the chroma quantization parameter Q derived as follows:

$Q = Clip3(0, 65, Qp_C + 2*(bS−1) + (slice\_tc\_offset\_div2<<1))$  (8-1136)

where slice_tc_offset_div2 is the value of the syntax element slice_tc_offset_div2 for the slice that contains sample $q_{0,0}$.
The variable $t_C$ is derived as follows:

$t_C = (BitDepth_C < 10)?(t_C'+2)>>(10−BitDepth_C): t_C'*(1<<(BitDepth_C−8))$  (8-1137)

When maxFilterLengthCbCr is equal to 1 and bS is not equal to 2, maxFilterLengthCbCr is set equal to 0.

5.6. Embodiment #6 on Chroma QP in Deblocking 8.8.3.6.3 Decision Process for Chroma Block Edges
This process is only invoked when ChromaArrayType is not equal to 0.
Inputs to this process are:
   a chroma picture sample array recPicture,
   a chromalocation (xCb, yCb) specifying the top-left sample of the current chroma coding block relative to the top-left chroma sample of the current picture,
   a chroma location (xBl, yBl) specifying the top-left sample of the current chroma block relative to the top-left sample of the current chroma coding block,
   a variable edge Type specifying whether a vertical(EDGE_VER) or a horizontal(EDGE_HOR) edge is filtered,
   a variable cIdx specifying the colour component index,
   a variable cQpPicOffset specifying the picture-level chroma quantization parameter offset,
   a variable bS specifying the boundary filtering strength,
   a variable maxFilterLengthCbCr.
Outputs of this process are
   the modified variable maxFilterLengthCbCr,
   the variable $t_C$.
The variable maxK is derived as follows:
   If edge Type is equal to EDGE_VER, the following applies:

$maxK = (SubHeightC == 1)?3:1$  (8-1124)

Otherwise (edge Type is equal to EDGE_HOR), the following applies:

$maxK = (SubWidthC == 1)?3:1$  (8-1125)

The values $p_i$ and $q_i$ with i=0 ... maxFilterLengthCbCr and k=0 ... maxK are derived as follows:
   If edge Type is equal to EDGE_VER, the following applies:

$q_{i,k} = recPicture[xCb+xBl+i][yCb+yBl+k]$  (8-1126)

$p_{i,k} = recPicture[xCb+xBl−i−1][yCb+yBl+k]$  (8-1127)

$subSampleC = SubHeightC$  (8-1128)

Otherwise (edge Type is equal to EDGE_HOR), the following applies:

$q_{i,k} = recPicture[xCb+xBl+k][yCb+yBl+i]$  (8-1129)

$p_{i,k} = recPicture[xCb+xBl+k][yCb+yBl−i−1]$  (8-1130)

$subSampleC = SubWidthC$  (8-1131)

The variables $Qp_Q$ and $Qp_P$ are set equal to the $Qp_Y$ values of the coding units which include the coding blocks containing the sample $q_{0,0}$ and $p_{0,0}$, respectively.
*The variables $jccr\_flag_P$ and $jccr\_flag_Q$ are set equal to the tu_joint_cbcr_residual_flag values of the coding units which include the coding blocks containing the sample $q_{0,0}$ and $p_{0,0}$, respectively.*
The variable $Qp_C$ is derived as follows:

[[$qPi = Clip3(0, 63, ((Qp_Q + Qp_P + 1)>>1) + cpPicOffset)$  (8-1132)]]

*$qPi = Clip3(0, 63, ((Qp_Q + (jccr\_flag_P? pps\_joint\_cbcr\_qp\_offset : cQpPicOffset) + Qp_P + (jccr\_flag_Q ? pps\_joint\_cbcr\_qp\_offset : cQpPicOffset) + 1) >> 1))*

$Qp_C = ChromaQpTable[cIdx−1][qPi]$  (8-1133)

NOTE—The variable cQpPicOffset provides an adjustment for the value of pps_cb_qp_offset or pps_cr_qp_offset, according to whether the filtered chroma component is the Cb or Cr component. However, to avoid the need to vary the amount of the adjustment within the picture, the filtering process does not include an adjustment for the value of slice_cb_qp_offset or slice_cr_qp_offset n or (when cu_chroma_qp_offset_enabled_flag is equal to 1) for the value of CuQpOffset$_{Cb}$, CuQpOffset$_{Cr}$, or CuQpOffset$_{CbCr}$.

. . .

5.7. Embodiment #7 on Chroma QP in Deblocking 8.8.3.6.3 Decision Process for Chroma Block Edges
This process is only invoked when ChromaArrayType is not equal to 0.
Inputs to this process are:
  a chroma picture sample array recPicture,
  a chroma location (xCb, yCb) specifying the top-left sample of the current chroma coding block relative to the top-left chroma sample of the current picture,
  . . .
Outputs of this process are
  the modified variable maxFilterLengthCbCr,
  the variable t$_C$.
The variable maxK is derived as follows:
  If edge Type is equal to EDGE_VER, the following applies:

$$maxK=(SubHeightC==1)?3:1 \quad (8\text{-}1124)$$

Otherwise (edge Type is equal to EDGE_HOR), the following applies:

$$maxK=(SubWidthC==1)?3:1 \quad (8\text{-}1125)$$

The values p$_i$ and q$_i$ with i=0 . . . maxFilterLengthCbCr and k=0 . . . maxK are derived as follows:
  If edge Type is equal to EDGE_VER, the following applies:

$$q_{i,k}=recPicture[xCb+xBl+i][yCb+yBl+k] \quad (8\text{-}1126)$$

$$p_{i,k}=recPicture[xCb+xBl-i-1][yCb+yBl+k] \quad (8\text{-}1127)$$

$$subSampleC=SubHeightC \quad (8\text{-}1128)$$

Otherwise (edge Type is equal to EDGE_HOR), the following applies:

$$q_{i,k}=recPicture[xCb+xBl+k][yCb+yBl+i] \quad (8\text{-}1129)$$

$$p_{i,k}=recPicture[xCb+xBl+k][yCb+yBl-i-1] \quad (8\text{-}1130)$$

$$subSampleC=SubWidthC \quad (8\text{-}1131)$$

[[The variables Qp$_Q$ and Qp$_P$ are set equal to the Qp$_Y$ values of the coding units which include the coding blocks containing the sample q$_{0,0}$ and p$_{0,0}$, respectively.]]
*The variables Qp$_Q$ is set equal to the luma quantization parameter Qp$_Y$ of the luma coding unit that covers the luma location (xCb + cbWidth/2, yCb + cbHeight/2) wherein cbWidth specifies the width of the current chroma coding block in luma samples, and cbHeight specifies the height of the current chroma coding block in luma samples. The variables Qp$_P$ is set equal to the luma quantization parameter Qp$_Y$ of the luma coding unit that covers the luma location (xCb' + cbWidth'/2, yCb' + cbHeight'/2) wherein (xCb', yCb') the top-left sample of the chroma coding block covering q$_{0,0}$ relative to the top-left chroma sample of the current picture, cbWidth' specifies the width of the current chroma coding block in luma samples, and cbHeight specifies the height of the current of the current chroma coding block in luma samples.*

The variable Qp$_C$ is derived as follows:

$$qPi=Clip3(0,63,((Qp_Q+Qp_P+1)>>1)+cQpPicOffset) \quad (8\text{-}1132)$$

$$Qp_C=ChromaQpTable[cIdx-1][qPi] \quad (8\text{-}1133)$$

NOTE—The variable cQpPicOffset provides an adjustment for the value of pps_cb_qp_offset or pps_cr_qp_offset, according to whether the filtered chroma component is the Cb or Cr component. However, to avoid the need to vary the amount of the adjustment within the picture, the filtering process does not include an adjustment for the value of slice_cb_qp_offset or slice_cr_qp_offset n or (when cu_chroma_qp_offset_enabled_flag is equal to 1) for the value of CuQpOffset$_{Cb}$, CuQpOffset$_{Cr}$, or CuQpOffset$_{CbCr}$.

The value of the variable β' is determined as specified in Table 8-18 based on the quantization parameter Q derived as follows:

$$Q=Clip3(0,63,Qp_C+(slice\_beta\_offset\_div2<<1)) \quad (8\text{-}1134)$$

where slice_beta_offset_div2 is the value of the syntax element slice_beta_offset_div2 for the slice that contains sample q$_{0,0}$.
The variable β is derived as follows:

$$\beta=\beta'^*(1<<(BitDepth_C-8)) \quad (8\text{-}1135)$$

The value of the variable t$_C$' is determined as specified in Table 8-18 based on the chroma quantization parameter Q derived as follows:

$$Q=Clip3(0,65,Qp_C+2^*(bS-1)+(slice\_tc\_offset\_div2<<1)) \quad (8\text{-}1136)$$

where slice_tc_offset_div2 is the value of the syntax element slice_tc_offset_div2 for the slice that contains sample q$_{0,0}$.

5.8. Embodiment #8 on Chroma QP in Deblocking

Figure 11:
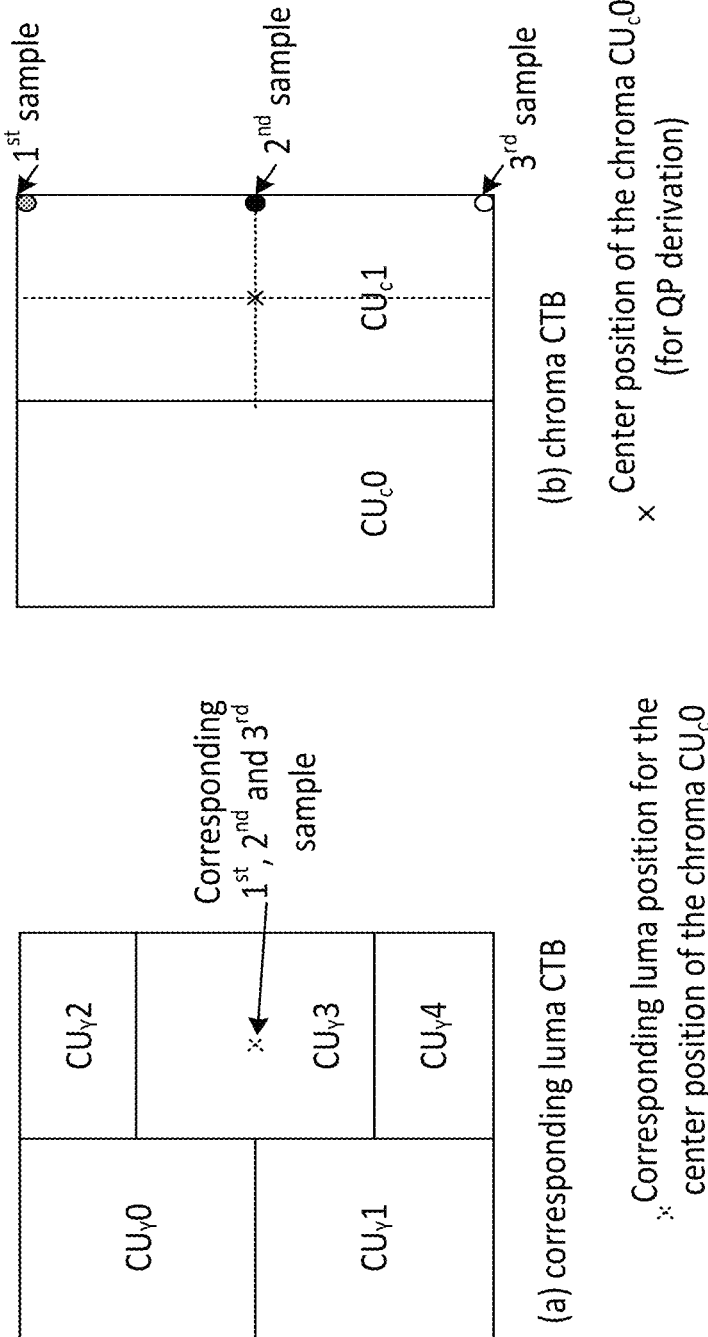
FIG. 11 shows examples of usage of a luma block's decoded information.

When making filter decisions for the depicted three samples (with solid circles), the QPs of the luma CU that covers the center position of the chroma CU including the three samples is selected. Therefore, for the 1$^{st}$, 2$^{nd}$, and 3$^{rd}$ chroma sample (depicted in FIG. 11), only the QP of CU$_Y$3 is utilized, respectively.
In this way, how to select luma CU for chroma quantization/dequantization process is aligned with that for chroma filter decision process.

5.9. Embodiment #9 on QP Used for JCCR Coded Blocks 8.7.3 Scaling Process for Transform Coefficients
Inputs to this process are:
  a luma location(xTbY, yTbY) specifying the top-left sample of the current luma transform block relative to the top-left luma sample of the current picture,
  a variable nTbW specifying the transform block width,
  a variable nTbH specifying the transform block height, a variable cIdx specifying the colour component of the current block, a variable bitDepth specifying the bit depth of the current colour component.

Output of this process is the (nTbW)×(nTbH) array d of scaled transform coefficients with elements d[x][y]. The quantization parameter qP is derived as follows:

If cIdx is equal to 0 and transform_skip_flag[xTbY][yTbY] is equal to 0, the following applies:

$$qP = Qp'_Y \quad (8\text{-}950)$$

Otherwise, if cIdx is equal to 0 (and transform_skip_flag[xTbY][yTbY] is equal to 1), the following applies:

$$qP = \text{Max}(QpPrimeTsMin, Qp'_Y) \quad (8\text{-}951)$$

Otherwise, if TuCResMode[xTbY][yTbY] is _unequal to 0_ [[equal to 2]], the following applies:

$$qP = Qp'_{CbCr} \quad (8\text{-}952)$$

Otherwise, if cIdx is equal to 1, the following applies:

$$qP = Qp'_{Cb} \quad (8\text{-}953)$$

Otherwise (cIdx is equal to 2), the following applies:

$$qP = Qp'_{Cr} \quad (8\text{-}954)$$

5.10 Embodiment #10 on QP Used for JCCR Coded Blocks 8.8.3.2 Deblocking Filter Process for One Direction Inputs to this process are:
the variable treeType specifying whether the luma (DUAL_TREE_LUMA) or chroma components (DUAL_TREE_CHROMA) are currently processed,
when treeType is equal to DUAL_TREE_LUMA, the reconstructed picture prior to deblocking, i.e., the array recPicture$_L$,
when ChromaArrayType is not equal to 0 and treeType is equal to DUAL_TREE_CHROMA, the arrays recPicture$_{Cb}$ and recPicture$_{Cr}$,
a variable edge Type specifying whether a vertical(EDGE_VER) or a horizontal(EDGE_HOR) edge is filtered.

Outputs of this process are the modified reconstructed picture after deblocking, i.e:
when treeType is equal to DUAL_TREE_LUMA, the array recPicture$_L$,
when ChromaArrayType is not equal to 0 and treeType is equal to DUAL_TREE_CHROMA, the arrays recPictuie$_{Cb}$ and recPicture$_{Cr}$.

The variables first CompIdx and last CompIdx are derived as follows:

$$\text{firstCompIdx} = (\text{treeType}==\text{DUAL\_TREE\_CHROMA})?1:0 \quad (8\text{-}1022)$$

$$\text{lastCompIdx} = (\text{treeType}==\text{DUAL\_TREE\_LUMA} \,||\, \text{ChromaArrayType}==0)?0:2 \quad (8\text{-}1023)$$

For each coding unit and each coding block per colour component of a coding unit indicated by the colour component index cIdx ranging from firstCompIdx to lastCompIdx, inclusive, with coding block width nCbW, coding block height nCbH and location of top-left sample of the coding block (xCb, yCb), when cIdx is equal to 0, or when cIdx is not equal to 0 and edge Type is equal to EDGE_VER and xCb % 8 is equal 0, or when cIdx is not equal to 0 and edge Type is equal to EDGE_HOR and yCb % 8 is equal to 0, the edges are filtered by the following ordered steps:

...

[[5. The picture sample array recPicture is derived as follows:
If cIdx is equal to 0, recPicture is set equal to the reconstructed luma picture sample array prior to deblocking recPicture$_L$.
Otherwise, if cIdx is equal to 1, recPicture is set equal to the reconstructed chroma picture sample array prior to deblocking recPicture$_{Cb}$.
Otherwise (cIdx is equal to 2), recPicture is set equal to the reconstructed chroma picture sample array prior to deblocking recPicture$_{Cr}$]]

_5. The picture sample array recPicture[i] with i = 0,1,2 is derived as follows:_
- _recPicture[0] is set equal to the reconstructed picture sample array prior to deblocking recPictureL._
- _recPicture[1] is set equal to the reconstructed picture sample array prior to deblocking recPictureCb._
- _recPicture[2] is set equal to the reconstructed picture sample array prior to deblocking recPictureCr_

...

**_if the cIdx is equal to 1,
the following process are applied_**: :
The edge filtering process for one direction is invoked for a coding block as specified in clause 8.8.3.6 with the variable edge Type, the variable cIdx, the reconstructed picture prior to deblocking recPicture, the location (xCb, yCb), the coding block width nCbW, the coding block height nCbH, and the arrays bS, maxFilterLengthPs, and maxFilterLengthQs, as inputs, and the modified reconstructed picture recPicture as output.

8.8.3.5 Derivation Process of Boundary Filtering Strength
Inputs to this process are:
a picture sample array recPicture,
a location (xCb, yCb) specifying the top-left sample of the current coding block relative to the top-left sample of the current picture,
a variable nCbW specifying the width of the current coding block,
a variable nCbH specifying the height of the current coding block,
a variable edge Type specifying whether a vertical(EDGE_VER) or a horizontal(EDGE_HOR) edge is filtered,
a variable cIdx specifying the colour component of the current coding block,
a two-dimensional(nCbW)×(nCbH) array edgeFlags.

Output of this process is a two-dimensional(nCbW)×(nCbH) array bS specifying the boundary filtering strength. The variables xD$_i$, yD$_j$, xN and yN are derived as follows:

...

For xD$_i$ with i=0 ... xN and yD$_j$ with j=0 ... yN, the following applies:
If edgeFlags[xD$_i$][yD$_j$] is equal to 0, the variable bS[xD$_i$][yD$_j$] is set equal to 0.
Otherwise, the following applies:
The sample values p$_0$ and q$_0$ are derived as follows:
If edge Type is equal to EDGE_VER, p$_0$ is set equal to recPicture_[cIdx]_[xCb+xD$_i$−1][yCb+yD$_j$] and q$_0$ is set equal to recPicture_[cIdx]_[xCb+xD$_i$][yCb+yD$_j$].

Otherwise (edge Type is equal to EDGE_HOR), $p_0$ is set equal to recPicture*[cIdx]* [xCb+xD$_i$][yCb+yD$_j$–1] and $q_0$ is set equal to recPicture *[cIdx]* [xCb+xD$_i$][yCb+yD$_j$].

. . .

8.8.3.6 Edge Filtering Process for One Direction

Inputs to this process are:

a variable edge Type specifying whether vertical edges (EDGE_VER) or horizontal edges (EDGE_HOR) ae currently processed, a variable cIdx specifying the current colour component, the reconstructed picture prior to deblocking recPicture, a location (xCb, yCb) specifying the top-left sample of the current coding block relative to the top-left sample of the current picture, a variable nCbW specifying the width of the current coding block, a variable nCbH specifying the height of the current coding block, the array bS specifying the boundary strength, the arrays maxFilterLengthPs and maxFilterLengthQs.

Output of this process is the modified reconstructed picture after deblocking recPicture$_i$.

. . .

Otherwise (cIdx is not equal to 0), the filtering process for edges in the chroma coding block of current coding unit specified by cIdx consists of the following ordered steps:

1. The variable cQpPicOffset is derived as follows:

*cQpPicOffset=cIdx==1 ?*
   *pps_cb_qp_offset : pps_cr_qp_offset*
                        *(8-1065)*
   *CQpPicOffset =(pps_cb_qp*
   *offset+pps_cr_qp_offset+1)>>1*
                        *(8-1065)*

2.                          *bS [XDk][yDm]for cIdx=1 and 2 Are modifiedto 1 ifbS[xDk] ][yDm] for cIdx=1 is equal to 1 or bS[xDk][yDm] for cIdx=2 is equal to 1*

3. The decision process for chroma block edges as specified in clause 8.8.3.6.3 is invoked with the chroma picture sample array recPicture, the location of the chroma coding block (xCb, yCb), the location of the chroma block (xBl, yBl) set equal to (xD$_k$, yD$_m$), the edge direction edge Type, the variable cQpPicOffset, the boundary filtering strength bS[xD$_k$][yD$_m$], and the variable maxFilterLengthCbCr set equal to maxFilterLengthPs[xD$_k$][yD$_m$] as inputs, and the modified variable maxFilterLengthCbCr, and the variable $t_C$ as outputs.

4. When maxFilterLengthCbCr is greater than 0, the filtering process for chroma block edges as specified in clause 8.8.3.6.4 is invoked with the chroma picture sample array recPicture, the location of the chroma coding block (xCb, yCb), the chroma location of the block (xBl, yBl) set equal to (xD$_k$, yD$_m$), the edge direction edge Type, the variable maxFilterLengthCbC r , *and the cIdx euqal to 1 as input*, and the variable $t_C$ as inputs, and the modified chroma picture sample array recPicture as output.

*When maxFilterLength CbCr is greater than 0 the filtering process for chroma block edges as specified in clause 8.8.3.6.4 is invoked with the chroma picture sample array recPicture, the location of the chroma coding block (xCb, yCb), the chroma location of the block (xBl, yBl) set equal to (xDk, yDm), the edge direction edge Type the variable maxFilter LengthCbCr, and the cIdx euqal to 2 as input and the variable tC as inputs and the modified chroma picture sample array recPicture as output*

8.8.3.6.3 Decision Process for Chroma Block Edges

This process is only invoked when ChromaArrayType is not equal to 0.

Inputs to this process are:

a chroma picture sample array recPicture, a chroma location (xCb, yCb) specifying the top-left sample of the current chroma coding block relative to the top-left chroma sample of the current picture, a chroma location (xBl, yBl) specifying the top-left sample of the current chroma block relative to the top-left sample of the current chroma coding block, a variable edge Type specifying whether a vertical(EDGE_VER) or a horizontal(EDGE_HOR) edge is filtered,

[[a variable cIdx specifying the colour component index,]]

a variable cQpPicOffset specifying the picture-level chroma quantization parameter offset, a variable bS specifying the boundary filtering strength, a variable maxFilterLengthCbCr.

Outputs of this process are the modified variable maxFilterLengthCbCr, the variable $t_C$.

The variable maxK is derived as follows:

If edge Type is equal to EDGE_VER, the following applies:

$$\text{max}K = (\text{SubHeight}C == 1) ? 3 : 1 \quad (8\text{-}1124)$$

Otherwise (edge Type is equal to EDGE_HOR), the following applies:

$$\text{max}K = (\text{SubWidth}C == 1) ? 3 : 1 \quad (8\text{-}1125)$$

The values $p_i$ and $q_j$ with *c = 0..1* , i=0 . . . maxFilterLengthCbCr and k=0 . . . maxK are derived as follows:

If edge Type is equal to EDGE_VER, the following applies:

$$q\underline{c}_{i,k} = \text{recPicture}\underline{[c]}[xCb+xBl+i][yCb+yBl+k] \quad (8\text{-}1126)$$

$$p\underline{c}_{i,k} = \text{recPicture}\underline{[c]}[xCb+Bl-i-1][yCb+yBl+k] \quad (8\text{-}1127)$$

$$\text{subSample}C = \text{SubHeight}C \quad (8\text{-}1128)$$

Otherwise (edge Type is equal to EDGE_HOR), the following applies:

$$q\ \underline{c}_{i,k} = \text{recPicture}\underline{[c]}[xCb+xBl+k][yCb+yBl+i] \quad (8\text{-}1129)$$

$$p\underline{c}_{i,k} = \text{recPicture}\underline{[c]}[xCb+xBl+k][yCb+yBl-i-1] \quad (8\text{-}1130)$$

$$\text{subSample}C = \text{SubWidth}C \quad (8\text{-}1131)$$

The variables $Qp_Q$ and $Qp_P$ are set equal to the $Qp_Y$ values of the coding units which include the coding blocks containing the sample $q_{0,0}$ and $p_{0,0}$, respectively.

The variable $Qp_C$ is derived as follows:

$$qPi = \underline{\text{Clip3 (0, 63, (}}(Qp_Q + Qp_P + 1) >> 1\underline{) + cQpPicOffset )} \quad (8\text{-}1132)$$

$$\underline{QpC = \text{ChromaQpTable}[\ cIdx - 1\ ][\ qPi\ ] + cQpPicOffset} \quad (8\text{-}1133)$$

*(( ChromaQpTable[ 0 ][ i ] + Chroma Qp Table[ 1 ][ qPi ] + 1 ) >>1 ) + cQpPicOffset*

(8-1133)

NOTE—The variable cQpPicOffset provides an adjustment for the value of pps_cb_qp_offset or pps_cr_qp_offset, according to whether the filtered chroma component is the Cb or Cr component. However, to avoid the need to vary the amount of the adjustment within the picture, the filtering process does not include an adjustment for the value of slice_cb_qp_offset or slice_cr_qp_offset n or (when cu_chroma_qp_offset_enabled_flag is equal to 1) for the value of $CuQpOffset_{Cb}$, $CuQpOffset_{Cr}$, or $CuQpOffset_{CbCr}$.

The value of the variable β' is determined as specified in Table 8-18 based on the quantization parameter Q derived as follows:

$$Q = \text{Clip3}(0, 63, Qp_C + (\text{slice\_beta\_offset\_div2} << 1)) \quad (8\text{-}1134)$$

where slice_beta_offset_div2 is the value of the syntax element slice_beta_offset_div2 for the slice that contains sample $q_{0,0}$.

The variable β is derived as follows:

$$\beta = \beta' * (1 << (\text{BitDepth}_C - 8)) \quad (8\text{-}1135)$$

The value of the variable $t_C'$ is determined as specified in Table 8-18 based on the chroma quantization parameter Q derived as follows:

$$Q = \text{Clip3}(0, 65, Qp_C + 2*(bS-1) + (\text{slice\_tc\_offset\_div2} << 1)) \quad (8\text{-}1136)$$

where slice_tc_offset_div2 is the value of the syntax element slice_tc_offset_div2 for the slice that contains sample $q_{0,0}$.

The variable $t_C$ is derived as follows:

$$t_C = (\text{BitDepth}_C < 10) ? (t_C' + 2) >> (10 - \text{BitDepth}_C) : t_C' * (1 << (\text{BitDepth}_C - 8)) \quad (8\text{-}1137)$$

When maxFilterLengthCbCr is equal to 1 and bS is not equal to 2, maxFilterLengthCbCr is set equal to 0.

When maxFilterLengthCbCr is equal to 3, the following ordered steps apply:

1. The variables n1, dpq0c, dpq1c, dpc, dqc and d*c, with c = 0..1*, are derived as follows:

$$n1 = (\text{subSample}C == 2) ? 1 : 3 \quad (8\text{-}1138)$$

$$dp0c = \text{Abs}(p_{c2,0} - 2*p_{c1,0} + p_{c0,0}) \quad (8\text{-}1139)$$

$$dp1c = \text{Abs}(p_{c2,n1} - 2*p_{c1,n1} + p_{c0,n1}) \quad (8\text{-}1140)$$

$$dq0c = \text{Abs}(q_{c2,0} - 2*q_{c1,0} + q_{c0,0}) \quad (8\text{-}1141)$$

$$dq1c = \text{Abs}(q_{c2,n1} - 2*q_{c1,n1} + q_{c0,n1}) \quad (8\text{-}1142)$$

$$dpq0c = dp0c + dq0c \quad (8\text{-}1143)$$

$$dpq1c = dp1c + dq1c \quad (8\text{-}1144)$$

$$dpc = dp0c + dp1c \quad (8\text{-}1145)$$

$$dqc = dq0c + dq1c \quad (8\text{-}1146)$$

$$dc = dpq0c + dpq1c \quad (8\text{-}1147)$$

2. *The variable d is set equal to (d0 + d1 + 1) >> 1*
3. The variables dSam0 and dSam1 are both set equal to 0.
4. When d is less than β, the following ordered steps apply:
   a. The variable dpq is set equal to 2*dpq0.
   b. The variable dSam0 is derived by invoking the decision process for a chroma sample as specified in clause 8.8.3.6.8 for the sample location(xCb+xBl, yCb+yBl) with sample values $p_{0,0}$, $p_{3,0}$, $q_{0,0}$, and $q_{3,0}$, the variables dpq, β and $t_C$ as inputs, and the output is assigned to the decision dSam0.
   c. The variable dpq is set equal to 2*dpq1.
   d. The variable dSam1 is modified as follows:
      If edge Type is equal to EDGE_VER, for the sample location (xCb+xBl, yCb+yBl+n1), the decision process for a chroma sample as specified in clause 8.8.3.6.8 is invoked with sample values $p_{0,n1}$, $p_{3,n1}$, $q_{0,n1}$, and $q_{3,n1}$, the variables dpq, β and $t_C$ as inputs, and the output is assigned to the decision dSam1.
      Otherwise (edge Type is equal to EDGE_HOR), for the sample location(xCb+xBl+n1, yCb+yBl), the decision process for a chroma sample as specified in clause 8.8.3.6.8 is invoked with sample values $p_{0,0}$, $p_{3,n1}$, $q_{0,n1}$ and $q_{3,n1}$, the variables dpq, β and $t_C$ as inputs, and the output is assigned to the decision dSam1.

5. The variable maxFilterLengthCbCr is modified as follows:
   If dSam0 is equal to 1 and dSam1 is equal to 1, maxFilterLengthCbCr is set equal to 3.
   Otherwise, maxFilterLengthCbCr is set equal to 1.

8.8.3.6.4 Filtering Process for Chroma Block Edges

This process is only invoked when ChromaArrayType is not equal to 0.

Inputs to this process are:
  a chroma picture sample array recPicture,
  a chroma location (xCb, yCb) specifying the top-left sample of the current chroma coding block relative to the top-left chroma sample of the current picture,
  a chroma location (xBl, yBl) specifying the top-left sample of the current chroma block relative to the top-left sample of the current chroma coding block,
  a variable edge Type specifying whether a vertical(EDGE_VER) or a horizontal(EDGE_HOR)edge is filtered,
  a variable maxFilterLengthCbCr containing the maximum chroma filter length,
6. *a variable cIdx specifying the colour component index,*

Output of this process is the modified chroma picture sample array recPicture.

. . .

The values $p_i$ and $q_i$ with i=0 . . . maxFilterLengthCbCr and k=0 . . . maxK are derived as follows:
  If edge Type is equal to EDGE_VER, the following applies:

$$q_{i,k} = \text{recPicture}\boldsymbol{[cIdx]}[xCb+xBl+i][yCb+yBl+k] \quad (8\text{-}1150)$$

$$p_{i,k} = \text{recPicture}\boldsymbol{[cIdx]}[xCb+xBl-i-1][yCb+yBl+k] \quad (8\text{-}1151)$$

Otherwise (edge Type is equal to EDGE_HOR), the following applies:

$$q_{i,k} = \text{recPicture}\boldsymbol{[cIdx]}[xCb+xBl+k][yCb+yBl+i] \quad (8\text{-}1152)$$

$$p_{i,k} = \text{recPicture}\boldsymbol{[cIdx]}[xCb+xBl+k][yCb+yBl-i-1] \quad (8\text{-}1153)$$

Depending on the value of edge Type, the following applies:
  If edge Type is equal to EDGE_VER, for each sample location (xCb+xBl, yCb+yBl+k), k=0 . . . maxK, the following ordered steps apply:
  1. The filtering process for a chroma sample as specified in clause 8.8.3.6.9 is invoked with the variable maxFilterLengthCbCr, the sample values $p_{i,k}$, $q_{i,k}$ with i=0 . . . maxFilterLengthCbCr, the locations (xCb+xBl-i-1, yCb+yBl+k) and (xCb+xBl+i, yCb+yBl+k) with i=0 ... maxFilterLengthCbCr−1, and the variable $t_C$ as inputs, and the filtered sample values $p_i'$ and $q_i'$ with i=0 ... maxFilterLengthCbCr−1 as outputs.

2. The filtered sample values $p_i'$ and $q_i'$ with i=0 ... maxFilterLengthCbCr−1 replace the corresponding samples inside the sample array recPicture as follows:

recPicture*[cIdx]* $[xCb+xBl+i][yCb+yBl+k]=q_i'$      (8-1154)

recPicture*[cIdx]* $[xCb+xBl−i−1][yCb+yBl+k]=p_i'$      (8-1155)

*[cIdx]*

Otherwise (edge Type is equal to EDGE_HOR), for each sample location(xCb+xBl+k, yCb+yBl),k=0 ... maxK, the following ordered steps apply:

1. The filtering process for a chroma sample as specified in clause 8.8.3.6.9 is invoked with the variable maxFilterLengthCbCr, the sample values $p_{i,k}$, $q_{i,k}$, with i=0 ... maxFilterLengthCbCr, the locations (xCb+xBl+k, yCb+yBl−i−1) and (xCb+xBl+k, yCb+yBl+i), and the variable $t_C$ as inputs, and the filtered sample values $p_i'$ and $q_i'$ as outputs.

2. The filtered sample values $p_i'$ and $q_i'$ replace the corresponding samples inside the sample array recPicture as follows:

recPicture*[cIdx]* $[xCb+xBl+k][yCb+yBl+i]=q_i'$ recPicture*[cIdx]* $[xCb+xBl+k][yCb+yBl−i−1]p_i'$      (8-1156)

5.11 Embodiment #11

8.8.3.6.3 Decision Process for Chroma Block Edges
...
[[The variables $Qp_Q$ and $Qp_P$ are set equal to the $Qp_Y$ values of the coding units which include the coding blocks containing the sample $q_{0,0}$ and $p_{0,0}$, respectively. The variable $Qp_C$ is derived as follows:

$qPi$=Clip3(0,63,(($Qp_Q$+$Qp_P$+1)>>1)+c$Qp$PicOffset)      (8-1132)

$Qp_C$=Chroma$Qp$Table[cIdx−1][$qPi$]      (8-1133)]]

*When Chroma ArrayType is not equal to 0 and treeType is equal to SINGLE_TREE or DUAL_TREE_CHROMA, the following applies*
- *When tree Type is equal to DUAL_TREE_CHROMA the variable QpY is set equal to the luma quantization parameter QpY of the luma coding unit that covers the luma location (xCb + cbWidth/2 yCb + cbHeight / 2)*
- *The variables qPCb, qPCr and qPCbCr are derived as follow*
  *qPiChroma = Clip3 ( − QpBdOffsetC, 63, Op Y )*      *(8-935)*
  *qPiCb = ChromaQpTable[ 0 ][ qPiChroma ]*      *(8-936)*
  *qPiCr = ChromaQpTable[ 1 ][ qPiChroma ]*      *(8-937)*
  *qPiCbCr=ChromaQpTable[2][qPiChroma]*      *(8-938)*
- *The chroma quantization parameters for the Cb and Cr components, Qp'Cb and Qp'Cr, and joint Cb-Cr coding Qp'CbCr are derived as follows*

*Qp'Cb= Clip3(−QpBdOffsetC, 63, qPCb+pps_cb_qp_offset+slice_cb_cp_offset+CuQpOffsetCb) +QpBdOffset*      *(8-939)*
*Qp'Cr=Clip3(−QpBdOffsetC, 63, qPCr +pps_cr_qp_offset+slice_cr_qp_offset+CuQpOffsetCr) +QpBdOffsetC*      *(8-940)*
*Qp'CbCr = Clip3(−QpBdOffsetC, 63, qPCbCr +pps_cbcr_qp_offset+slice_cbcr_qp_offset +CuQpOffsetCbCr )*

*+ QpBdOffsetC*      *(8-941)*
*The variables QpQ and QpP are set equal to the Qp'Cb value when cIdx is equal to 1, or the Qp'Cr value when cIdx is equal to 2, or Qp'CbCr when tu_joint_cbcr_residual_flag is equal to 1 of the coding units which include the coding blocks containing the sample q0,0 and p0,0, respectively The variable QpC is derived as follows:*
$QpC = (QpQ + QpP + 1) >> 1$

5.12 Embodiment #12

8.8.3.6.3 Decision Process for Chroma Block Edges
...
[[The variables $Qp_Q$ and $Qp_P$ are set equal to the $Qp_Y$ values of the coding units which include the coding blocks containing the sample $q_{0,0}$ and $p_{0,0}$, respectively. The variable $Qp_C$ is derived as follows:

$qPi$=Clip3(0,63,(($Qp_Q$+$Qp_P$+1)>>1)+c$Qp$PicOffset)      (8-1132)

$Qp_C$=Chroma$Qp$Table[cIdx−1][$qPi$]      (8-1133)

NOTE—The variable cQpPicOffset provides an adjustment for the value of pps_cb_qp_offset or pps_cr_qp_offset, according to whether the filtered chroma component is the Cb or Cr component. However, to avoid the need to vary the amount of the adjustment within the picture, the filtering process does not include an adjustment for the value of slice_cb_qp_offset or slice_cr_qp_offset n or (when cu_chroma_qp_offset_enabled_flag is equal to 1) for the value of CuQpOffset$_{Cb}$, CuQpOffset$_{Cr}$, or CuQpOffset$_{CbCr}$.]]
*The variables QpQ and QpP are set equal to Qp'CbCr - QpBdOffset C when TuCresMode [xTb][yTb] is equal to 2.*
*Qp'Cb - QpBdOffsetC when cIdx is equal to 1; Qp'Cr - QpBdOffsetC when cIdx is equal to 2 of the transform blocks (xTb, yTb) containing the sample q0,0 and p0,0, respectively.*
*The variable Qpc is derived as follows:*
$Qp_C = (Qp_Q + Qp_P + 1) >> 1$

5.13 Embodiment #13

Decision Process for Chroma Block Edges
This process is only invoked when ChromaArrayType is not equal to 0.
Inputs to this process are:
    a chroma picture sample array recPicture,
    a chroma location (xCb, yCb) specifying the top-left sample of the current chroma coding block relative to the top-left chroma sample of the current picture, a chroma location (xBl, yBl) specifying the top-left sample of the current chroma block relative to the top-eft sample of the current chroma coding block, a variable edge Type specifying whether a vertical(EDGE_VER) or a horizontal(EDGE_HOR)edge is filtered, a variable cIdx specifying the colour component index, a variable bS specifying the boundary filtering strength, a variable maxFilterLengthP specifying the maximum filter length, a variable maxFilterLengthQ specifying the maximum filter length.

Outputs of this process are the modified filter length variables maxFilterLengthP and maxFilterLengthQ, the variable $t_C$.

The variable $Qp_P$ is derived as follows:

The luma location $(xTb_P, xTb_P)$ is set as the top-left luma sample position of the transform block containing the sample $p_{0,0}$, relative to the top-left luma sample of the picture.

IfTuCResMode[$xTb_P$][$yTb_P$] is equal to 2, $Qp_P$ is set equal to $Qp'_{CbCr}$ of the transform block containing the sample $p_{0,0}$.

– *Otherwise, if cIdx is equal to 1 and transform_skip_flag[xTb$_P$][yTb$_P$ ][cIdx] is equal to , Qp$_P$ is set equal to Max(QpPrimeTsMin, Qp'$_{Cb}$) of the transform block containing the sample$_{0,0}$.*

Otherwise, if cIdx is equal to 1 transform_skip_flag[xTb$_P$][ yTb$_P$][cIdx]is equal to 0 , $Qp_P$ is set equal to $Qp'_{Cb}$ of the transform block containing the sample $p_{0,0}$ Otherwise, $Qp_P$ is set equal to $Qp'_{Cr}$ of the transform block containing the sample $p_{0,0}$.

– *If cu_act_enabled_flag[xTb$_P$][ yTb$_P$]is equal to 1, the Qp$_P$ is set equal to Qp$_P$ - 5*

The variable $Qp_Q$ is derived as follows:

The luma location $(xTb_Q, xTb_Q)$ is set as the top-left luma sample position of the transform block containing the sample $q_{0,0}$, relative to the top-left luma sample of the picture.

IfTuCResMode[$xTb_Q$][yTbQ] is equal to 2, $Qp_Q$ is set equal to $Qp'_{CbCr}$ of the transform block containing the sample $q_{0,0}$.

- *Otherwise, if cIdx is equal to 1 and transform_skip_flag[xTb$_q$][ yTb$_q$][cIdx] is equal to 1 , Qp$_Q$ is set equal to Max(QpPrimeTsMin, Qp'$_{cb}$) of the transform block containing the sample p$_{0,0}$*

Otherwise, if cIdx is equal to 1 transform_skip_flag[xTb$_P$][ yTb$_P$][cIdx] is equal to 0 , $Qp_Q$ is set equal to $Qp'_{Cb}$ of the transform block containing the sample $q_{0,0}$.

Otherwise, $Qp_Q$ is set equal to $Qp'_{Cr}$ of the transform block containing the sample $q_{0,0}$.

- *If cu_act_enabled_flag[xTb$_Q$][ yTb$_Q$] is equal to 1, the Qp$_Q$ is set equal to Qp$_Q$-5.*

The variable $Qp_C$ is derived as follows:

$$Qp_C=(Qp_Q-QpBdOffset+Qp_P-QpBdOffset+1)>>1 \quad (1321)$$

5.14 Embodiment #14

Decision Process for Chroma Block Edges

This process is only invoked when ChromaArrayType is not equal to 0.

Inputs to this process are:

a chroma picture sample array recPicture, a chroma location (xCb, yCb) specifying the top-left sample of the current chroma coding block relative to the top-left chroma sample of the current picture, a chroma location (xBl, yBl) specifying the top-left sample of the current chroma block relative to the top-left sample of the current chroma coding block, a variable edge Type specifying whether a vertical(EDGE_VER) or a horizontal(EDGE_HOR) edge is filtered, a variable cIdx specifying the colour component index, a variable bS specifying the boundary filtering strength, a variable maxFilterLengthP specifying the maximum filter length, a variable maxFilterLengthQ specifying the maximum filter length.

Outputs of this process are the modified filter length variables maxFilterLengthP and maxFilterLengthQ, the variable $t_C$.

. . .

The variable $Qp_P$ is derived as follows:

The luma location $(xTb_P, xTb_P)$ is set as the top-left luma sample position of the transform block containing the sample $p_{0,0}$, relative to the top-left luma sample of the picture.

If TuCResModel[$xTb_P$][$yTb_P$] is equal to 2, $Qp_P$ is set equal to $Qp'_{CbCr}$ of the transform block containing the sample $p_{0,0}$.

- *Otherwise, if cIdx is equal to 1 and transform_skip_flag[xTb$_p$][y Tb$_p$][cIdx] is equal to 1 , Qp$_P$ is set equal to Max(QpPrimeTsMin Qp'$_{cb}$) of the transform block containing the sample p$_{0,0}$*

Otherwise, if cIdx is equal to 1 transform_skip_flag[xTb$_p$][ yTb$_p$][cIdx] is equal to 0 , $Qp_P$ is set equal to $Qp'_{Cb}$ of the transform block containing the sample $p_{0,0}$.

Otherwise, $Qp_P$ is set equal to $Qp'_{Cr}$ of the transform block containing the sample $p_{0,0}$.

- *If cu_act_enabled_flag[xTb$_P$][yTb$_P$ ]is equal to 1, the Qp$_P$ is set equal to Qp$_P$ - 5 .*

The variable $Qp_Q$ is derived as follows:

The luma location $(xTb_Q, xTb_Q)$ is set as the top-left luma sample position of the transform block containing the sample $q_{0,0}$, relative to the top-left luma sample of the picture.

If TuCResMode[$xTb_Q$][$yTb_Q$] is equal to 2, $Qp_Q$ is set equal to $Qp'_{CbCr}$ of the transform block containing the sample $q_{0,0}$.

- *Otherwise, if cIdx is equal to 1 and transform_skip_flag[xTb$_Q$][yTb$_Q$][ cIdx] is equal to 1 , Qp$_Q$ is set equal to Max(QpPrimeTsMin, Qp'$_{cb}$) of the transform block containing the samplep$_{0,0}$*

Otherwise, if cIdx is equal to 1 transform_skip_flag[xTb$_P$ ][yTb$_P$][cIdx ] is equal to 0 , $Qp_Q$ is set equal to $Qp'_{Cb}$ of the transform block containing the sample $q_{0,0}$.

Otherwise, $Qp_Q$ is set equal to $Qp'_{Cr}$ of the transform block containing the sample $q_{0,0}$.

– *If cu_act_enabled_flag[xTb₀][yT₀*
*is equal to 1, the Qp₀ is set equal to Qp₀ -3* .

The variable Qp_C is derived as follows:

$$Qp_C = (Qp_Q - QpBdOffset + Qp_P - QpBdOffset + 1) >> 1 \quad (1321)$$

5.15 Embodiment #15

Figure 17:
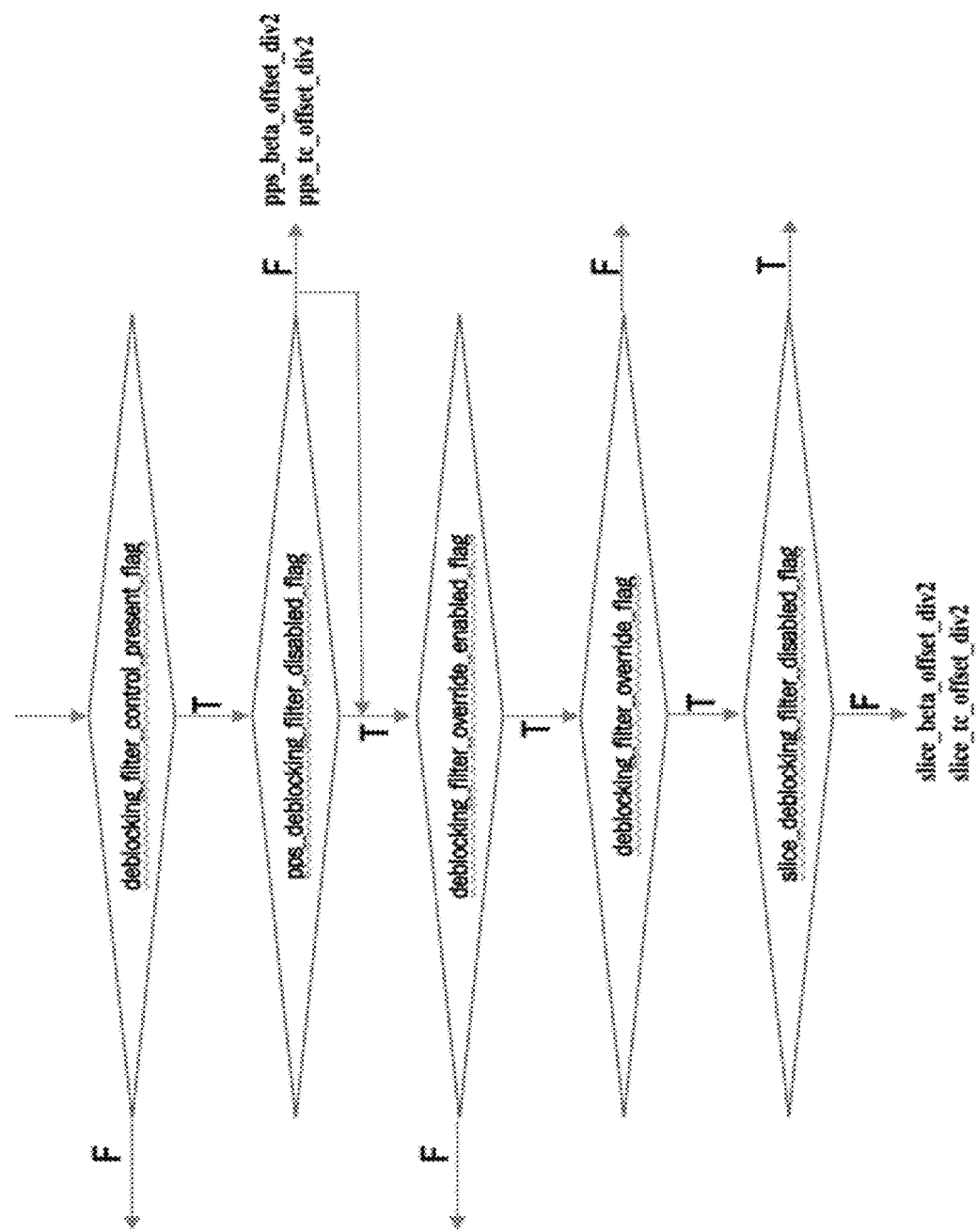
FIG. 17 shows an example flowchart for high-level deblocking control mechanism.

The example controlling logic is shown in FIG. 17.
7.3.2.6 Picture Header RBSP Syntax

```
if(!pic_dep_quant_enabled_flag)
    sign_data_hiding_enabled_flag                        u(1)
[[if(deblocking_filter_override_enabled_flag) {
    pic_deblocking_filter_override_present_flag          u(1)
    if(pic_deblocking_filter_override_present_flag) {
        pic_deblocking_filter_override_flag              u(1)
        if(pic_deblocking_filter_override_flag) {
            pic_deblocking_filter_disabled_flag          u(1)
            if(!pic_deblocking_filter_disabled_flag) {
                pic_beta_offset_div2                     se(v)
                pic_tc_offset_div2                       se(v)
            }
        }
    }
}]]
if(sps_lmcs_enabled_flag) {
    pic_lmcs_enabled_flag                                u(1)
```

7.3.7.1 General Slice Header Syntax

```
if( deblocking_filter_override_enabled_flag   [[&&
    !pic_deblocking_filter_override_present_flag]])
    slice_deblocking_filter_override_flag                u(1)
if(slice_deblocking_filter_override_flag) {
    slice_deblocking_filter_disabled_flag                u(1)
    if(!slice_deblocking_filter_disabled_flag) {
        slice_beta_offset_div2                           se(v)
        slice_tc_offset_div2                             se(v)
    }
}
```

5.16 Embodiment #16

7.3.2.4 Picture Parameter Set RBSP Syntax

```
if(deblocking_filter_control_present_flag) {
    deblocking_filter_override_enabled_flag              u(1)
    pps_deblocking_filter_disabled_flag                  u(1)
    if(!pps_deblocking_filter_disabled_flag) {
        pps_beta_offset_div2                             se(v)
        pps_tc_offset_div2                               se(v)
        pps_cb_beta_offset_div2                          se(v)
        pps_cb_tc_offset_div2                            se(v)
        pps_cr_beta_offset_div2                          se(v)
        pps_cr_tc_offset_div2                            se(v)
    }
}
```

7.3.2.6 Picture Header RBSP Syntax

```
if(pic_deblocking_filter_override_present_flag) {
    pic_deblocking_filter_override_flag                  u(1)
    if(pic_deblocking_filter_override_flag) {
        pic_deblocking_filter_disabled_flag              u(1)
        if(!pic_deblocking_filter_disabled_flag) {
            pic_beta_offset_div2                         se(v)
            pic_tc_offset_div2                           se(v)
            pic_cb_beta_offset_div2                      se(v)
            pic_cb_tc_offset_div2                        se(v)
            pic_cr_beta_offset_div2                      se(v)
            pic_cr_tc_offset_div2                        se(v)
        }
    }
}
```

7.3.7.1 General Slice Header Syntax

```
if(slice_deblocking_filter_override_flag) {
    slice_deblocking_filter_disabled_flag                u(1)
    if(!slice_deblocking_filter_disabled_flag) {
        slice_beta_offset_div2                           se(v)
        slice_tc_offset_div2                             se(v)
        slice_cb_beta_offset_div2                        se(v)
        slice_cb_tc_offset_div2                          se(v)
        slice_cr_beta_offset_div2                        se(v)
        slice_cr_tc_offset_div2                          se(v)
    }
}
```

7.4.3.4 Picture Parameter Set RBSP Semantics
*pps_cb_beta_offset_div2 and pps_cb_tc_offset_div2 specify the*
*default deblocking parameter offsets for β And tC*
*(divided by 2) that are applied to Cb component for slices*
*referring to the pps unless the default deblocking parameter*
*offsets are overridden by the deblocking parameter offsets present in the*
*slice headers of the slices referred to the PPS*
The values of pps_beta_ *offset_div2 and pps_tc_*
*offset_div2 shall both be in the range of -6 to 6*
*inclusive. When not present, the value of pps_*
*beta_offset_div2 and pps_ tc_offset_div2 are inferred to*
*be equal to 0* .
*pps_cr_beta_offset_div2 and pps*
*_cr_tc_offset_div2 specify the*
*default deblocking parameter offsets for β and tC*
*(divided by 2) that are applied to*
*Cr component for slices referring to the PPS*
*unless the default deblocking parameter*
*offsets are overridden by the*
*deblocking parameter offsets present in the slice headers*
*of the slices referring to the*
*PPS. The values of pps_beta_*
*offset_div2 and pps_tc_offset_*
*div2 shall both be in the range of - 6 to 6*
*, inclusive. When not present, the value of pps_beat_*
*offset_div2 and pps_tc_ offset_div2 are inferred to*
*be equal to 0* .
7.4.3.6 Picture Header
*pic_cb_beta_offset_div2 and pic*
*cb_tc_offset_div2 specify the deb locking parameter*
*for β and tC (divided by 2) that are applied to Cb*
*component for the slices associated with the PH*
*The values of pic_beta_ offset_div2 and*
*pic_tc_offset_div2 shall both be in the range of -6 to 6*
*inclusive When not present*
*the values of pic_beta_offset_div2*
*and pic_tc_offset_div2 are inferred to be equal to pps*
*_beta_offset_div2 and pps_tc_ offset_div2 respectively*
*pic_cr_beta_offset_div2 and pic_*
*cr_tc_offset_div2 specify the*
*deblocking parameter offsets for β and tC (divided by* .
*2) that are applied to Cr component*
*for the slices associated with the PP* .

*The values of pic_beta_offset_div2 and pic_tc_offset_div2 shall both be in the range of -6 to 6, inclusive When not present the values of pic_beta_offset_div2 and pic_tc_offset_div2 are inferred to be equal to pps_beta_offset_ div2 and pps_tc_offset_div2, respectively.*

7.4.8.1 General Slice Header Semantics

*slice_cb_beta_offset_div2 and slice_cb_tc_offset_div2 specify the deblocking parameter offsets for β and tC (divided by 2) that are applied to Cb component for the current slice The values of slice_beta_ offset_div2 and slice_tc_offset_div2 shall both be in the range of -6 to 6 inclusive. When not present, the values of slice_beta_offset_div2 and slice_tc_offset_div2 are inferred to be equal to pic_beta_offset_div2 and pic_tc_offset_div2 respectively.*

*slice_cr_beta_offset_div2 and slice_cr_tc_offset_div2 specify the deblocking parameter offsets for β and tC (divided by 2) that are applied to Cb component for the current slice The values of slice_beta_offset_ div2 and slice_tc_offset_div2 shall both be in the range of -6 to 6, inclusive. When not present, the values of slice_beta_offset_div2 and slice_tc_offset_div2 are inferred to be equal to pic_beta_ offset_div2 and pic_tc_offset_div2, respectively.*

8.8.3.6.3 Decision Process for Chroma Block Edges
...
The value of the variable β' is determined as specified in Table 41 based on the quantization parameter Q derived as follows:

[[$Q = \text{Clip3}(0, 63, Qp_C + (\text{slice\_beta\_offset\_div2} << 1))$]] (1322)

- *If cIdx is equal to 1*
  $Q = \text{Clip3}(0, 63, Qp_C + (\text{slice\_cb\_beta\_offset\_div2} << 1))$
- *Otherwise*
  $Q = \text{Clip3}(0, 63, Qp_C + (\text{slice\_cr\_beta\_offset\_div2} << 1))$ where slice_beta_offset_div2 is the value of the syntax element slice_beta_offset_div2 for the slice that contains sample $q_{0,0}$.
The variable β is derived as follows:

$$\beta = \beta' * n(1 << (\text{BitDepth} - 8))$$ (1323)

The value of the variable $t_C'$ is determined as specified in Table 41 based on the chroma quantization parameter Q derived as follows:

[[$Q = \text{Clip3}(0, 65, Qp_C + 2*(bS-1) + (\text{slice\_tc\_offset\_div2} << 1))$]] (1324)

- *If cIdx is equal to 1*
  $Q = \text{Clip3}(0, 65, Qp_C + 2 * (bS - 1) + (\text{slice\_cb\_tc\_offset\_div2} << 1))$
- *Otherwise*
  $Q = \text{Clip3}(0, 65, Qp_C + 2 * (bS - 1) + (\text{slice\_cr\_tc\_offset\_div2} << 1))$

...

5.17 Embodiment #17

This embodiment is based on Embodiment #15.

7.3.2.4 Picture Parameter Set RBSP Syntax

| | |
|---|---|
| if( deblocking_filter_control_present_flag ) { | |
|   deblocking_filter_override_enabled_flag | u(1) |
|   pps_deblocking_filter_disabled_flag | u(1) |
|   if( !pps_deblocking_filter_disabled_flag ) { | |
|     pps_beta_offset_div2 | se(v) |
|     pps_tc_offset_div2 | se(v) |
|     *pps_cb_beta_offset_div2* | *se(v)* |
|     *pps_cb_tc_offset_div2* | *se(v)* |
|     *pps_cr_beta_offset_div2* | *se(v)* |
|     *pps_cr_tc_offset_div2* | *se(v)* |
|   } | |

7.3.7.1 General Slice Header Syntax

| | |
|---|---|
| if( slice_deblocking_filter_override_flag ) { | |
|   slice_deblocking_filter_disabled_flag | u(1) |
|   if( !slice_deblocking_filter_disabled_flag ) { | |
|     slice_beta_offset_div2 | se(v) |
|     slice_tc_offset_div2 | se(v) |
|     slice_cb_beta_offset_div2 | se(v) |
|     slice_cb_tc_offset_div2 | se(v) |
|     slice_cr_beta_offset_div2 | se(v) |
|     slice_cr_tc_offset_div2 | se(v) |
|   } | |
| } | |

7.4.3.4 Picture Parameter Set RBSP Semantics

*pps_cb_beta_offset_div2 and pps_cb_tc_offset_div2 specify the default deblocking parameter offsets for β and tC divided by 2) that are applied to Cb component for slices referring to the PPS unless the default deblocking parameter offsets are overridden by the deblocking parameter offsets present in the slice headers of the slices referring to the PPS. The values of pps_beta_offset _div2 and pps_tc_offset_ both be in the range of -6 to 6 inclusive When not present, , the value of pps_beta_offset div2 and pps_tc_offset_div2 are inferred to be equal to 0.*

*pps_cr_beta_offset_div2 and pps_cr_tc_offset_div2 specify the default deblocking parameter offsets for β and tC (divided by 2) that are applied to Cr component for slices referrring to the PPS* unless the default *deblocking parameter offsets are overridden by the deblocking parameter offsets present in the slice headers of the slices referring to the PPS. The values of pps_beta_offset_ div2 and pps_tc_offset_div2 shall both be in the range of -6 to 6, inclusive. When not present, , the value of pps_beta_offset_ div2 and pps_tc_offset_div2 are inferred to be equal to 0.*

7.4.8.1 General Slice Header Semantics

*slice_cb_beta_offset_div2 and slice_cb_tc_offset_div2 specify the deblocking parameter Offsets for β and tC (divided by 2) that are applied to Cb* component for the current slice., *The values of slice_ beta_offset_div2 and* slice_tc_offset_div2 shall both be in the range of -6 to 6,, inclusive., *When not present,*, *the values of* slice_beta_offset_div2 and slice_tc_ offset_div2 are inferred to be *equal to pps_beta_offset_ div2 and pps_tc_offset_div2, respectively.*.
slice_cr_beta_offset_div2 and slice_cr_tc_ offset _ div2 specify the deblocking parameter offsets for β and t C (divided by 2)that are appliedto Cb component for the current slice.
The values of slice_beta_offset_ div2 and slice_tc_offset_div2 shall both be in the range of -6 to 6, inclusive. When not present, the values of slice_beta_ offset_div2 and slice_tc_offset_div2 are inferred to be equal to pps_beta_offset_ div2 and pps_tc_offset _div2, respectively.

8.8.3.6.3 Decision Process for Chroma Block Edges
. . .
The value of the variable β' is determined as specified in Table 41 based on the quantization parameter Q derived as follows:

[[$Q=\text{Clip3}(0,63,Qp_C+(\text{slice\_beta\_offset\_div2}<<1))$ (1322)]]

- If cIdx is equal to 1
  $Q = Clip3(0, 63, Qp_C+ (\text{slice\_cb\_beta\_offset\_div2} << 1))$
- Otherwise
  $Q = Clip3(0, 63, Qp_C+ (\text{slice\_cr\_beta\_offset\_div2} << 1))$ where slice_beta_offset_div2 is the value of the syntax element slice_beta_offset_div2 for the slice that contains sample $q_{0,0}$.
The variable β is derived as follows:

$\beta = \beta'^* (1<<(\text{BitDepth}-8))$ (1323)

The value of the variable $t_C'$ is determined as specified in Table 41 based on the chroma quantization parameter Q derived as follows:

[[$Q=\text{Clip3}(0,65,Qp_C+2^*(bS-1)+(\text{slice\_tc\_offset\_div2}<<1))$ (1324)]]

- If cIdx is equal to 1
  $Q = Clip3(0, 65, Qp_C+ 2 * (bS - 1) + (\text{slice\_cb\_tc\_offset\_div2} << 1))$
- Otherwise
  $Q = Clip3(0, 65, Qp_C+ 2 * (bS - 1) + (\text{slice\_cr\_tc\_offset\_div2} << 1))$

. . .

5.18 Embodiment #18

This embodiment is based on embodiment #17.
7.4.3.4 Picture Parameter Set RBSP Semantics
pps_cb_beta_offset_div2 and pps_cb_ _tc_offset_div2 specify the default deblocking parameter offsets for β and tC (divided by 2) that are applied to Cb component for the current PPS. The values of pps_ beta_offset_div2 and pps_tc_offset_div2 shall both be in the range of -6 to 6, inclusive. When not present the value of pps_ beta_offset_div2 and pps_tc_offset_div2 are inferred to be equal to 0.

pps_cr_beta_offset_div2 and pps_cr_ tc_offset_div2 specify the default deblocking parameter offsets for B and tC (divided by 2) that are applied to Cr component for the current PPS.
The values of pps_beta_ offset_div2 and pps_tc_offset_div2 shall both be in the range of -6 to 6, inclusive. When not present, the value of pps_beta_ offset_div2 and pps_tc_offset_div2 are inferred to be equal to 0.
7.4.8.1 General Slice Header Semantics
slice_cb_beta_offset_div2 and slice_ cb_tc_offset_div2 specify the deblocking parameter offsets for B and tC (divided by 2) that are applied to Cb component for the current slice.
The values of slice_beta_ offset_div2 and slice_tc_offset_div2 shall both be in the range of -6 to 6, inclusive.
slice_cr_beta_offset_div2 and slice _cr_tc_offset_div2 specify the deblocking parameter offsets for B and tC (divided by 2) that are applied to Cb component for the current slice.
The values of slice_beta_offset_ div2 and slice_tc_offset_div2 shall both be in the range of -6 to 6,, inclusive.
8.8.3.6.1 Decision Process for Luma Block Edges
. . .
The value of the variable $3' is determined as specified in Table 41 based on the quantization parameter Q derived as follows:

[[$Q=\text{Clip3}(0,63,qP+(\text{slice\_beta\_offset\_div2}<<1))$ (1262)]]

$Q = Clip3(0, 63, qP + ((\text{pps\_beta\_offset\_div2} + \text{slice\_beta\_offset\_div2}) << 1))$ (1262)

where slice_beta_offset_div2 is the value of the syntaxel element slice_beta_offset_div2 for the slice that contains sample $q_{0,0}$.
The variable β is derived as follows:

$\beta = \beta'^*(1<<(\text{BitDepth}-8))$ (1263)

The value of the variable $t_C'$ is determined as specified in Table 41 based on the quantization parameter Q derived as follows:

[[$Q=\text{Clip3}(0,65,qP+2^*(bS-1)+(\text{slice\_t\_offset\_div2}<<1))$ (1264)]]

$Q = Clip3(0, 65, qP + 2 * (bS - 1) + ((\text{pps\_tc\_offset\_div2} + \text{slice\_tc\_offset\_div2}) << 1))$ (1264)

. . .
8.8.3.6.3 Decision Process for Chroma Block Edges
. . .
The value of the variable β' is determined as specified in Table 41 based on the quantization parameter Q derived as follows:

[[$Q=\text{Clip3}(0,63,Qp_C+(\text{slice\_beta\_offset\_div2}<<1))$ (1322)]]

- If cIdx is equal to 1
  $Q = Clip3(0, 63, Qp_C + ((\text{pps\_cb\_beta\_offset\_div2} + \text{slice\_cb\_beta\_offset\_div2}) << 1))$
- Otherwise
  $Q = Clip3(0, 63, Qp_C + ((\text{pps\_cr\_beta\_offset\_div2} + \text{slice\_cr\_beta\_offset\_div2}) << 1))$ where slice_beta_offset_div2 is the value of the syntax element slice_beta_offset_div2 for the slice that contains sample $q_{0,0}$.

The variable β is derived as follows:

$$\beta = \beta'* (1<<(BitDepth-8)) \quad (1323)$$

The value of the variable $t_C'$ is determined as specified in Table 41 based on the chroma quantization parameter Q derived as follows:

[[$Q = Clip3(0, 65, Qp_C + 2*(bS-1) + (slice\_tc\_offset\_div2 << 1))$ (1324)]]

- If cIdx is equal to 1
  $Q = Clip3(0, 65, Qp_C + 2 * (bS - 1) + ((pps\_cb\_tc\_offset\_div2 + slice\_cb\_tc\_offset\_div2) << 1))$
- Otherwise
  $Q = Clip3(0, 65, Qp_C + 2 * (bS - 1) + ((pps\_cr\_tc\_offset\_div2 + slice\_cr\_tc\_offset\_div2)) << 1))$

. . .

5.19 Embodiment #19

This embodiment is related to the ACT.
intra_bdpcm_chroma_flag equal to 1 specifies that BDPCM is applied to the current chroma coding blocks at the location (x0, y0), i.e. the transform is skipped, the intra chroma prediction mode is specified by intra_bdpcm_chroma_dir_flag. intra_bdpcm_chroma_flag equal to 0 specifies that BDPCM is not applied to the current chroma coding blocks at the location(x0, y0).
When intra_bdpcm_chroma_flag is not present [[it is inferred to be equal to 0.]] *it is inferred to be equal to sps_bdpcm_chroma_enabled_flag && cu_act_enabled_flag && intra_bdpcm_luma_flag.*
The variable BdpcmFlag[x][y][cIdx] is set equal to intra-bdpcm_chroma_flag for x=x0 . . . x0+cbWidth-1, y= y0 . . . y0+cbHeight-1 and cIdx=1 . . . 2.
intra_bdpcm_chroma_dir_flag equal to 0 specifies that the BDPCM prediction direction is horizontal. intra_bdpcm_chroma_dir_flag equal to 1 specifies that the BDPCM prediction direction is vertical.
*When intra_bdpcm_chroma_dir_flag is not present, , it is inferred to be equal to ( cu_act_enabled_flag ? intra_bdpcm_luma_dir_flag:0).*
The variable BdpcmDir[x][y][cIdx] is set equal to intra_bdpcm_chroma_dir_flag for x=x0 . . . x0+cbWidth-1, y=y0 . . . y0+cbHeight-1 and cIdx=1 . . . 2.

5.20 Embodiment #20

This embodiment is related to the QP derivation for deblocking.

8.8.3.6.1 Decision Process for Luma Block Edges
Inputs to this process are:
  a picture sample array recPicture,
  a location (xCb, yCb) specifying the top-left sample of the current coding block relative to the top-left sample of the current picture,
  a location (xBl, yBl) specifying the top-left sample of the current block relative to the top-left sample of the current coding block,
  a variable edge Type specifying whether a vertical(EDGE_VER) or a horizontal(EDGE_HOR) edge is filtered,
  a variable bS specifying the boundary filtering strength,
  a variable maxFilterLengthP specifying the maximum filter length,
  a variable maxFilterLengthQ specifying the maximum filter length.
Outputs of this process are:
  the variables dE, dEp and dEq containing decisions,
  the modified filter length variables maxFilterLengthP and maxFilterLengthQ,
  the variable $t_C$.
. . .
[[The variables $Qp_Q$ and $Qp_P$ are set equal to the $Qp_Y$ values of the coding units which include the coding blocks containing the sample $q_{0,0}$ and $p_{0,0}$ respectively.]]
*The variables $Qp_Q$ is dereived as follows:*
*$Qp_Q$ is set to the $Qp_Y$ value of the coding units which include the coding blocks containing the sample $q_{0,0}$.*
*If the transform_skip_flag of the coding blocks containing the sample $q_{0,0}$ is equal to ,*
  *$Qp_Q = Max( QpPrimeTsMin$*
  *$Qp_Q + QpBdOffset) - QpBdOffset$*
*$Qp_P$ is set to the $Qp_Y$ value of the coding units which include the coding blocks containing the sample $p_{0,0}$.*
*If the transform_skip_flag of the coding blocks containing the sample $p_{0,0}$ is equal to 1 ,*
  *$Qp_P = Max (QpPrimeTsMin$*
  *$Qp_P + QpBdOffset) - QpBdOffset)$*

8.8.3.6.3 Decision Process for Chroma Block Edges
This process is only invoked when ChromaArrayType is not equal to 0.
Inputs to this process are:
  a chroma picture sample array recPicture,
  a chroma location (xCb, yCb) specifying the top-left sample of the current chroma coding block relative to the top-left chroma sample of the current picture,
  a chroma location (xBl, yBl) specifying the top-left sample of the current chroma block relative to the top-left sample of the current chroma coding block,
  a variable edge Type specifying whether a vertical(EDGE_VER) or a horizontal(EDGE_HOR) edge is filtered,
  a variable cIdx specifying the colour component index,
  a variable bS specifying the boundary filtering strength,
  a variable maxFilterLengthP specifying the maximum filter length,
  a variable maxFilterLengthQ specifying the maximum filter length.
Outputs of this process are
  the modified filter length variables maxFilterLengthP and maxFilterLengthQ,
  the variable $t_C$.
The variable $Qp_P$ is derived as follows:
  The luma location ($xTb_P$, $xTb_P$) is set as the top-left luma sample position of the transform block containing the sample $p_{0,0}$, relative to the top-left luma sample of the picture.
  If TuCResMode[$xTb_P$][$yTb_P$] is equal to 2, $Qp_P$ is set equal to $Qp'_{CbCr}$ of the transform block containing the sample $p_{0,0}$.
  Otherwise, if cIdx is equal to 1, $Qp_P$ is set equal to $Qp'_{Cb}$ of the transform block containing the sample $p_{0,0}$.
  Otherwise, $Qp_P$ is set equal to $Qp'_{Cr}$ of the transform block containing the sample $p_{0,0}$.

*The variable $Qp_P$ is modified as follows*
$$Qp_P = Max(transform\_skip\_flag[xTb_P][yTb_P][cIdx]\ ?\ QpPrimeTsMin : 0, Qp_P)$$

The variable $Qp_Q$ is derived as follows:

The luma location $(xTb_Q, xTb_Q)$ is set as the top-left luma sample position of the transform block containing the sample $q_{0,0}$, relative to the top-left luma sample of the picture.

If $TuCResMode[xTb_Q][yTb_Q]$ is equal to 2, $Qp_Q$ is set equal to $Qp'_{CbCr}$ of the transform block containing the sample $q_{0,0}$.

Otherwise, if cIdx is equal to 1, $Qp_Q$ is set equal to $Qp'_{Cb}$ of the transform block containing the sample $q_{0,0}$.

Otherwise, $Qp_Q$ is set equal to $Qp'_{Cr}$ of the transform block containing the sample $q_{0,0}$.

*The variable $Qp_O$ is modified as follows*
$$Qp_O = Max(transform\_skip\_flag[xTb_O][yTb_O][CIdx]\ ?\ QpPrimeTsMin : 0, Qp_O)$$

The variable $Qp_C$ is derived as follows:

$$Qp_C = (Qp_Q - QpBdOffset + Qp_P - QpBdOffset + 1) >> 1 \qquad (1321)$$

6. Example Implementations of the Disclosed Technology

Figure 12:
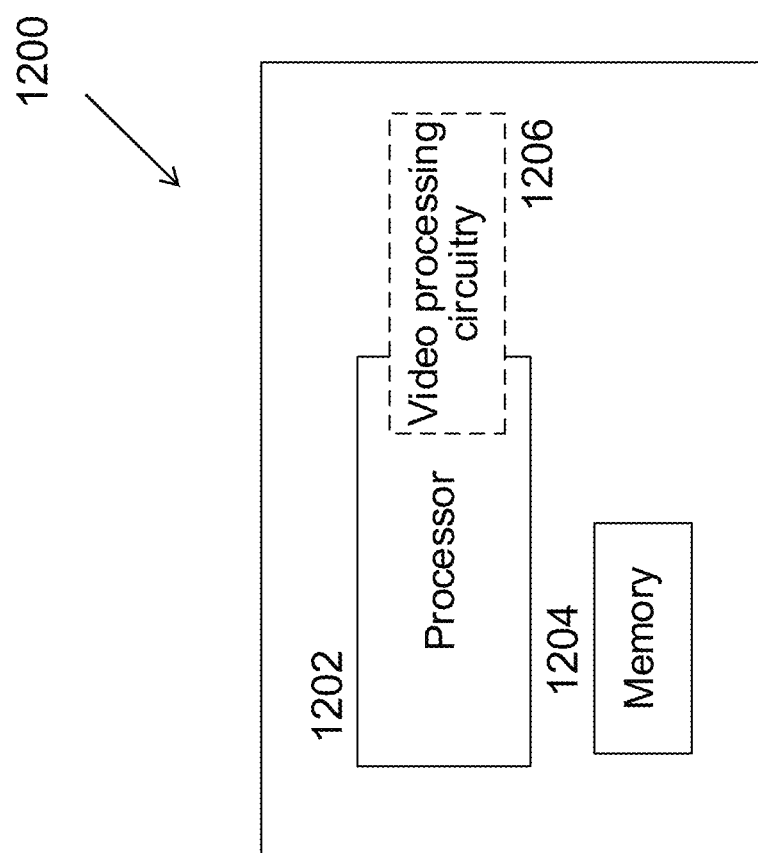
FIG. 12 is a block diagram of an example of a hardware platform for implementing a visual media decoding or a visual media encoding technique described in the present document.

FIG. 12 is a block diagram of a video processing apparatus 1200. The apparatus 1200 may be used to implement one or more of the methods described herein. The apparatus 1200 may be embodied in a smartphone, tablet, computer, Internet of Things (IoT) receiver, and so on. The apparatus 1200 may include one or more processors 1202, one or more memories 1204 and video processing hardware 1206. The processor(s) 1202 may be configured to implement one or more methods described in the present document. The memory (memories) 1204 may be used for storing data and code used for implementing the methods and techniques described herein. The video processing hardware 1206 may be used to implement, in hardware circuitry, some techniques described in the present document, and may be partly or completely be a part of the processors 1202 (e.g., graphics processor core GPU or other signal processing circuitry).

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream.

It will be appreciated that the disclosed methods and techniques will benefit video encoder and/or decoder embodiments incorporated within video processing devices such as smartphones, laptops, desktops, and similar devices by allowing the use of the techniques disclosed in the present document.

Figure 13:
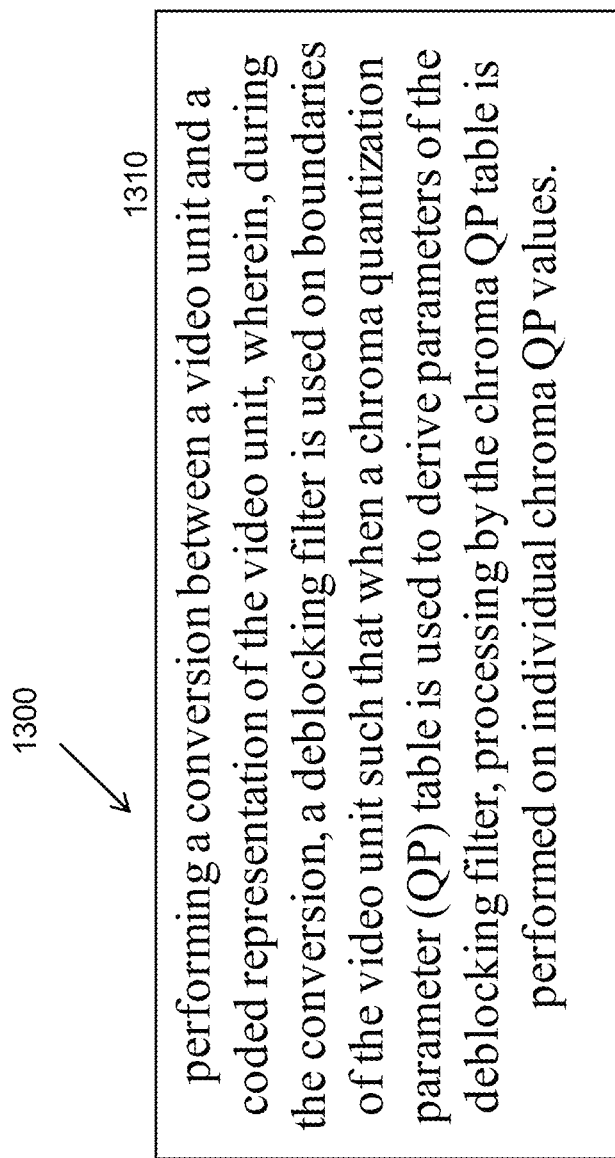
FIG. 13 shows a flowchart of an example method for video coding.

FIG. 13 is a flowchart for an example method 1300 of video processing. The method 1300 includes, at 1310, performing a conversion between a video unit and a bitstream representation of the video unit, wherein, during conversion, a deblocking filter is used on boundaries of the video unit such that when a chroma quantization parameter (QP) table is used to derive parameters of the deblocking filter, processing by the chroma QP table is performed on individual chroma QP values.

Some embodiments may be described using the following clause-based format.

1. A method of video processing, comprising:
performing a conversion between a video unit and a bitstream representation of the video unit, wherein, during the conversion, a deblocking filter is used on boundaries of the video unit such that when a chroma quantization parameter (QP) table is used to derive parameters of the deblocking filter, processing by the chroma QP table is performed on individual chroma QP values.

2. The method of clause 1, wherein chroma QP offsets are added to the individual chroma QP values subsequent to the processing by the chroma QP table.

3. The method of any of clauses 1-2, wherein the chroma QP offsets are added to values outputted by the chroma QP table.

4. The method of any of clauses 1-2, wherein the chroma QP offsets are not considered as input to the chroma QP table.

5. The method of clause 2, wherein the chroma QP offsets are at a picture-level or at a video unit-level.

6. A method of video processing, comprising:
performing a conversion between a video unit and a bitstream representation of the video unit, wherein, during the conversion, a deblocking filter is used on boundaries of the video unit such that chroma QP offsets are used in the deblocking filter, wherein the chroma QP offsets are at picture/slice/tile/brick/subpicture level.

7. The method of clause 6, wherein the chroma QP offsets used in the deblocking filter are associated with a coding method applied on a boundary of the video unit.

8. The method of clause 7, wherein the coding method is a joint coding of chrominance residuals (JCCR) method.

9. A method of video processing, comprising:
performing a conversion between a video unit and a bitstream representation of the video unit, wherein, during the conversion, a deblocking filter is used on boundaries of the video unit such that chroma QP offsets are used in the deblocking filter, wherein information pertaining to a same luma coding unit is used in the deblocking filter and for deriving a chroma QP offset.

10. The method of clause 9, wherein the same luma coding unit covers a corresponding luma sample of a center position of the video unit, wherein the video unit is a chroma coding unit.

11. The method of clause 9, wherein a scaling process is applied to the video unit, and wherein one or more parameters of the deblocking filter depend at least in part on quantization/dequantization parameters of the scaling process.

12. The method of clause 11, wherein the quantization/dequantization parameters of the scaling process include the chroma QP offset.

13. The method of any of clauses 9-12, wherein the luma sample in the video unit is in the P side or Q side.

14. The method of clause 13, wherein the information pertaining to the same luma coding unit depends on a relative position of the coding unit with respect to the same luma coding unit.

15. A method of video processing, comprising:
performing a conversion between a video unit and a bitstream representation of the video unit, wherein, during the conversion, a deblocking filter is used on boundaries of the video unit such that chroma QP offsets are used in the deblocking filter, wherein an indication of enabling usage of the chroma QP offsets is signaled in the bitstream representation.

16. The method of clause 15, wherein the indication is signaled conditionally in response to detecting one or more flags.

17. The method of clause 16, wherein the one or more flags are related to a JCCR enabling flag or a chroma QP offset enabling flag.

18. The method of clause 15, wherein the indication is signaled based on a derivation.

19. A method of video processing, comprising:
performing a conversion between a video unit and a bitstream representation of the video unit, wherein, during the conversion, a deblocking filter is used on boundaries of the video unit such that chroma QP offsets are used in the deblocking filter, wherein the chroma QP offsets used in the deblocking filter are identical of whether JCCR coding method is applied on a boundary of the video unit or a method different from the JCCR coding method is applied on the boundary of the video unit.

20. A method of video processing, comprising:
performing a conversion between a video unit and a bitstream representation of the video unit, wherein, during the conversion, a deblocking filter is used on boundaries of the video unit such that chroma QP offsets are used in the deblocking filter, wherein a boundary strength (BS) of the deblocking filter is calculated without comparing reference pictures and/or a number of motion vectors (MVs) associated with the video unit at a P side boundary with reference pictures and/or a number of motion vectors (MVs) associated with the video unit at a Q side.

21. The method of clause 20, wherein the deblocking filter is disabled under one or more conditions.

22. The method of clause 21, wherein the one or more conditions are associated with: a magnitude of the motion vectors (MVs) or a threshold value.

23. The method of clause 22, wherein the threshold value is associated with at least one of: i. contents of the video unit, ii. a message signaled in DPS/SPS/VPS/PPS/APS/picture header/slice header/tile group header/Largest coding unit (LCU)/Coding unit (CU)/LCU row/group of LCUs/TU/PU block/Video coding unit, iii. a position of CU/PU/TU/block/Video coding unit, iv. a coded mode of blocks with samples along the boundaries, v. a transform matrix applied to the video units with samples along the boundaries, vi. a shape or dimension of the video unit, vii. an indication of a color format, viii. a coding tree structure, ix.a slice/tile group type and/or picture type, x. a color component, xi. a temporal layer ID, or xii. a profile/level/tier of a standard.

24. The method of clause 20, wherein different QP offsets are used for TS coded video units and non-TS coded video units.

25. The method of clause 20, wherein a QP used in a luma filtering step is related to a QP used in a scaling process of a luma block.

26. A video decoding apparatus comprising a processor configured to implement a method recited in one or more of clauses 1 to 25.

27. A video encoding apparatus comprising a processor configured to implement a method recited in one or more of clauses 1 to 25.

28. A computer program product having computer code stored thereon, the code, when executed by a processor, causes the processor to implement a method recited in any of clauses 1 to 25.

29. A method, apparatus or system described in the present document.

Figure 18:
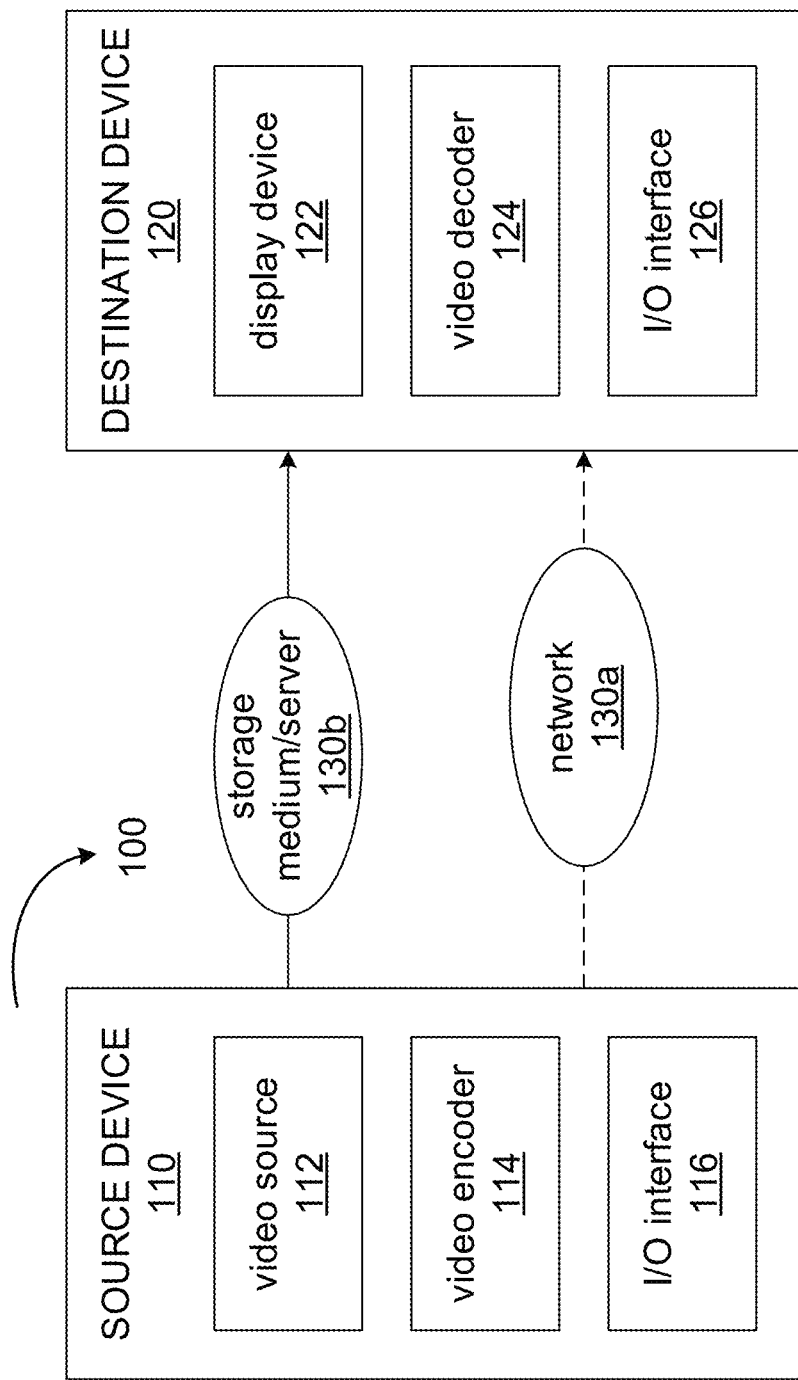
FIG. 18 is a block diagram that illustrates an example video coding system.

FIG. 18 is a block diagram that illustrates an example video coding system 100 that may utilize the techniques of this disclosure.

As shown in FIG. 18, video coding system 100 may include a source device 110 and a destination device 120. Source device 110 generates encoded video data which may be referred to as a video encoding device. Destination device 120 may decode the encoded video data generated by source device 110 which may be referred to as a video decoding device.

Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources. The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130a. The encoded video data may also be stored onto a storage medium/server 130b for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/server 130b. Video decoder 124 may decode the encoded video data. Display device 122 may display the decoded video data to a user. Display device 122 may be integrated with the destination device 120, or may be external to destination device 120 which be configured to interface with an external display device.

Video encoder 114 and video decoder 124 may operate according to a video compression standard, such as the High Efficiency Video Coding (HEVC) standard, Versatile Video Coding (VVM) standard and other current and/or further standards.

Figure 19:
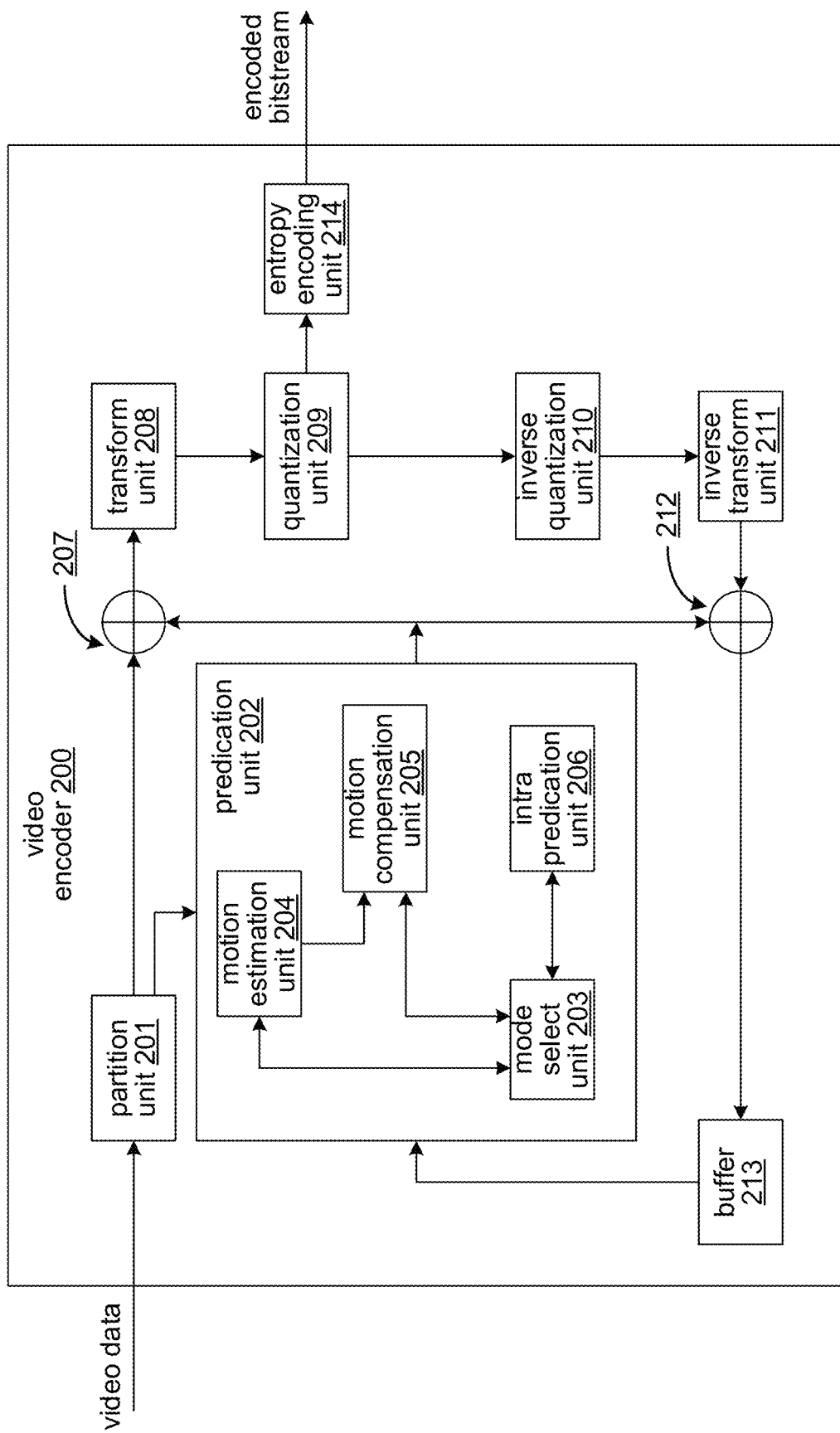
FIG. 19 is a block diagram that illustrates an encoder in accordance with some embodiments of the present disclosure.

FIG. 19 is a block diagram illustrating an example of video encoder 200, which may be video encoder 114 in the system 100 illustrated in FIG. 18.

Video encoder 200 may be configured to perform any or all of the techniques of this disclosure. In the example of FIG. 19, video encoder 200 includes a plurality of functional components. The techniques described in this disclosure may be shared among the various components of video encoder 200. In some examples, a processor may be configured to perform any or all of the techniques described in this disclosure.

The functional components of video encoder 200 may include a partition unit 201, a predication unit 202 which may include a mode select unit 203, a motion estimation unit 204, a motion compensation unit 205 and an intra prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, video encoder 200 may include more, fewer, or different functional components. In an example, predication unit 202 may include an intra block copy (IBC) unit. The IBC unit may perform predication in an IBC mode in which at least one reference picture is a picture where the current video block is located.

Furthermore, some components, such as motion estimation unit 204 and motion compensation unit 205 may be highly integrated, but are represented in the example of FIG. 19 separately for purposes of explanation.

Partition unit 201 may partition a picture into one or more video blocks. Video encoder 200 and video decoder 300 may support various video block sizes.

Mode select unit 203 may select one of the coding modes, intra or inter, e.g., based on error results, and provide the resulting intra- or inter-coded block to a residual generation unit 207 to generate residual block data and to a reconstruction unit 212 to reconstruct the encoded block for use as a reference picture. In some example, Mode select unit 203 may select a combination of intra and inter predication (CIIP) mode in which the predication is based on an inter predication signal and an intra predication signal. Mode select unit 203 may also select a resolution for a motion vector (e.g, a sub-pixel or integer pixel precision) for the block in the case of inter-predication.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may do not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as the another video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented
by video encoder 200 include advanced motion vector predication (AMVP) and merge mode signaling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the predication unit 202 to produce a reconstructed video block associated with the current block for storage in the buffer 213.

After reconstruction unit 212 reconstructs the video block, loop filtering operation may be performed reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Figure 20:
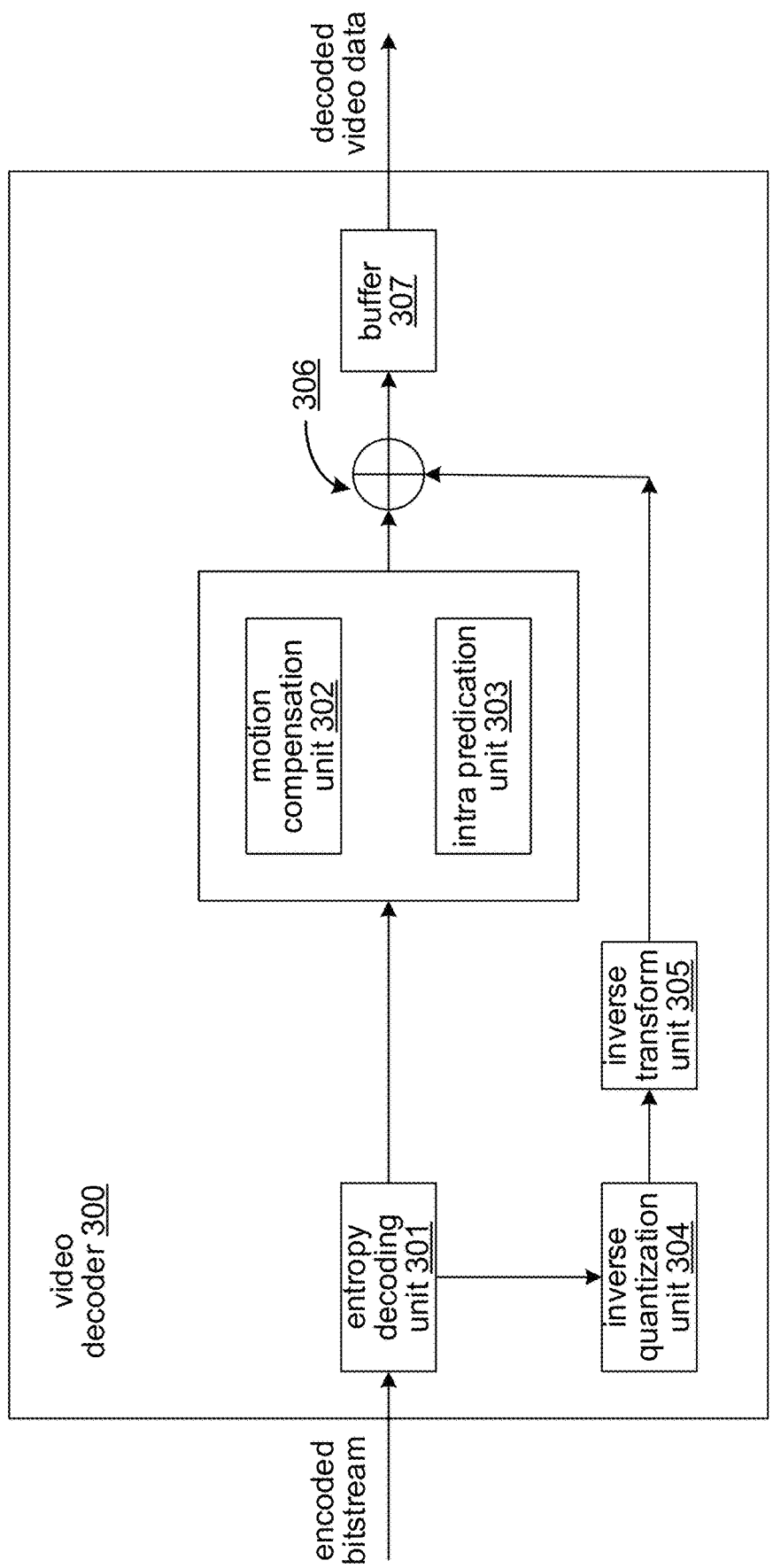
FIG. 20 is a block diagram that illustrates a decoder in accordance with some embodiments of the present disclosure.

FIG. 20 is a block diagram illustrating an example of video decoder 300 which may be video decoder 114 in the system 100 illustrated in FIG. 18.

The video decoder 300 may be configured to perform any or all of the techniques of this disclosure. In the example of FIG. 20, the video decoder 300 includes a plurality of functional components. The techniques described in this disclosure may be shared among the various components of the video decoder 300. In some examples, a processor may be configured to perform any or all of the techniques described in this disclosure.

In the example of FIG. 20, video decoder 300 includes an entropy decoding unit 301, a motion compensation unit 302, an intra prediction unit 303, an inverse quantization unit 304, an inverse transformation unit 305, and a reconstruction unit 306 and a buffer 307. Video decoder 300 may, in some examples, perform a decoding pass generally reciprocal to the encoding pass described with respect to video encoder 200 (FIG. 19).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 20 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may uses some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 303 inverse quantizes, i.e., de-quantizes, the quantized video block coefficients provided in the bitstream and decoded by entropy decoding unit 301. Inverse transform unit 303 applies an inverse transform.

reconstruction unit 306 may sum the residual blocks with the corresponding prediction blocks generated by motion compensation unit 202 or intra-prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation/intra predication and also produces decoded video for presentation on a display device.

Figure 21:
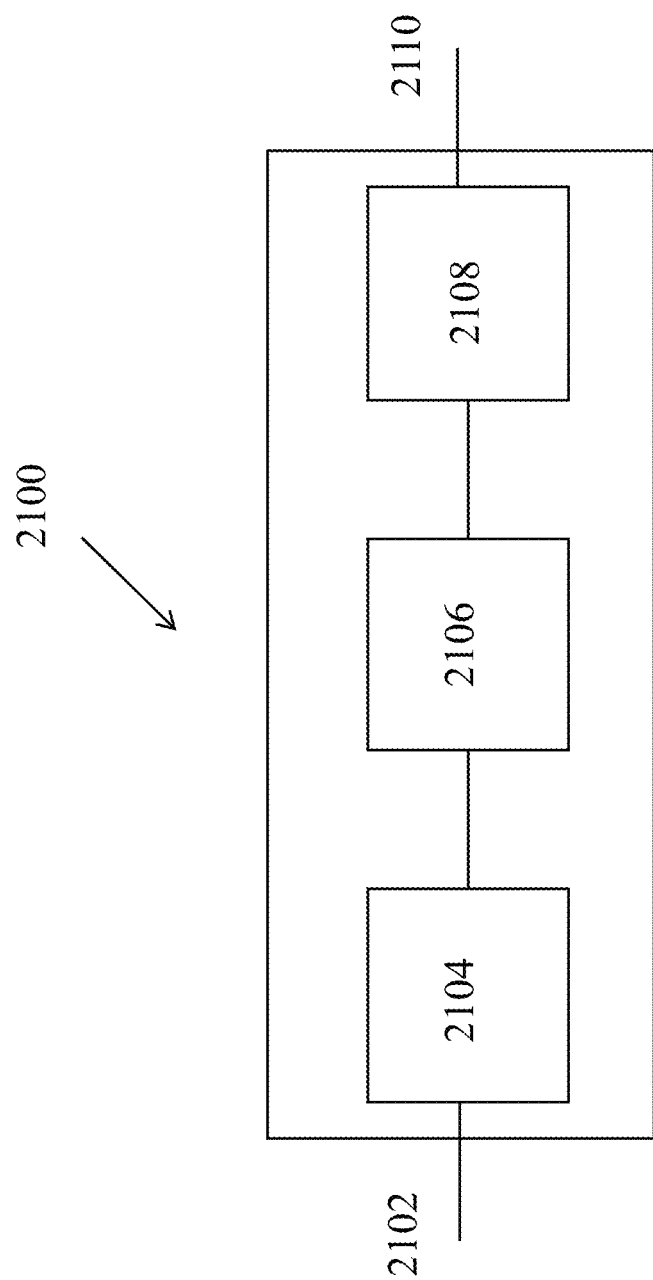
FIG. 21 is a block diagram of an example video processing system in which disclosed techniques may be implemented.

FIG. 21 is a block diagram showing an example video processing system 2100 in which various techniques disclosed herein may be implemented. Various implementations may include some or all of the components of the system 2100. The system 2100 may include input 2102 for receiving video content. The video content may be received in a raw or uncompressed format, e.g, 8 or 10 bit multi-component pixel values, or may be in a compressed or encoded format. The input 2102 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 2100 may include a coding component 2104 that may implement the various coding or encoding methods described in the present document. The coding component 2104 may reduce the average bitrate of video from the input 2102 to the output of the coding component 2104 to produce a coded representation of the video. The coding techniques are therefore sometimes called video compression or video transcoding techniques. The output of the coding component 2104 may be either stored, or transmitted via a communication connected, as represented by the component 2106. The stored or communicated bitstream (or coded) representation of the video received at the input 2102 may be used by the component 2108 for generating pixel values or displayable video that is sent to a display interface 2110. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

FIG. 22 is a flowchart representation of a method for video processing in accordance with the present technology. The method 2200 includes, at operation 2210, applying, in a conversion between a video comprising multiple components and a bitstream representation of the video, a deblocking filter to video blocks of the multiple components. A deblocking filter strength for the deblocking filter of each of the multiple components is determined according to a rule that specifies to use a different manner for determining the deblocking filter strength for the video blocks of each of the multiple components.

In some embodiments, the multiple color components comprise at least a Cb component and a Cr component. In some embodiments, each of the multiple color components is associated with deblocking parameter offsets beta and tc including a first syntax element beta_offset_div2 and a second syntax element tc_offset_div2 in a video unit. In some embodiments, the video unit comprises a part corresponding to picture parameter set. In some embodiments, the video unit comprises a part corresponding to picture header. In some embodiments, the video unit further comprises a part corresponding to slice header. In some embodiments, different syntax elements are applicable to a video block of a color components in case a joint coding of chroma residuals mode is applied to the video block.

FIG. 23 is a flowchart representation of a method for video processing in accordance with the present technology. The method 2300 includes, at operation 2310, performing a conversion between a first video unit of a video and a bitstream representation of the video. During the conversion, a deblocking filtering process is applied to the first video unit. A deblocking control offset of the first video unit is determined based on accumulating one or more deblocking control offset values at other video unit levels.

In some embodiments, the deblocking control offset comprises at least beta_offset_div2 or tc_offset_div2. In some embodiments, the first video unit comprises a slice, and the other video unit levels comprise at least a picture parameter set or a picture.

Figure 24:
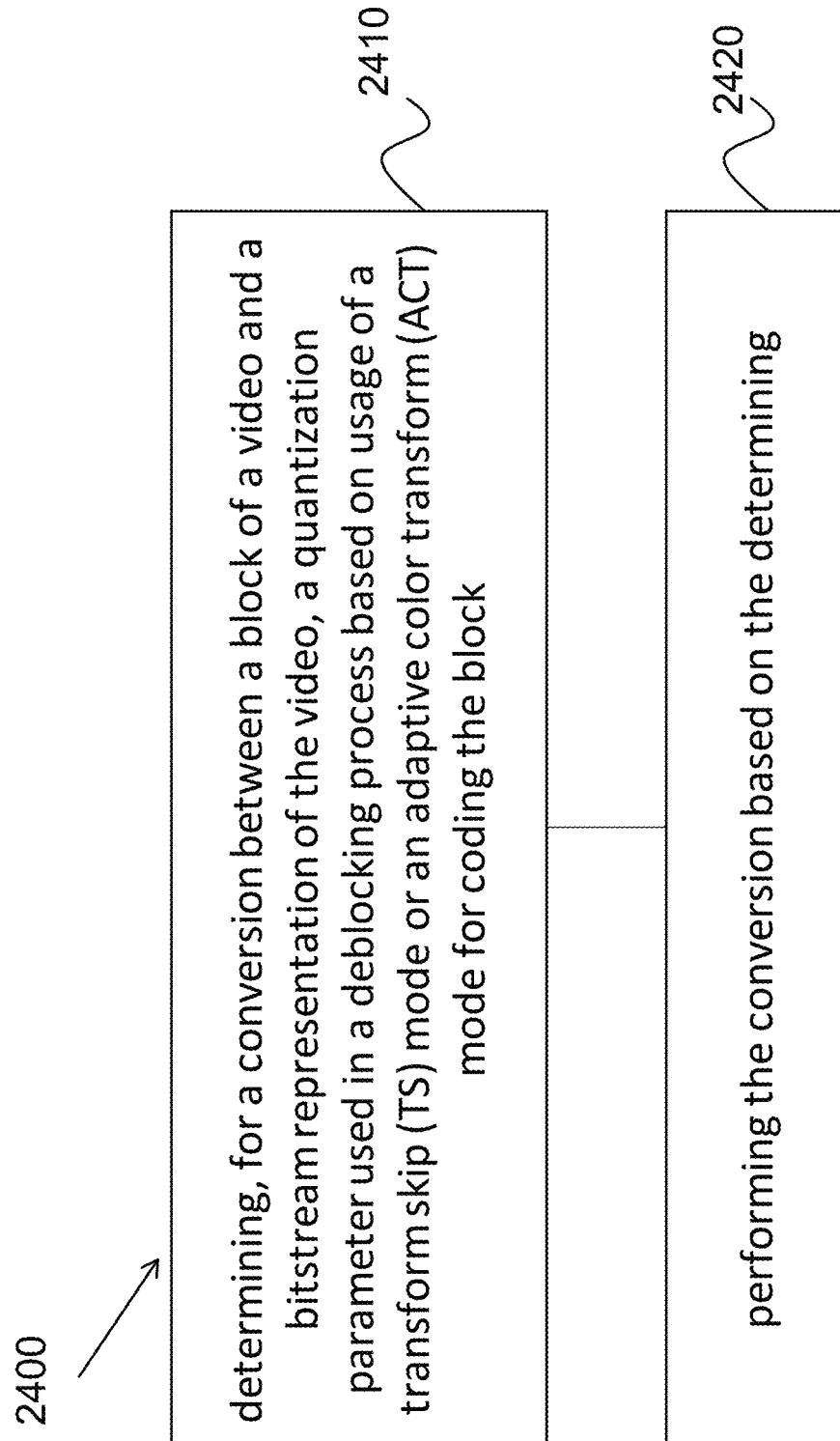
FIG. 24 is a flowchart representation of another method for video processing in accordance with the present technology.

FIG. 24 is a flowchart representation of a method for video processing in accordance with the present technology. The method 2400 includes, at operation 2410, determining, for a conversion between a block of a video and a bitstream representation of the video, a quantization parameter used in a deblocking process based on usage of a transform skip (TS) mode or an adaptive color transform (ACT) mode for coding the block. The method 2400 also includes, at operation 2420, performing the conversion based on the determining.

In some embodiments, the quantization parameter is determined based on Max(QpPrimeTsMin, qP)−(cu_act_enabled_flag[xTbY][yTbY]? N. 0), N being a positive integer and qP being a real number. QpPrimeTsMin represents a minimal quantization parameter for blocks encoded in the TS mode, and cu_act_enabled_flag is a flag indicating usage of the ACT mode. In some embodiments, the quantization parameter is determined based on Max(QpPrimeTsMin, qP−(cu_act_enabled_flag[xTbY][yTbY]? N:0)), N being a positive integer and qP being a real number. QpPrimeTsMin represents a minimal quantization parameter for blocks encoded in the TS mode, and cu_act_enabled_flag is a flag indicating usage of the ACT mode. In some embodiments, qP is equal to a chroma quantization parameter for Cb or Cr component. In some embodiments, N is different for blocks of different color components. In some embodiments, N is equal to 5 in case the block is of Cb, B, G, or U component. In some embodiments, N is equal to 3 in case the block of Cr, R, B or V component.

Figure 25:
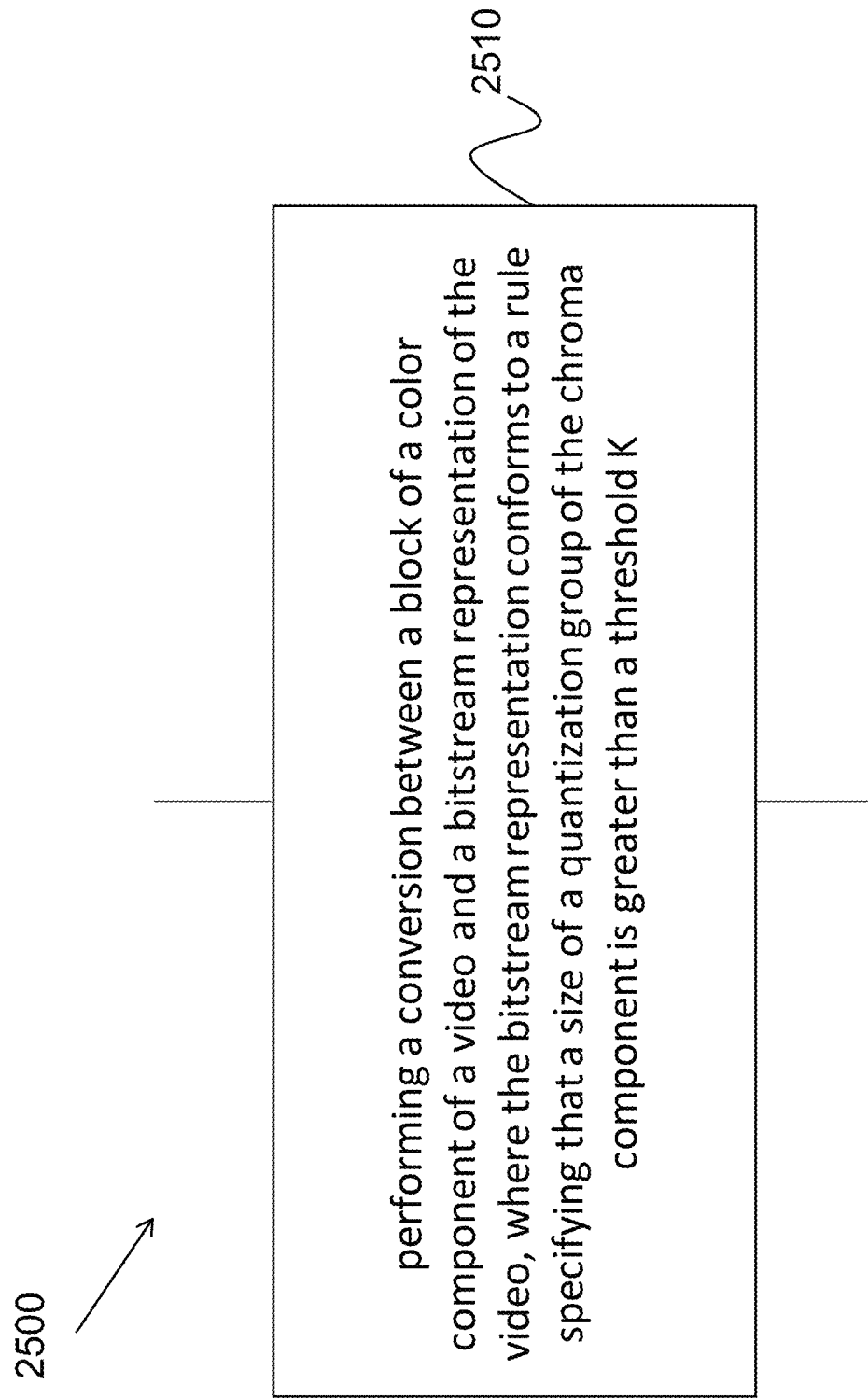
FIG. 25 is a flowchart representation of yet another method for video processing in accordance with the present technology.

FIG. 25 is a flowchart representation of a method for video processing in accordance with the present technology. The method 2500 includes, at operation 2510, performing a conversion between a block of a color component of a video and a bitstream representation of the video. The bitstream representation conforms to a rule specifying that a size of a quantization group of the chroma component is greater than a threshold K. The quantization group includes one or more coding units carrying a quantization parameter.

In some embodiments, wherein the size comprises a width of the quantization group. In some embodiments, the color component is a chroma component. In some embodiments, K is 4. In some embodiments, the color component is a luma component. In some embodiments, K is 8.

In some embodiments, the conversion includes encoding the video into the bitstream representation. In some embodiments, the conversion includes decoding the bitstream representation into the video.

Some embodiments of the disclosed technology include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream representation of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream representation of the video to the block of video will be performed using the video processing tool or mode that was enabled based on the decision or determination.

Some embodiments of the disclosed technology include making a decision or determination to disable a video processing tool or mode. In an example, when the video processing tool or mode is disabled, the encoder will not use the tool or mode in the conversion of the block of video to the bitstream representation of the video. In another example, when the video processing tool or mode is disabled, the decoder will process the bitstream with the knowledge that the bitstream has not been modified using the video processing tool or mode that was enabled based on the decision or determination.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of processing video data, comprising:
applying, in a conversion between a video comprising multiple color components and a bitstream of the video, a deblocking filter to video blocks of the multiple color components;
performing the conversion based on the applying,
wherein a deblocking filter strength for the deblocking filter of the video blocks of each of the multiple color components is determined according to a rule;
wherein the rule specifies to use a different manner for determining the deblocking filter strength for the video blocks of each of the multiple color components;
wherein the multiple color components comprise at least a Cb component and a Cr component; and wherein each of the multiple color components is associated with deblocking parameter offsets for a variable beta and a variable tC in different video unit levels which are used to determine the deblocking filter strength; and
wherein the different video unit levels comprise a picture parameter set (PPS), wherein a first syntax element associated with the Cb component indicating the deblocking parameter offsets for the variable beta in the PPS is pps_cb_beta_offset_div2 and a first syntax element associated with the Cr component indicating the deblocking parameter offsets for the variable beta in PPS is pps_cr_beta_offset_div2; and wherein a second syntax element associated with the Cb component indicating the deblocking parameter offsets for the variable tC in PPS is pps_cb_tc_offset_div2 and a second syntax element associated with the Cr component indicating the deblocking parameter offsets for the variable tC in the PPS is pps_cr_tc_offset_div2.

2. The method of claim 1, wherein pps_cb_beta_offset_div2 and pps_cb_tc_offset_div2 specify default deblocking parameter offsets for the variable beta and the variable tC (divided by 2) that are applied to the Cb component for slices referring to the PPS, unless the default deblocking parameter offsets are overridden by the deblocking parameter offsets present in slice headers of the slices referring to the PPS; and
wherein pps_cr_beta_offset_div2 and pps_cr_tc_offset_div2 specify default deblocking parameter offsets for the variable beta and the variable tC (divided by 2) that are applied to the Cr component for slices referring to the PPS, unless the default deblocking parameter offsets are overridden by the deblocking parameter offsets present in the slice headers of the slices referring to the PPS.

3. The method of claim 1, wherein the different video unit levels comprise a picture header, wherein a third syntax element associated with the Cb component indicating the deblocking parameter offsets for the variable beta in the picture header is pic_cb_beta_offset_div2 and a third syntax element associated with the Cr component indicating the deblocking parameter offsets for the variable beta in the picture header is pic_cr_beta_offset_div2; and a fourth syntax element associated with the Cb component indicating the deblocking parameter offsets for the variable tC in the picture header is pic_cb_tc_offset_div2 and a fourth syntax element associated with the Cr component indicating the deblocking parameter offsets for the variable tC in the picture header is pic_cr_tc_offset_div2.

4. The method of claim 3, wherein pic_cb_beta_offset_div2 and pic_cb_tc_offset_div2 specify deblocking parameter offsets for the variable beta and the variable tC (divided by 2) that are applied to the Cb component for slices associated with the picture header; and
wherein pic_cr_beta_offset_div2 and pic_cr_tc_offset_div2 specify deblocking parameter offsets for the variable beta and the variable tC (divided by 2) that are applied to the Cr component for the slices associated with the picture header.

5. The method of claim 1, wherein the different video unit levels comprise a slice header, wherein a fifth syntax element associated with the Cb component indicating the deblocking parameter offsets for the variable beta in the slice header is slice_cb_beta_offset_div2 and a fifth syntax element associated with the Cr component indicating the deblocking parameter offsets for the variable beta in the slice header is slice_cr_beta_offset_div2; and a sixth syntax element associated with the Cb component indicating the deblocking parameter offsets for the variable tC in the slice header is slice_cb_tc_offset_div2 and a sixth syntax element associated with the Cr component indicating the deblocking parameter offsets for the variable tC in the slice header is slice_cr_tc_offset_div2.

6. The method of claim 5, wherein slice_cb_beta_offset_div2 and slice_cb_tc_offset_div2 specify the deblocking parameter offsets for the variable beta and the variable tC (divided by 2) that are applied to the Cb component for a current slice; and
wherein slice_cr_beta_offset_div2 and slice_cr_tc_offset_div2 specify the deblocking parameter offsets for the variable beta and the variable tC (divided by 2) that are applied to the Cb component for the current slice.

7. The method of claim 1, wherein the conversion includes encoding the video into the bitstream.

8. The method of claim 1, wherein the conversion includes decoding the video from the bitstream.

9. An apparatus for processing video data comprising a processor and a non-transitory memory with instructions thereon, wherein the instructions upon execution by the processor, cause the processor to:
apply, in a conversion between a video comprising multiple color components and a bitstream of the video, a deblocking filter to video blocks of the multiple color components; and
perform the conversion based on the applied deblocking filter,
wherein a deblocking filter strength for the deblocking filter of the video blocks of each of the multiple color components is determined according to a rule;
wherein the rule specifies to use a different manner for determining the deblocking filter strength for the video blocks of each of the multiple color components;
wherein the multiple color components comprise at least a Cb component and a Cr component; and wherein each of the multiple color components is associated with deblocking parameter offsets for a variable beta and a variable tC in different video unit levels which are used to determine the deblocking filter strength; and
wherein the different video unit levels comprise a picture parameter set (PPS), wherein a first syntax element associated with the Cb component indicating the deblocking parameter offsets for the variable beta in the PPS is pps_cb_beta_offset_div2 and a first syntax element associated with the Cr component indicating the deblocking parameter offsets for the variable beta in the PPS is pps_cr_beta_offset_div2; and a second syntax element associated with the Cb component indicating the deblocking parameter offsets for the variable tC in the PPS is pps_cb_tc_offset_div2 and a second syntax element associated with the Cr component indicating the deblocking parameter offsets for the variable tC in the PPS is pps_cr_tc_offset_div2.

10. The apparatus of claim 9,
wherein pps_cb_beta_offset_div2 and pps_cb_tc_offset_div2 specify default deblocking parameter offsets for the variable beta and the variable tC (divided by 2) that are applied to the Cb component for slices referring to the PPS, unless the default deblocking parameter offsets are overridden by the deblocking parameter offsets present in slice headers of the slices referring to the PPS; and
wherein pps_cr_beta_offset_div2 and pps_cr_tc_offset_div2 specify default deblocking parameter offsets for the variable beta and the variable tC (divided by 2) that are applied to the Cr component for slices referring to the PPS, unless the default deblocking parameter offsets are overridden by the deblocking parameter offsets present in the slice headers of the slices referring to the PPS.

11. The apparatus of claim 9, wherein the different video unit levels comprise a picture header, wherein a third syntax element associated with the Cb component indicating the deblocking parameter offsets for the variable beta in the picture header is pic_cb_beta_offset_div2 and a third syntax element associated with the Cr component indicating the deblocking parameter offsets for the variable beta in the picture header is pic_cr_beta_offset_div2; and a fourth syntax element associated with the Cb component indicating the deblocking parameter offsets for the variable tC in the picture header is pic_cb_tc_offset_div2 and a fourth syntax element associated with the Cr component indicating the deblocking parameter offsets for the variable tC in the picture header is pic_cr_tc_offset_div2;
wherein pic_cb_beta_offset_div2 and pic_cb_tc_offset_div2 specify deblocking parameter offsets for the variable beta and the variable tC (divided by 2) that are applied to the Cb component for slices associated with the picture header; and
wherein pic_cr_beta_offset_div2 and pic_cr_tc_offset_div2 specify deblocking parameter offsets for the variable beta and the variable tC (divided by 2) that are applied to the Cr component for the slices associated with the picture header.

12. The apparatus of claim 9, wherein the different video unit levels comprise a slice header, wherein a fifth syntax element associated with the Cb component indicating the deblocking parameter offsets for the variable beta in the slice header is slice_cb_beta_offset_div2 and a fifth syntax element associated with the Cr component indicating the deblocking parameter offsets for the variable beta in the slice header is slice_cr_beta_offset_div2; and a sixth syntax element associated with the Cb component indicating the deblocking parameter offsets for the variable tC in the slice header is slice_cb_tc_offset_div2 and a sixth syntax element associated with the Cr component indicating the deblocking parameter offsets for the variable tC in the slice header is slice_cr_tc_offset_div2;

wherein slice_cb_beta_offset_div2 and slice_cb_tc_offset_div2 specify the deblocking parameter offsets for the variable beta and the variable tC (divided by 2) that are applied to the Cb component for a current slice; and wherein slice_cr_beta_offset_div2 and slice_cr_tc_offset_div2 specify the deblocking parameter offsets for the variable beta and the variable tC (divided by 2) that are applied to the Cb component for the current slice.

13. A non-transitory computer-readable storage medium storing instructions that cause a processor to:

apply, in a conversion between a video comprising multiple color components and a bitstream of the video, a deblocking filter to video blocks of the multiple color components; and perform the conversion based on the applied deblocking filter, wherein a deblocking filter strength for the deblocking filter of the video blocks of each of the multiple color components is determined according to a rule;

wherein the rule specifies to use a different manner for determining the deblocking filter strength for the video blocks of each of the multiple color components;

wherein the multiple color components comprise at least a Cb component and a Cr component; and wherein each of the multiple color components is associated with deblocking parameter offsets for a variable beta and a variable tC in different video unit levels which are used to determine the deblocking filter strength; and wherein the different video unit levels comprise a picture parameter set (PPS), wherein a first syntax element associated with the Cb component indicating the deblocking parameter offsets for the variable beta in the PPS is pps_cb_beta_offset_div2 and a first syntax element associated with the Cr component indicating the deblocking parameter offsets for the variable beta in the PPS is pps_cr_beta_offset_div2; and a second syntax element associated with the Cb component indicating the deblocking parameter offsets for the variable tC in the PPS is pps_cb_tc_offset_div2 and a second syntax element associated with the Cr component indicating the deblocking parameter offsets for the variable tC in the PPS is pps_cr_tc_offset_div2.

14. The non-transitory computer-readable storage medium of claim 13, wherein pps_cb_beta_offset_div2 and pps_cb_tc_offset_div2 specify default deblocking parameter offsets for the variable beta and the variable tC (divided by 2) that are applied to the Cb component for slices referring to the PPS, unless the default deblocking parameter offsets are overridden by the deblocking parameter offsets present in slice headers of the slices referring to the PPS; and wherein pps_cr_beta_offset_div2 and pps_cr_tc_offset_div2 specify default deblocking parameter offsets for the variable beta and the variable tC (divided by 2) that are applied to the Cr component for slices referring to the PPS, unless the default deblocking parameter offsets are overridden by the deblocking parameter offsets present in the slice headers of the slices referring to the PPS.

15. The non-transitory computer-readable storage medium of claim 13, wherein the different video unit levels comprise a picture header, wherein a third syntax element associated with the Cb component indicating the deblocking parameter offsets for the variable beta in the picture header is pic_cb_beta_offset_div2 and a third syntax element associated with the Cr component indicating the deblocking parameter offsets for the variable beta in the picture header is pic_cr_beta_offset_div2; and a fourth syntax element associated with the Cb component indicating the deblocking parameter offsets for the variable tC in the picture header is pic_cb_tc_offset_div2 and a fourth syntax element associated with the Cr component indicating the deblocking parameter offsets for the variable tC in the picture header is pic_cr_tc_offset_div2;

wherein pic_cb_beta_offset_div2 and pic_cb_tc_offset_div2 specify deblocking parameter offsets for the variable beta and the variable tC (divided by 2) that are applied to the Cb component for slices associated with the picture header; and wherein pic_cr_beta_offset_div2 and pic_cr_tc_offset_div2 specify deblocking parameter offsets for the variable beta and the variable tC (divided by 2) that are applied to the Cr component for the slices associated with the picture header.

16. The non-transitory computer-readable storage medium of claim 13, wherein the different video unit levels comprise a slice header, wherein a fifth syntax element associated with the Cb component indicating the deblocking parameter offsets for the variable beta in the slice header is slice_cb_beta_offset_div2 and a fifth syntax element associated with the Cr component indicating the deblocking parameter offsets for the variable beta in the slice header is slice_cr_beta_offset_div2; and a sixth syntax element associated with the Cb component indicating the deblocking parameter offsets for the variable tC in the slice header is slice_cb_tc_offset_div2 and a sixth syntax element associated with the Cr component indicating the deblocking parameter offsets for the variable tC in the slice header is slice_cr_tc_offset_div2;

wherein slice_cb_beta_offset_div2 and slice_cb_tc_offset_div2 specify the deblocking parameter offsets for the variable beta and the variable tC (divided by 2) that are applied to the Cb component for a current slice; and wherein slice_cr_beta_offset_div2 and slice_cr_tc_offset_div2 specify the deblocking parameter offsets for the variable beta and the variable tC (divided by 2) that are applied to the Cb component for the current slice.

17. A non-transitory computer-readable recording medium storing a bitstream of a video which is generated by a method performed by a video processing apparatus, wherein the method comprises:

applying a deblocking filter to video blocks of multiple color components of a video; and generating the bitstream based on the applying, wherein a deblocking filter strength for the deblocking filter of the video blocks of each of the multiple color components is determined according to a rule;

wherein the rule specifies to use a different manner for determining the deblocking filter strength for the video blocks of each of the multiple color components;

wherein the multiple color components comprise at least a Cb component and a Cr component; and wherein each of the multiple color components is associated with deblocking parameter offsets for a variable beta and a variable tC in different video unit levels which are used to determine the deblocking filter strength; and wherein the different video unit levels comprise a picture parameter set (PPS), wherein a first syntax element associated with the Cb component indicating the deblocking parameter offsets for the variable beta in the PPS is pps_cb_beta_offset_div2 and a first syntax element associated with the Cr component indicating the deblocking parameter offsets for the variable beta in the PPS is pps_cr_beta_offset_div2; and a second syntax element associated with the Cb component indicating the deblocking parameter offsets for the variable tC in the PPS is pps_cb_tc_offset_div2 and a second syntax element associated with the Cr component indicating the deblocking parameter offsets for the variable tC in the PPS is pps_cr_tc_offset_div2.

18. The non-transitory computer-readable recording medium of claim 17,
   wherein pps_cb_beta_offset_div2 and pps_cb_tc_offset_div2 specify default deblocking parameter offsets for the variable beta and the variable tC (divided by 2) that are applied to the Cb component for slices referring to the PPS, unless the default deblocking parameter offsets are overridden by the deblocking parameter offsets present in slice headers of the slices referring to the PPS; and
   wherein pps_cr_beta_offset_div2 and pps_cr_tc_offset_div2 specify default deblocking parameter offsets for the variable beta and the variable tC (divided by 2) that are applied to the Cr component for slices referring to the PPS, unless the default deblocking parameter offsets are overridden by the deblocking parameter offsets present in the slice headers of the slices referring to the PPS.

19. The non-transitory computer-readable recording medium of claim 17, wherein the different video unit levels comprise a picture header, wherein a third syntax element associated with the Cb component indicating the deblocking parameter offsets for the variable beta in the picture header is pic_cb_beta_offset_div2 and a third syntax element associated with the Cr component indicating the deblocking parameter offsets for the variable beta in the picture header is pic_cr_beta_offset_div2; and a fourth syntax element associated with the Cb component indicating the deblocking parameter offsets for the variable tC in the picture header is pic_cb_tc_offset_div2 and a fourth syntax element associated with the Cr component indicating the deblocking parameter offsets for the variable tC in the picture header is pic_cr_tc_offset_div2;
   wherein pic_cb_beta_offset_div2 and pic_cb_tc_offset_div2 specify deblocking parameter offsets for the variable beta and the variable tC (divided by 2) that are applied to the Cb component for slices associated with the picture header;
   wherein pic_cr_beta_offset_div2 and pic_cr_tc_offset_div2 specify deblocking parameter offsets for the variable beta and the variable tC (divided by 2) that are applied to the Cr component for the slices associated with the picture header;
   wherein the different video unit levels comprise a slice header, wherein a fifth syntax element associated with the Cb component indicating the deblocking parameter offsets for the variable beta in the slice header is slice_cb_beta_offset_div2 and a fifth syntax element associated with the Cr component indicating the deblocking parameter offsets for the variable beta in the slice header is slice_cr_beta_offset_div2; and a sixth syntax element associated with the Cb component indicating the deblocking parameter offsets for the variable tC in the slice header is slice_cb_tc_offset_div2 and a sixth syntax element associated with the Cr component indicating the deblocking parameter offsets for the variable tC in the slice header is slice_cr_tc_offset_div2;
   wherein slice_cb_beta_offset_div2 and slice_cb_tc_offset_div2 specify the deblocking parameter offsets for the variable beta and the variable tC (divided by 2) that are applied to the Cb component for a current slice; and
   wherein slice_cr_beta_offset_div2 and slice_cr_tc_offset_div2 specify the deblocking parameter offsets for the variable beta and the variable tC (divided by 2) that are applied to the Cb component for the current slice.

* * * * *